United States Patent
Khoshnevisan et al.

(10) Patent No.: US 12,471,090 B2
(45) Date of Patent: Nov. 11, 2025

(54) USER EQUIPMENT PROCESSING CAPABILITY FOR WIRELESS COMMUNICATIONS WITH RATE SPLITTING

(71) Applicant: QUALCOMM Incorporated, San Diego, CA (US)

(72) Inventors: Mostafa Khoshnevisan, San Diego, CA (US); Ahmed Abdelaziz Ibrahim Abdelaziz Zewail, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/950,372

(22) Filed: Sep. 22, 2022

(65) Prior Publication Data
US 2024/0107535 A1    Mar. 28, 2024

(51) Int. Cl.
*H04W 72/20*   (2023.01)
*H04W 8/24*    (2009.01)
*H04W 72/54*   (2023.01)

(52) U.S. Cl.
CPC ............ *H04W 72/20* (2023.01); *H04W 8/24* (2013.01); *H04W 72/54* (2023.01)

(58) Field of Classification Search
CPC ............... H04L 5/0055; H04L 5/0094; H04W 8/24–245; H04W 72/20; H04W 72/21; H04W 72/23–232; H04W 72/51–512; H04W 72/54–543; H04W 72/25; H04W 72/27; H04W 72/29
See application file for complete search history.

(56) References Cited

U.S. PATENT DOCUMENTS

2021/0105105 A1* 4/2021 Xu .................. H04L 5/0094
2023/0319708 A1* 10/2023 Ma .................. H04W 8/24
                                                  455/574

FOREIGN PATENT DOCUMENTS

WO   WO-2023122097 A1 *  6/2023

OTHER PUBLICATIONS

Mao, Yijie et al., "Rate-Splitting Multiple Access: fundamentals, survey, and future research trends" IEEE Communications Surveys & Tutorials, 24(4), https://doi.org/10.1109/comst.2022.3191937, pub'd Jul. 18, 2022, accessed on Mar. 14, 2025, pp. 2073-2126 (Year: 2022).*

* cited by examiner

*Primary Examiner* — Thomas R Cairns
(74) *Attorney, Agent, or Firm* — Holland & Hart LLP/Qualcomm Incorporated

(57) ABSTRACT

Methods, systems, and devices for wireless communication are described. A network entity may transmit control signaling to a user equipment (UE) to schedule a downlink message and a set of uplink signals for conveying feedback in response to the downlink message. The downlink message may include a first portion with information for the UE and a second portion with information for the UE and at least one other UE based on a rate splitting procedure. The UE may transmit uplink signaling that indicates one or more UE capabilities, communication parameters, or both. The network entity may determine a time period between a final symbol of the downlink message and a first symbol of the set of uplink symbols, one or more parameters to apply for transmission of the downlink message, or a data rate for the downlink message based on the UE capabilities and parameters reported by the UE.

33 Claims, 21 Drawing Sheets

USER EQUIPMENT PROCESSING CAPABILITY FOR WIRELESS COMMUNICATIONS WITH RATE SPLITTING

FIELD OF TECHNOLOGY

The following relates to wireless communication, including user equipment (UE) processing capability for wireless communications with rate splitting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a network entity may apply a rate splitting procedure to one or more downlink messages. The rate splitting procedure may include dividing a downlink message for transmission to a UE into at least a private portion and a common portion. The private portion may include information for the UE and the common portion may include information for the UE and at least one other UE. The common portion may be combined with other common portions of at least one other downlink message for transmission to the at least one other UE. The network entity may transmit the downlink message and the at least one other downlink message in accordance with the rate splitting procedure.

SUMMARY

The described techniques relate to improved methods, systems, devices, and apparatuses that support user equipment (UE) processing capability for wireless communications with rate splitting. For example, the described techniques provide for a network entity and a UE to perform wireless communications based on one or more UE capabilities and communication parameters associated with rate splitting. The network entity may schedule the wireless communications. For example, the network entity may transmit control signaling that schedules a downlink message and a set of uplink symbols for transmission of feedback in response to the downlink message. In some aspects, the downlink message may be split and may include a first portion with information for the UE (e.g., a private portion) and a second portion with information for the UE and at least one other UE (e.g., a common portion). The UE may support a first set of UE capabilities and communication parameters for receipt of a downlink message that includes two or more portions in accordance with a rate splitting procedure and a second set of UE capabilities and communication parameters for receipt of a downlink message that is not associated with the rate splitting procedure. In some aspects described herein, the network entity may schedule the uplink symbols for conveying feedback such that a time period between a final symbol of the downlink message and a first symbol of the uplink symbols provides sufficient time for the UE to process a downlink message associated with rate splitting. For example, the network entity may apply an offset to a downlink channel processing time supported by the UE.

In some other aspects, the UE may report both the first and second sets of UE capabilities, and the network entity may determine scheduling information for the downlink message based on one or both of the first and second sets of UE capabilities. In some other aspects, the UE may transmit an uplink message that indicates communication parameters associated with one or more downlink messages transmitted in accordance with the rate splitting procedure. The network entity may determine a data rate for transmission of one or more downlink messages based on the communication parameters reported by the UE. The wireless communication devices described herein may thereby support transmission and reception of downlink messages that include at least two portions based on a rate splitting procedure. By accounting for UE capabilities and parameters when rate splitting is applied, the devices may improve throughput and reliability of the wireless communications.

A method for wireless communication at a UE is described. The method may include receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters, receiving the downlink message based on the control signaling, where, based on the one or more rate splitting parameters, a first portion of the downlink message includes first information for the UE and a second portion of the downlink message includes second information for the UE and at least one other UE, and transmitting, in response to the downlink message, a feedback message via the set of uplink symbols.

An apparatus is described. The apparatus may include a memory, a transceiver, and at least on processor of a UE, the at least one processor coupled with the memory and the transceiver. The at least one processor may be configured to receive control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters, receive the downlink message based on the control signaling, where, based on the one or more rate splitting parameters, a first portion of the downlink message includes first information for the UE and a second portion of the downlink message includes second information for the UE and at least one other UE, and transmit, in response to the downlink message, a feedback message via the set of uplink symbols.

Another apparatus for wireless communication at a UE is described. The apparatus may include means for receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters, means for receiving the downlink message based on the control signaling, where, based on the one or more rate splitting parameters, a first portion of the downlink message includes first information for the UE and a second portion of the downlink message includes second information for the UE and at least one other UE, and means for transmitting, in response to the downlink message, a feedback message via the set of uplink symbols.

A non-transitory computer-readable medium storing code for wireless communication at a UE is described. The code may include instructions executable by a processor to receive control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters, receive the downlink message based on the control signaling, where, based on the one or more rate splitting parameters, a first portion of the downlink message includes first information for the UE and a second portion of the downlink message includes second information for the UE and at least one other UE, and transmit, in response to the downlink message, a feedback message via the set of uplink symbols.

Some examples of the method, apparatuses, and non-transitory computer-readable medium described herein may further include operations, features, means, or instructions for transmitting a capability message that indicates the one or more capabilities of the UE associated with the one or more rate splitting parameters, the second duration of the second portion of the time period, or both.

In some examples of the method, apparatuses, and non-transitory computer-readable medium described herein, transmitting the capability message may include operations, features, means, or instructions for transmitting, via the capability message, a set of multiple second durations including at least the second duration, where each second duration of the set of multiple second durations may be associated with a respective group of one or more rate splitting parameters.

In some examples of the method, apparatuses, and non-transitory computer-readable medium described herein, the second duration may be one of a set of multiple second durations each associated with a respective combination of one or more capabilities of the UE and one or more rate splitting parameters and the second duration may be associated with the one or more capabilities of the UE that may be associated with the one or more rate splitting parameters.

In some examples of the method, apparatuses, and non-transitory computer-readable medium described herein, the one or more capabilities of the UE associated with the one or more rate splitting parameters include a processing capability of the UE when receiving downlink messages in accordance with the one or more rate splitting parameters, a type of reception supported by the UE when receiving downlink messages in accordance with the one or more rate splitting parameters, or both and the one or more rate splitting parameters include a subcarrier spacing (SCS) of communications, a quantity of downlink shared channel transmissions per slot, or both.

In some examples of the method, apparatuses, and non-transitory computer-readable medium described herein, the type of reception supported by the UE may be a first type based on successive interference cancellation, a second type based on joint demodulation and decoding of the second portion of the downlink message including the second information for the UE and the at least one other UE, or a third type based on joint demodulation without decoding of the second portion of the downlink message.

A method for wireless communication at a UE is described. The method may include transmitting one or more capability messages that indicate a first set of one or more UE capabilities and a second set of one or more UE capabilities, where the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type and receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

An apparatus is described. The apparatus may include a memory, a transceiver, and at least on processor of a UE, the at least one processor coupled with the memory and the transceiver. The at least one processor may be configured to transmit one or more capability messages that indicate a first set of one or more UE capabilities and a second set of one or more UE capabilities, where the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type and receive control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

Another apparatus for wireless communication at a UE is described. The apparatus may include means for transmitting one or more capability messages that indicate a first set of one or more UE capabilities and a second set of one or more UE capabilities, where the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type and means for receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

A non-transitory computer-readable medium storing code for wireless communication at a UE is described. The code may include instructions executable by a processor to transmit one or more capability messages that indicate a first set of one or more UE capabilities and a second set of one or more UE capabilities, where the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type and receive control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

In some examples of the method, apparatuses, and non-transitory computer-readable medium described herein, the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period and transmitting the one or more capability messages includes transmitting a capability message that indicates whether the UE supports the second UE processing capability for reception of the first type of downlink message based on the rate splitting procedure.

In some examples of the method, apparatuses, and non-transitory computer-readable medium described herein, the UE supports the second UE processing capability and the method, apparatuses, and non-transitory computer-readable medium may include further operations, features, means, or instructions for receiving the downlink message, where the downlink message may be of the first type and includes a first portion with first information for the UE and a second portion with second information for the UE and the at least one other UE based on the rate splitting procedure, where the downlink message may be in accordance with the rate splitting procedure based on the capability message indicating that the UE supports the second UE processing capability for reception of the first type of downlink message.

In some examples of the method, apparatuses, and non-transitory computer-readable medium described herein, the UE supports the second UE processing capability and the method, apparatuses, and non-transitory computer-readable medium may include further operations, features, means, or instructions for receiving the downlink message, where the downlink message may be of the second type and may be not in accordance with the rate splitting procedure based on the capability message indicating that the UE does not support the second UE processing capability for reception of the second type of downlink message.

In some examples of the method, apparatuses, and non-transitory computer-readable medium described herein, transmitting the one or more capability messages may include operations, features, means, or instructions for transmitting a capability message that indicates a quantity of downlink messages the UE may be capable of receiving per slot when at least one of the downlink messages may be of the first type to which the rate splitting procedure may be applied, where the communication parameters for the downlink message include a quantity of downlink messages transmitted in a same slot as the downlink message.

In some examples of the method, apparatuses, and non-transitory computer-readable medium described herein, the indicated quantity of downlink messages includes a total quantity of downlink messages that the UE may be capable of receiving per slot when at least one of the downlink messages may be of the first type to which the rate splitting procedure may be applied.

In some examples of the method, apparatuses, and non-transitory computer-readable medium described herein, the indicated quantity of downlink messages includes a first quantity of downlink messages of the first type to which the rate splitting procedure may be applied and the capability message further indicates a second quantity of downlink messages of the second type that the UE may be capable of receiving per slot.

In some examples of the method, apparatuses, and non-transitory computer-readable medium described herein, the indicated quantity of downlink messages includes downlink messages of the first type to which the rate splitting procedure may be applied and excludes downlink messages of the second type to which the rate splitting procedure may be not applied.

In some examples of the method, apparatuses, and non-transitory computer-readable medium described herein, the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period and transmitting the one or more capability messages includes transmitting a capability message that indicates a maximum quantity of component carriers supported by the UE in accordance with the second UE processing capability when receiving downlink messages of the first type in accordance with the rate splitting procedure.

In some examples of the method, apparatuses, and non-transitory computer-readable medium described herein, transmitting the capability message may include operations, features, means, or instructions for transmitting, via the capability message, an indication that, when a quantity of component carriers in a set of component carriers configured for communications by the UE may be greater than the maximum quantity, the UE supports the second UE processing capability on a component carrier associated with a lowest cell index value from among a set of multiple cell index values associated with the set of component carriers configured for communications by the UE and supports the first UE processing capability for each other component carrier included in the set of component carriers configured for communications by the UE.

In some examples of the method, apparatuses, and non-transitory computer-readable medium described herein, transmitting the capability message may include operations, features, means, or instructions for transmitting, via the capability message, an indication that, when a quantity of component carriers configured for communications by the UE may be greater than the maximum quantity, the UE supports the first UE processing capability for each component carrier included in the quantity of component carriers configured for communications by the UE.

In some examples of the method, apparatuses, and non-transitory computer-readable medium described herein, transmitting the one or more capability messages may include operations, features, means, or instructions for transmitting, via the one or more capability messages, an indication of a respective first set of UE capabilities and a respective second set of UE capabilities for each SCS of a set of multiple SCSs supported by the UE.

In some examples of the method, apparatuses, and non-transitory computer-readable medium described herein, transmitting the one or more capability messages may include operations, features, means, or instructions for transmitting, via the one or more capability messages, an indication of a respective first set of UE capabilities and a respective second set of UE capabilities for each type of reception of a set of multiple types of reception supported by the UE, where the set of multiple types of reception include a first type based on successive interference cancelation, a second type based on joint demodulation and decoding of a second portion of the downlink message including the respective second information for the UE and the at least one other UE, or a third type based on joint demodulation without decoding of the second portion of the downlink message.

A method for wireless communication at a UE is described. The method may include transmitting an uplink message including a set of one or more communication parameters associated with reception by the UE of one or more downlink messages, where at least one downlink message of the one or more downlink messages may include a respective first portion with first information for the UE and a respective second portion with second information for the UE and at least one other UE based on a rate splitting procedure and receiving the one or more downlink messages, where a data rate associated with the one or more downlink messages is less than or equal to a maximum data rate that is associated with the rate splitting procedure and based on the set of one or more communication parameters indicated via the uplink message.

An apparatus is described. The apparatus may include a memory, a transceiver, and at least on processor of a UE, the at least one processor coupled with the memory and the transceiver. The at least one processor may be configured to transmit an uplink message including a set of one or more communication parameters associated with reception by the UE of one or more downlink messages, where the at least one downlink message of the one or more downlink messages may include a respective first portion with first information for the UE and a respective second portion with second information for the UE and at least one other UE based at least in part on a rate splitting procedure and receive the one or more downlink messages, where a data rate associated with the one or more downlink messages is less than or equal to a maximum data rate that is associated with the rate splitting procedure and based on the set of one or more communication parameters indicated via the uplink message.

Another apparatus for wireless communication at a UE is described. The apparatus may include means for transmitting an uplink message including a set of one or more communication parameters associated with reception by the UE of one or more downlink messages, where the at least one downlink message of the one or more downlink messages may include a respective first portion with first information for the UE and a respective second portion with second information for the UE and at least one other UE based on a rate splitting procedure and means for receiving the one or more downlink messages, where a data rate associated with the one or more downlink messages is less than or equal to a maximum data rate that is associated with the rate splitting procedure and based on the set of one or more communication parameters indicated via the uplink message.

A non-transitory computer-readable medium storing code for wireless communication at a UE is described. The code may include instructions executable by a processor to transmit an uplink message including a set of one or more communication parameters associated with reception by the UE of one or more downlink messages, where at least one downlink message of the one or more downlink messages may include a respective first portion with first information for the UE and a respective second portion with second information for the UE and at least one other UE based at least in part on a rate splitting procedure and receive the one or more downlink messages, where a data rate associated with the one or more downlink messages is less than or equal to a maximum data rate that is associated with the rate splitting procedure and based on the set of one or more communication parameters indicated via the uplink message.

In some examples of the method, apparatuses, and non-transitory computer-readable medium described herein, receiving the one or more downlink messages may include operations, features, means, or instructions for receiving a first subset of the one or more downlink messages that may be in accordance with the rate splitting procedure and receiving a second subset of the one or more downlink messages that may be not in accordance with the rate splitting procedure, where the data rate may be associated with both the first subset and the second subset of the one or more downlink messages based on the set of one or more communication parameters.

Some examples of the method, apparatuses, and non-transitory computer-readable medium described herein may further include operations, features, means, or instructions for receiving one or more second downlink messages that may be not in accordance with the rate splitting procedure, where a second data rate associated with the one or more second downlink messages may be different than the maximum data rate associated with the one or more downlink messages.

In some examples of the method, apparatuses, and non-transitory computer-readable medium described herein, receiving the one or more downlink messages may include operations, features, means, or instructions for receiving the respective first portions and the respective second portions of each of the one or more downlink messages in accordance with the data rate based on the set of one or more communication parameters.

In some examples of the method, apparatuses, and non-transitory computer-readable medium described herein, receiving the one or more downlink messages may include operations, features, means, or instructions for receiving the respective second portions of each of the one or more downlink messages in accordance with the data rate based on the set of one or more communication parameters and receiving the respective first portions of each of the one or more downlink messages in accordance with a second data rate that may be different than the data rate.

In some examples of the method, apparatuses, and non-transitory computer-readable medium described herein, the data rate may be based on a data rate function and the set of one or more communication parameters.

In some examples of the method, apparatuses, and non-transitory computer-readable medium described herein, the set of one or more communication parameters includes a quantity of layers, a modulation order, and a scaling factor associated with the respective second portions of the one or more downlink messages.

A method for wireless communication at a network entity is described. The method may include receiving an uplink message including a set of one or more communication parameters associated with reception by a UE of one or more downlink messages, where at least one downlink message of the one or more downlink messages may include a respective first portion with first information for the UE and a respective second portion with second information for the UE and at least one other UE based on a rate splitting procedure, determining a maximum data rate for the UE that is associated with the rate splitting procedure based on the set of one or more communication parameters indicated via the uplink message, and transmitting the one or more downlink messages to the UE, where a data rate associated with the one or more downlink messages is less than or equal to the maximum data rate.

An apparatus is described. The apparatus may include a memory, a transceiver, and at least on processor of a network entity, the at least one processor coupled with the memory and the transceiver. The at least one processor may be configured to receive an uplink message including a set of one or more communication parameters associated with reception by a UE of one or more downlink messages, where at least one downlink message of the one or more downlink messages may include a respective first portion with first information for the UE and a respective second portion with second information for the UE and at least one other UE base at least in part on a rate splitting procedure, determine a maximum data rate for the UE that is associated with the rate splitting procedure based on the set of one or more communication parameters indicated via the uplink message, and transmit the one or more downlink messages to the UE, where a data rate associated with the one or more downlink messages is less than or equal to the maximum data rate.

Another apparatus for wireless communication at a network entity is described. The apparatus may include means for receiving an uplink message including a set of one or more communication parameters associated with reception by a UE of one or more downlink messages, where at least one downlink message of the one or more downlink messages may include a respective first portion with first information for the UE and means for a respective second portion with second information for the UE and at least one other UE based on a rate splitting procedure, means for determining a maximum data rate for the UE that is associated with the rate splitting procedure based on the set of one or more communication parameters indicated via the uplink message, and means for transmitting the one or more downlink messages to the UE, where a data rate associated with the one or more downlink messages is less than or equal to the maximum data rate.

A non-transitory computer-readable medium storing code for wireless communication at a network entity is described. The code may include instructions executable by a processor to receive an uplink message including a set of one or more communication parameters associated with reception by a UE of one or more downlink messages, where at least one downlink message of the one or more downlink messages may include a respective first portion with first information for the UE and a respective second portion with second information for the UE and at least one other UE based at least in part on a rate splitting procedure, determine a maximum data rate for the UE that is associated with the rate splitting procedure based on the set of one or more communication parameters indicated via the uplink message, and transmit the one or more downlink messages to the UE, where a data rate associated with the one or more downlink messages is less than or equal to the maximum data rate.

In some examples of the method, apparatuses, and non-transitory computer-readable medium described herein, transmitting the one or more downlink messages may include operations, features, means, or instructions for transmitting a first subset of the one or more downlink messages that may be in accordance with the rate splitting procedure and transmitting a second subset of the one or more downlink messages that may be not in accordance with the rate splitting procedure, where the data rate may be associated with both the first subset and the second subset of the one or more downlink messages based on the set of one or more communication parameters.

Some examples of the method, apparatuses, and non-transitory computer-readable medium described herein may further include operations, features, means, or instructions for transmitting one or more second downlink messages that may be not in accordance with the rate splitting procedure, where a second data rate associated with the one or more second downlink messages may be different than the maximum data rate associated with the one or more downlink messages.

In some examples of the method, apparatuses, and non-transitory computer-readable medium described herein, transmitting the one or more downlink messages may include operations, features, means, or instructions for transmitting the respective second portions of each of the one or more downlink messages in accordance with the data rate based on the set of one or more communication parameters and transmitting the respective first portions of each of the one or more downlink messages in accordance with a second data rate that may be different than the data rate.

DETAILED DESCRIPTION

Figure 1:
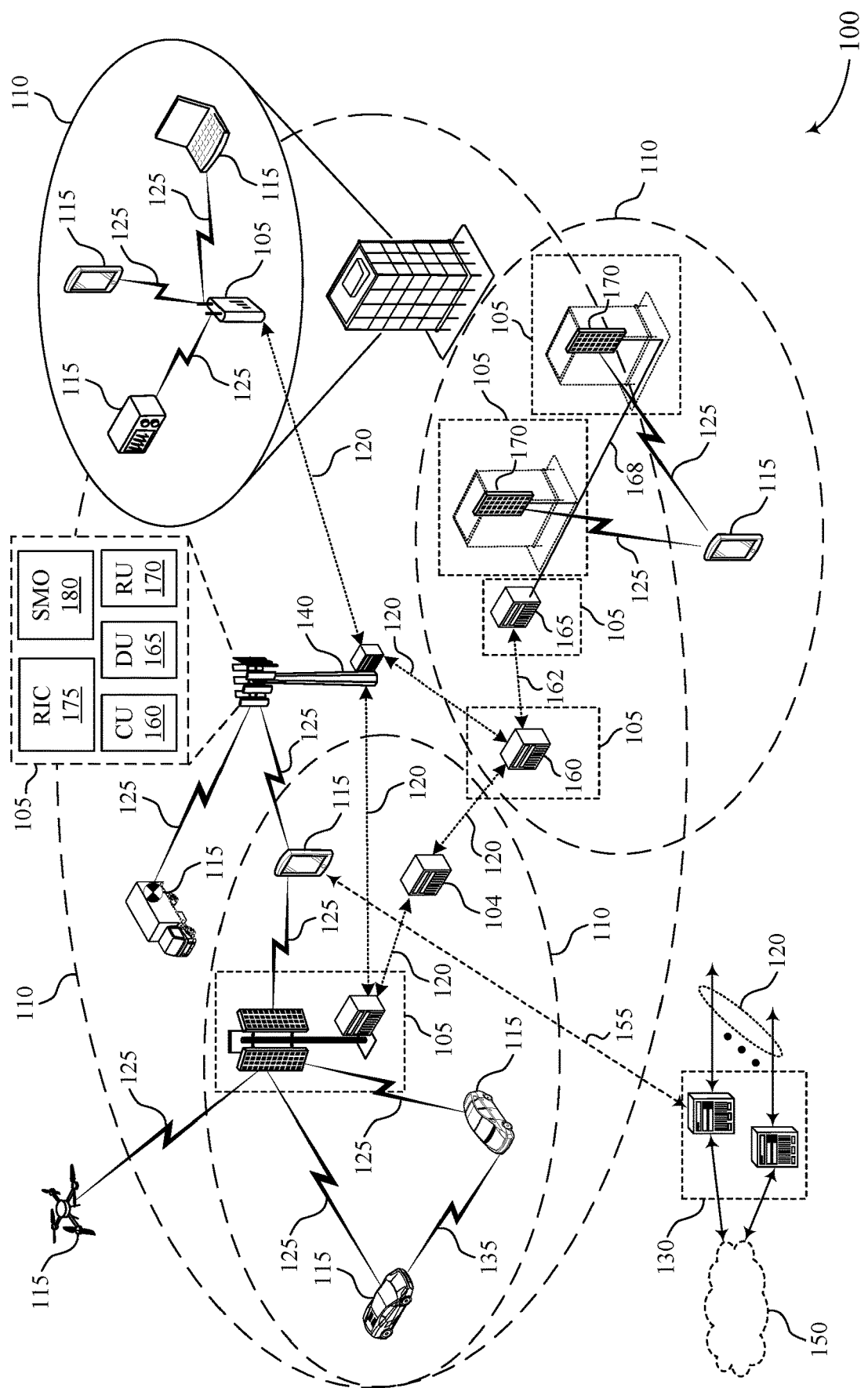
FIG. 1 illustrates an example of a wireless communications system that supports user equipment (UE) processing capability for wireless communications with rate splitting in accordance with one or more aspects of the present disclosure.

In some wireless communications, a network entity may transmit a downlink message to a user equipment (UE) via a downlink channel, such as a physical downlink shared channel (PDSCH). The UE may transmit feedback (e.g., an acknowledgment (ACK) or negative acknowledgment (NACK)) to the network entity in response to the downlink message. A time period for the UE to process the downlink message before transmitting the feedback may be referred to as a PDSCH processing time. The UE may transmit a feedback message starting in a first symbol that is at least the PDSCH processing time after a final symbol of the downlink message. The PDSCH processing time may be based on a processing capability of the UE, a subcarrier spacing (SCS), a quantity of demodulation reference signal (DMRS) symbols configured for communications, or any combination thereof. In some cases, the UE may support rate splitting, where a message may be split into a private portion that includes information for the UE and a common portion that includes information for the UE and at least one other UE.

Additionally, or alternatively, the UE may support reception of a downlink message that includes a common data stream, or the UE may support reception of a downlink message with an interference cancelation capability (e.g., a successive interference cancelation capability). In such cases, the UE may demodulate, decode, and re-encode each of the two or more portions of the downlink message, which may increase a time for the UE to processing the downlink message (e.g., the PDSCH processing time may not be sufficient).

Techniques, systems, and devices described herein provide for a UE and a network entity to account for a processing time associated with rate splitting when performing communications. The network entity may transmit control signaling, such as downlink control information (DCI) that schedules a downlink message and a set of one or more uplink symbols for conveying feedback in response to the downlink message. The network entity may schedule the downlink message and the set of one or more uplink symbols such that a time period between a final symbol of the downlink message and a first symbol of the set of one or more uplink symbols provides sufficient time for the UE to process a downlink message that includes a common portion. In some aspects, a first portion of the time period may be based on the PDSCH processing time for the UE when rate splitting is not applied (e.g., a normal or baseline time) and a second portion of the time period may correspond to an offset (e.g., a relaxation offset) that may be added to the PDSCH processing time. The offset may be based on one or more capabilities of the UE that are associated with one or more rate splitting parameters, such as a processing capability of the UE when receiving downlink messages that include a common portion, a type of reception supported by the UE when receiving the downlink messages with the common portion, a quantity of the downlink messages supported by the UE per slot, or any combination thereof.

In some aspects, the UE may transmit one or more capability messages to the network entity to report a first set of capabilities of the UE associated with rate splitting and a second set of capabilities of the UE that are not associated with rate splitting. The first set of UE capabilities may correspond to capabilities the UE supports for receiving a first type of downlink message that includes a common portion. The second set of UE capabilities may correspond to capabilities the UE supports for receiving a second type of downlink message that does not include the common portion. The capabilities indicated via the first set, the second set, or both may include, for example, a UE processing capability, a quantity of downlink messages supported by the UE per slot, a quantity of component carriers supported by the UE, a type of reception supported by the UE, or any combination thereof. The network entity may utilize the first set of UE capabilities, the second set of UE capabilities, or any combination thereof, as well as one or more other communication parameters, such as a quantity of component carriers and an SCS, to determine communication parameters for transmission of a downlink message to the UE. The communication parameters may include a quantity of downlink messages to transmit per slot, an application of rate splitting to a downlink message (e.g., whether the downlink message includes a common data stream), or both.

In some cases, a UE may support a maximum downlink data rate for a given quantity of aggregated component carriers in a band or band combination. The UE, a network entity in communication with the UE, or both may calculate the maximum data rate based on one or more communication parameters, such as the quantity of aggregated component carriers, a quantity of layers, a modulation order, a scaling factor, or any combination thereof for wireless communications between the network entity and the UE. Techniques, systems, and devices described herein provide for the network entity and the UE to account for rate splitting when calculating the maximum data rate. For example, the UE may report parameters associated with downlink messages that have been split into a common stream and a private stream. The network entity, the UE, or both, may utilize the parameters for the common data stream to calculate a maximum data rate to be applied to future downlink messages. The calculated data rate may be applied to all downlink messages, to downlink messages that are split into private and common portions, or to the common portions of the downlink messages that are split into the private and common portions.

Aspects of the disclosure are initially described in the context of wireless communications systems. Additional aspects of the disclosure are described with reference to rate splitting transmission schemes, rate splitting reception schemes, downlink channel processing timelines, and process flows. Aspects of the disclosure are further illustrated by and described with reference to apparatus diagrams, system diagrams, and flowcharts that relate to UE processing capability for wireless communications with rate splitting.

FIG. 1 illustrates an example of a wireless communications system 100 that supports UE processing capability for wireless communications with rate splitting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support UE processing capability for wireless communications with rate splitting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques, systems, and devices described herein provide for a network entity 105 and a UE 115 to perform wireless communications based on one or more UE capabilities and communication parameters associated with rate splitting. The network entity 105 may schedule the wireless communications. For example, the network entity 105 may transmit control signaling that schedules a downlink message and a set of uplink symbols for transmission of feedback in response to the downlink message. In some aspects, the downlink message may be split and may include a first portion with information for the UE 115 (e.g., a private portion) and a second portion with information for the UE 115 and at least one other UE 115 (e.g., a common portion). The UE 115 may support a first set of UE capabilities and communication parameters for receipt of a downlink message that includes two or more portions in accordance with a rate splitting procedure and a second set of UE capabilities and communication parameters for receipt of a downlink message that is not associated with the rate splitting procedure. In some aspects described herein, the network entity 105 may schedule the uplink symbols for conveying feedback such that a time period between a final symbol of the downlink message and a first symbol of the uplink symbols provides sufficient time for the UE 115 to process a downlink message associated with rate splitting. For example, the network entity 105 may apply an offset to a downlink channel processing time supported by the UE 115.

In some other aspects, the UE 115 may report both the first and second sets of UE capabilities, and the network entity 105 may determine scheduling information for the downlink message based on one or both of the first and second sets of UE capabilities. In some other aspects, the UE 115 may transmit an uplink message that indicates communication parameters associated with one or more downlink messages transmitted in accordance with the rate splitting procedure. The network entity 105 may determine a data rate for transmission of one or more downlink messages based on the communication parameters reported by the UE 115. The wireless communication devices described herein may thereby support transmission and reception of downlink messages that include at least two portions based on a rate splitting procedure. By accounting for UE capabilities and parameters when rate splitting is applied, the devices may improve throughput and reliability of the wireless communications.

Figure 2A:
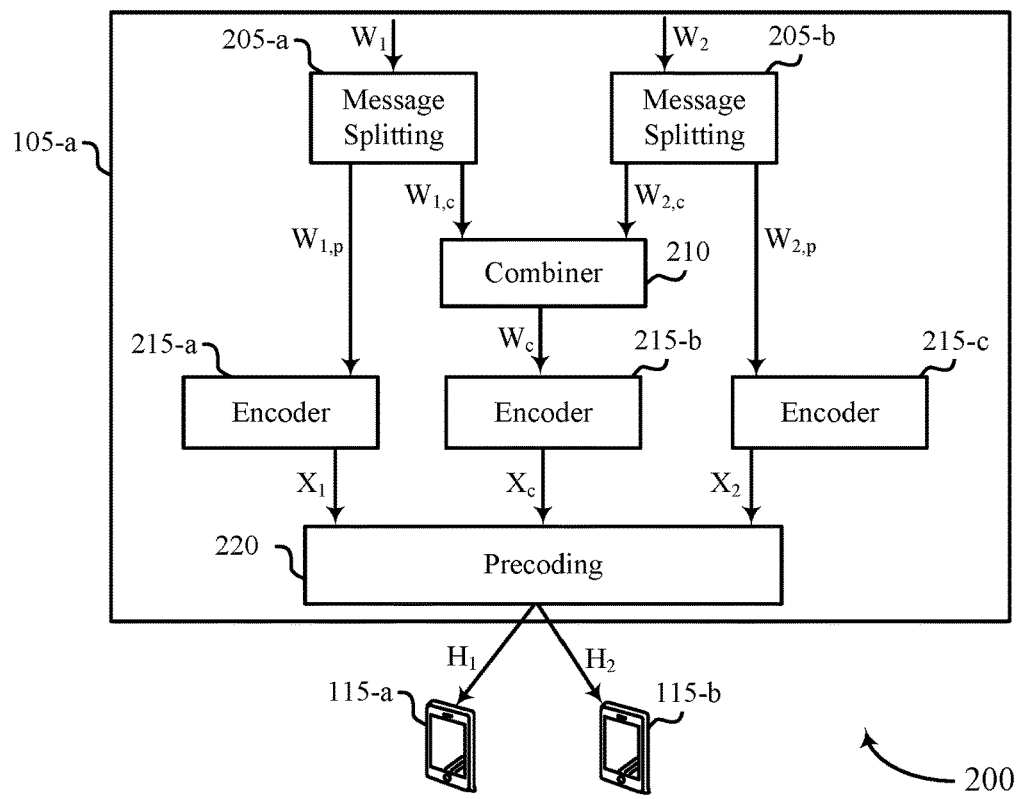
FIGS. 2A and 2B illustrate examples of rate splitting transmission and reception schemes that support UE processing capability for wireless communications with rate splitting in accordance with one or more aspects of the present disclosure.
Figure 2B:
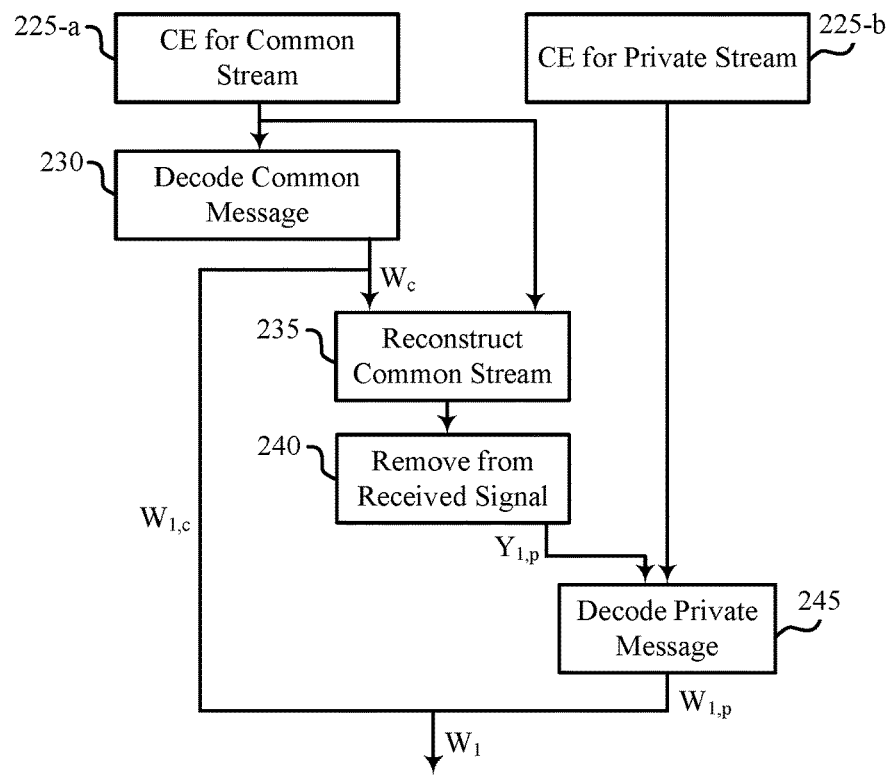

FIGS. 2A and 2B illustrate an example of a rate splitting transmission scheme 200 and a rate splitting reception scheme 201 that support UE processing capability for wireless communications with rate splitting in accordance with one or more aspects of the present disclosure. The rate splitting transmission scheme 200 and the rate splitting reception scheme 201 may implement or be implemented by aspects of the wireless communications system 100 as described with reference to FIG. 1. For example, the rate splitting transmission scheme 200 and the rate splitting reception scheme 201 illustrate schemes for generating, transmitting, receiving, and decoding downlink transmissions by a network entity 105-a, a UE 115-a, and a UE 115-b, which may represent examples of a network entity 105 and a UE 115 as described with reference to FIG. 1. In this example, the network entity 105-a may apply a rate splitting procedure in accordance with the transmission scheme 200 to split downlink messages for transmission to the UE 115-a and the UE 115-b, which may represent examples of co-scheduled UEs 115. The UE 115-a, the UE 115-b, or both may receive and demodulate or decode the downlink messages in accordance with the reception scheme 201 or some other reception scheme.

In wireless communications, rate-splitting techniques may be used to improve characteristics of communication channels, including degrees of freedom and capacity of wireless channels. In such approaches, messages destined for various UEs may be split into "common" parts and "private" parts. The common parts of messages for the various UEs may be combined in a single common codeword (CW), and each of the private parts may be maintained separate in respective private CWs (for example, on a per-UE basis). The common CW may be transmitted to multiple UEs 115 and each private CW may each respectively be transmitted to each of the multiple UEs 115, so that each UE 115 may receive their entire respective messages.

For example, as depicted in FIG. 2A, the UE 115-a and the UE 115-b may each have a message that they are to receive, depicted as $W_1$ and $W_2$. Each of the messages $W_1$ and $W_2$ may be split via message splitting 205-a and message splitting 205-b, respectively. The message splitting 205-a for the message $W_1$ may result in $W_{1,p}$, representing a portion of the message corresponding to a private CW for the UE 115-a, and $W_{1,c}$, representing a portion of the message that is common to the UE 115-a and the UE 115-b and corresponds to a common CW. The message splitting 205-b for the message $W_2$ may result in $W_{2,p}$, representing a portion of the message corresponding to a private CW for the UE 115-b, and $W_{2,c}$, representing the common portion of the message corresponding to the common codeword. The splitting between the private and common messages or codewords may be determined or selected based on one or more characteristics of a channel, one or more wireless devices, or any combination thereof.

The combiner 210 may combine the common portions of the messages, $W_{1,c}$ and $W_{2,c}$, resulting in a common message $W_c$, which may include one or more layers. Each of $W_{1,p}$, $W_c$, and $W_{2,p}$ may be encoded and modulated by the encoder 215-a, the encoder 215-b, and the encoder 215-c, respectively, resulting in separate CWs $X_1$, $X_c$, and $X_2$, which may be referred to as streams, in some aspects (e.g., private streams $X_1$ and $X_2$ and common stream $X_c$). Each of the CWs $X_1$, $X_c$, and $X_2$ may include one or more layers. In some aspects, the encoders 215 may include one or more additional operations, including modulation, layer mapping, other operations, or any combination thereof. For example, the encoders 215 may modulate the streams and map the streams to one or more layers, including CW-layer mapping, in some aspects.

The private streams $X_1$ and $X_2$, and the common stream $X_c$ may be processed by one or more precoders through the precoding 220. The private streams $X_1$ and $X_2$ may be precoded by precoders $P_1$ and $P_2$, respectively. The common stream $X_c$ may be precoded by a precoder $P_c$. The precoding 220 may be performed by one or more precoder components (e.g., one precoder for each of the three streams illustrated in FIG. 2A). After the streams are precoded, the streams may be transmitted by transmit antennas of the network entity 105-a to the respective UEs 115. In some aspects, the network entity 105-a may represent a single network entity 105 or TRP, and the streams may be transmitted from the single TRP. Additionally, or alternatively, the network entity 105-a may represent a collection of two or more TRPs, for example during a coordinated multi-point transmission and reception (CoMP) scenario. In such cases, the precoded streams may be transmitted from the one or more different TRPs.

The resulting transmission may include a received signal, $Y_1$, received at the UE 115-a and a second received signal, $Y_2$, received at the UE 115-b. Each of the first and second received signals may include the common portion and the private portions of the streams. However, the precoding 220 may be done in such a way that a signal strength of the private portion of the message that is received by one of the UEs 115, but is intended for the other UE 115, may be relatively low and may be treated as interference. For example, the first received signal $Y_1$ that is intended for the UE 115-a may be represented by $Y_1 = H_1 P_c X_c + H_1 P_1 X_1 + H_2 P_2 X_2 + N_1$, where $N_1$ may represent thermal noise and the $H_2 P_2 X_2$ portion, which may correspond to the private stream intended for the UE 115-b, may be associated with a relatively low signal strength or may be equal to zero, in some aspects. The UE 115-b may similarly receive the second received signal Y2 that may be represented by $Y_2 = H_2 P_2 X_2 + H_2 P_c X_c + H_1 P_1 X_1 + N_2$. In this way, each UE 115 receives the private portion of its message that is transmitted to that UE 115, while also receiving the common portion of the message that is transmitted to both the UE 115-a and the UE 115-b.

In FIG. 2B, an example reception scheme 201 for rate splitting is depicted. The example reception scheme 201 illustrates a process for the UE 115-a to receive and decode the message $W_1$ intended for the UE 115-a. Although the rate splitting reception scheme 201 is described with reference to the UE 115-a, it is to be understood that the rate splitting reception scheme 201 may be performed by one or both of the UEs 115-a and 115-b illustrated in FIG. 2A. The UE 115-a may receive the transmission (for example, $Y_1$) destined for the UE 115-a, and the UE 115-a may then first decode the common message, $W_c$. Decoding the common message may be done for multiple purposes. First, some part of the individual message for each UE 115 ($W_{1,c}$ and $W_{2,c}$) may be embedded in the common message $W_c$, which is the data intended for that UE 115. Second, successive interference cancelation or joint demodulation/decoding may be used to decode the private message. In the example of FIG. 2B, the UE 115-a performs successive interference cancelation to decode the private message.

To perform successive interference cancelation, the UE 115-a may estimate the effective channel (e.g., at channel estimation (CE) for Common Stream 225-a) corresponding to the common stream (e.g., $H_1 P_c$), estimate the common message $W_c$ (e.g., at Decode Common Message 230), re-encode to the common stream $X_c$ (e.g., at Reconstruct Common Stream 235), multiply the re-encoded common stream $X_c$ by the estimated effective channel, and subtract the result from the received signal (e.g., at Remove from Received Signal 240). The steps 225-a, 230, 235, and 240 may produce a signal, $Y_{1,p}$, where $Y_{1,p} = Y_1 -$ $H_1 P_c X_c = H_1 P_1 X_1 + H_2 P_2 X_2 + N_1$ (assuming successful decoding of the common message $W_c$ and ideal channel estimation).

The UE 115-a may subsequently decode the private message using $Y_{1,p}$ (e.g., at Decode Private Message 245), which may also incorporate or utilize a result of the CE for Private Stream 225-b. The decoded private message may correspond to $W_{1,p}$. Optionally, the decoding may also include demodulation, demapping (e.g., from one or more layers), other processing, or any combination thereof. The UE 115-a may combine a portion of the common message $W_{1,c}$ and the private message $W_{1,p}$ to recover the full message destined for the UE 115-a ($W_1$).

While the focus of FIG. 2B is on successive interference cancelation decoding, in some aspects, the UE 115-a may jointly demodulate the common stream and the private stream, and the UE 115-a may separately decode the corresponding private CW and common CW. For example, the UE 115-a may decode the common message and the private message at the same time or different times, and the decoding of the private message may be independent from the decoding of the common message. That is, the UE 115-a may not utilize the information obtained from decoding the common message to assist with decoding the private message. The joint demodulation of the common stream and the private stream may assist with interference cancelation. As such, a UE 115 that is capable of separately decoding the private and common portions of the downlink messages with joint demodulation may support an interference cancelation capability.

In some aspects, one or more messages intended for one or more co-scheduled UEs 115 may not be rate split. For example, with reference to FIG. 2A, the message splitting 205-a may not occur for the message $W_1$ intended for the UE 115-a, in some aspects. That is, in some aspects, the message $W_1$ may not be split into a private portion and a common portion. In such cases, the combiner 210 may not be utilized and the common CW $W_c$ may correspond to the common portion of the message $W_2$ intended for the UE 115-b (e.g., the message $W_2$ may still be split at 205-b). If there are more than two co-scheduled UEs 115, the common message may include part of the individual messages for only a subset of the more than two co-scheduled UEs 115. In the example of FIG. 2A, there are two co-scheduled UEs 115 and the subset may include the UE 115-b. In such cases, the UE 115-b may decode the common message because the common message may include intended information for the UE 115-b. To decode the common message, the UE 115-b may determine DMRS ports for the common stream (e.g., at the CE for Common Stream 225-a in FIG. 2B), a modulation order for the common stream, and HARQ related information for the common stream (e.g., transport block size (TBS), a coding rate, a new data indicator (NDI), a redundancy version (RV), or the like).

However, if the message $W_1$ is not split, the common message may not include information for the UE 115-a, and the UE 115-a may refrain from decoding the common message at 230 unless the UE 115-a wishes to perform successive interference cancelation to increase a probability and accuracy of decoding the message $W_1$ for the UE 115-a. If the UE 115-a performs successive interference cancelation, the UE 115-a may follow the reception scheme 201 illustrated in FIG. 2B. If the UE 115-a refrains from performing successive interference cancelation, the UE 115-a may perform joint demodulation or soft interference cancelation, in some aspects. To perform joint demodulation, the UE 115-a may determine the DMRS ports of the common stream to use for performing the channel estimation for one or more layers of the common stream (e.g., at CE for Common Stream 225-a). The UE 115-a may additionally, or alternatively, determine a modulation order of the common stream or common codeword so the UE 115-a may perform demodulation. The UE 115-a may refrain from determining HARQ related information for the common message because the UE 115-a may not decode the common message. In this case, the UE 115-a may reduce processing complexity and power consumption by refraining from decoding the common message, but the UE 115-a may reduce interference by jointly demodulating the private message and the common message.

A network entity 105 may thereby split one or more messages intended for one or more co-scheduled UEs 115 into respective private portions and common portions comprising information for one or more of the co-scheduled UEs 115. Each UE 115 may perform successive interference cancelation, joint demodulation and separate decoding, or joint demodulation without decoding the common message to obtain the information that is intended for the respective UE 115. The splitting of one or more co-scheduled downlink messages into private and common portions may improve interference cancelation techniques. In this way, the wireless communications system may utilize rate splitting to improve characteristics of communication channels, including degrees of freedom and capacity of wireless channels.

In some aspects, each UE 115 may support one or more receiver types for rate split wireless communications. The receiver types may correspond to successive interference cancelation, joint demodulation and decoding of a common portion of a downlink message, or joint demodulation without decoding the common portion of the downlink message. A first receiver type associated with successive interference cancelation (e.g., receiver type 1) may correspond to a UE 115 that is capable of decoding a common message and re-encoding the common message. The UE 115 may support the reception scheme 201 illustrated in FIG. 2B to decode the common message at 230, re-encode the common message at 235 and utilize the re-encoded common message to improve accuracy when decoding the private message at 245. The UE 115 may support the first receiver type and perform successive interference cancelation regardless of whether the common message contains information for the UE 115 (e.g., whether the message intended for the UE 115 was rate split or not).

A second receiver type associated with joint demodulation and decoding of the common portion of the downlink message (e.g., receiver type 2) may correspond to a UE 115 that is capable of decoding the common message and jointly demodulating the private and common streams but is not capable of re-encoding the common message. That is, the UE 115 may not support reconstructing the common stream 235, removing the common stream from the received signal 240, or both. In this case, at least a portion of the common message may include information intended for the UE 115. If the common message does not include information intended for the UE 115, and because the UE 115 does not support successive interference cancelation, the UE 115 may refrain from decoding the common message.

A third receiver type associated with joint demodulation without decoding of the common portion of the downlink message (e.g., receiver type 3) may correspond to a UE 115 that is capable of jointly demodulating the private and common streams but is not capable of decoding the common message (e.g., the UE 115 may not support more than one decode). In this case, the network entity 105 may not split the message intended for the UE 115, and the common message may not include information for the UE 115 because the UE 115 is not capable of decoding the common message.

A UE 115 may support any one or more of the receiver types for receiving wireless communications with rate splitting. In some aspects, the UE 115 may transmit signaling to a network entity 105 to indicate which receiver type(s) are supported by the UE 115. The network entity 105 may utilize the information related to the receiver type to schedule communications with the UE 115. In some cases, some scheduling information determined by the network entity 105 may not account for complexity at the UE 115 due to rate splitting applied to the communications. For example, the scheduling information determined by the network entity 105 may be the same regardless of whether rate splitting is applied or not. In some aspects, rate splitting as used herein may refer to transmission and reception of a message (e.g., a PDSCH) that includes a common stream or transmission and reception of a message with interference cancelation capability (e.g., the common and private portions may support interference reduction or cancelation, such as via successive interference cancelation).

Techniques, systems, and devices described herein provide for a UE 115 and a network entity 105 to determine and signal an impact of rate splitting on one or more communication parameters. The UE 115 and the network entity 105 may determine an impact of rate splitting on a processing time for downlink communications at the UE 115, an impact of rate splitting on a quantity of downlink transmissions per slot that is supported by the UE 115, on a downlink data rate that is supported by the UE 115, or any combination thereof. Such techniques for quantifying an impact of rate splitting on wireless communications are described in further detail elsewhere herein, including with reference to FIGS. 3-7.

Figure 3:
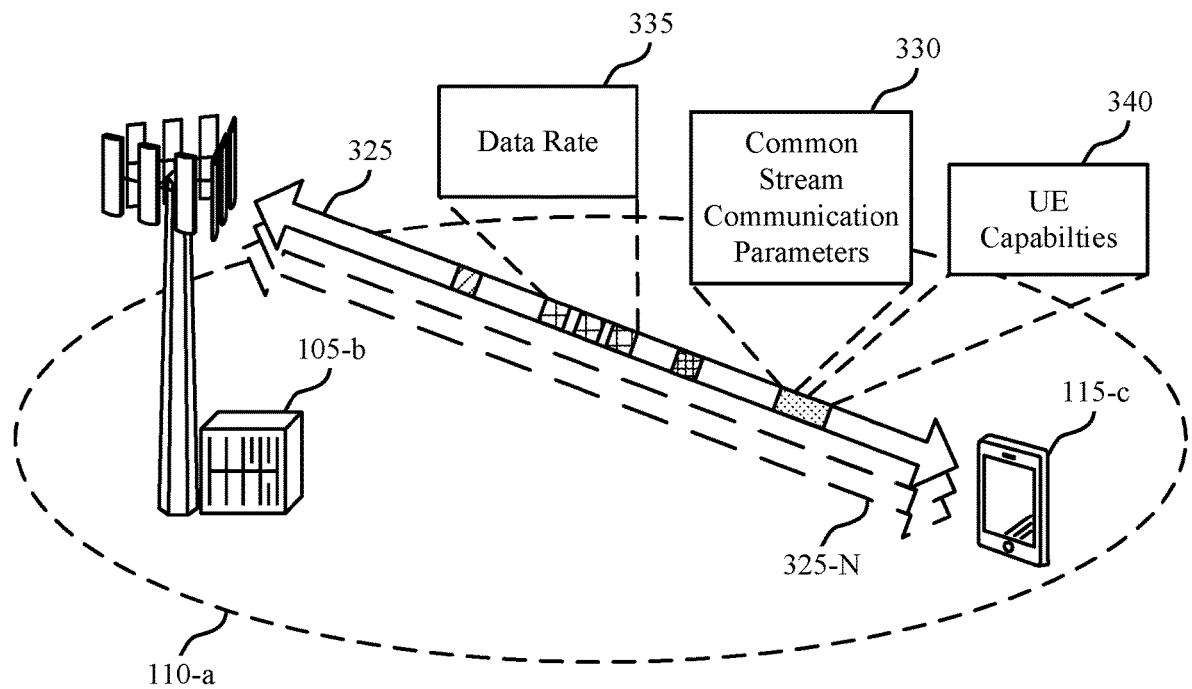
FIG. 3 illustrates an example of a wireless communications system that supports UE processing capability for wireless communications with rate splitting in accordance with one or more aspects of the present disclosure.
Figure 3:
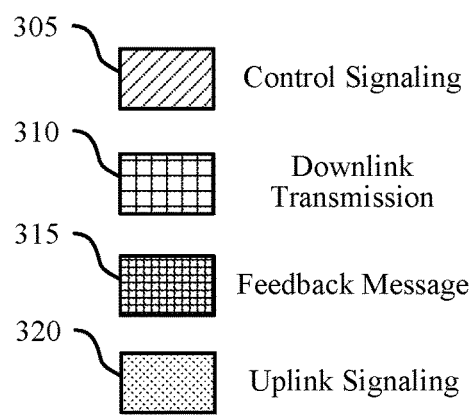

FIG. 3 illustrates an example of a wireless communications system 300 that supports UE processing capability for wireless communications with rate splitting in accordance with one or more aspects of the present disclosure. The wireless communications system 300 may implement or be implemented by aspects of the wireless communications system 100, the transmission scheme 200, and the reception scheme 201, as described with reference to FIGS. 1 and 2. For example, the wireless communications system 300 may include a network entity 105-*b* and a UE 115-*c*, which may represent examples of a network entity 105 and a UE 115 as described with reference to FIGS. 1 and 2. The network entity 105-*b* may communicate with the UE 115-*c* within a geographic coverage area 110-*a* and via one or more component carriers 325, which may represent examples of communication links in some aspects described herein. In some aspects, the network entity 105-*c* may apply rate splitting to one or more downlink transmissions 310 to the UE 115-*c* and one or more other co-scheduled UEs 115. The UE 115-*c* and the network entity 105-*c* may exchange signaling to determine an impact of the rate splitting on one or more communication parameters.

The network entity 105-*c* may transmit control signaling 305 to schedule downlink transmissions 310 to the UE 115-*c* and one or more other UEs 115. If the control signaling 305 schedules downlink transmissions to more than one UE 115, the UEs 115 may be referred to as co-scheduled UEs 115. The control signaling 305 may be DCI, or some other type of control message. The control signaling 305 may additionally, or alternatively, schedule uplink resources (e.g., physical uplink control channel (PUCCH) resources) for transmission of a feedback message 315 by the UE 115-*c* in response to the scheduled downlink transmissions 310.

A time period between a final symbol of the downlink transmission 310 and a starting symbol of the feedback message 315 may be based on a PDSCH processing time of the UE 115-*c*. The PDSCH processing time may correspond to a time for the UE 115-*c* to process the downlink transmission 310 and may be based on a UE processing capability, an SCS, a quantity of DMRS symbols, or any combination thereof. In some aspects, the time for the UE 115-*c* to process the downlink transmission 310 may be increased if the downlink transmission 310 is split into at least a private portion and a common portion, as described with reference to FIGS. 2A and 2B.

Techniques, systems, and devices described herein provide for the network entity 105-*b* and the UE 115-*c* to determine an adjusted timeline for the UE 115-*c* to transmit feedback in response to a downlink transmission 310 based on one or more UE capabilities 340 when rate splitting is applied. That is, the PDSCH processing time of the UE 115-*c* may be adjusted or complimented with one or more offset times to support rate splitting. Techniques for adjusting the feedback timing are described in further detail elsewhere herein, including with reference to FIG. 4.

In some aspects, the PDSCH processing timeline may remain the same with or without rate splitting. In such cases, techniques, systems, and devices described herein provide for the network entity 105-*b* to account for one or more parameters or UE capabilities 340 associated with rate splitting when scheduling downlink transmissions 310. For example, the UE 115-*c* may transmit uplink signaling 320 (e.g., one or more capability messages) that indicates a first set of UE capabilities 340 associated with downlink message that include private and common portions and a second set of UE capabilities 340 associated with downlink messages that are not split into private and common portions (e.g., a first set of rate splitting capabilities and a second set of other capabilities). In this example, by reporting the first set of UE capabilities 340 when rate splitting is applied, the UE 115-*c* may indicate conditions or parameters of downlink transmissions 310 that the UE 115-*c* is capable of supporting if rate splitting is applied to the downlink transmissions 310 and the PDSCH processing time is not increased (e.g., the UE 115-*c* may report surrounding conditions for rate splitting).

The network entity 105-*b* may utilize the reported UE capabilities 340 as well as one or more communication parameters to determine scheduling information for the downlink transmissions 310, the feedback message 315, or both. In this case, the PDSCH processing time may or may not remain the same as a PDSCH processing time configured for a UE processing capability of the UE 115-*c* without rate splitting (e.g., the relaxation offset may or may not be applied to the processing time for UE processing capability 1 or 2).

The UE 115-*c* may support one or more UE processing capabilities including at least a first UE processing capability (e.g., UE processing capability 1) or for the first UE processing capability and a second UE processing capability (e.g., UE processing capability 2). Each UE processing capability may be associated with a respective time period for the UE 115-*c* to process a downlink transmission (e.g., a respective PDSCH processing time). In some aspects, a duration of a PDSCH processing time associated with the first UE processing capability may be greater (longer) than a duration of a PDSCH processing time associated with the second UE processing capability. That is, the UE 115-*c* may take longer to process a downlink transmission 310 before transmitting a feedback message 315 if the UE 115-c operates according to the first UE processing capability than if the UE 115-c operates according to the second UE processing capability.

In some aspects, the UE capabilities 340 may indicate whether rate splitting is supported for the first UE processing capability (e.g., UE processing capability 1) or for both the first UE processing capability and the second UE processing capability (e.g., UE processing capability 2). If the UE 115-c indicates that rate splitting is supported for both UE processing capabilities, the network entity 105-b may be more likely to apply rate splitting to the downlink transmissions 310 to the UE 115-c. If the UE 115-c indicates that the rate splitting is supported for the first UE processing capability but not the second UE processing capability, and the UE 115-c supports the second UE processing capability, the network entity 105-b may refrain from applying rate splitting to the downlink transmissions 310 for the UE 115-c because the UE 115-c may not be able to process the downlink transmissions 310 if rate splitting is applied.

In some aspects, the UE capabilities 340 may indicate a quantity of downlink transmissions 310 (e.g., a quantity of PDSCHs) per slot that are supported by the UE 115-c for a given UE processing capability if rate splitting is applied to any one or more of the downlink transmissions 310. That is, the UE 115-c may report a quantity of downlink transmissions 310 per slot for UE processing capability 1 and UE processing capability 2 in the presence of rate splitting. In some aspects, the quantity of downlink transmissions 310 per slot may correspond to a total quantity of downlink transmissions 310, including downlink transmissions 310 to which rate splitting is applied and downlink transmissions 310 without rate splitting. In some other aspects, the quantity of downlink transmissions 310 per slot may correspond to a quantity of downlink transmissions 310 with rate splitting (e.g., with a common message). For example, the UE 115-c may indicate, via the UE capabilities 340, that for the first UE processing capability, a first quantity of downlink transmissions 310 with a common message are supported (e.g., four PDSCHs with common messages per slot, or some other quantity) and that for the second UE processing capability, a second quantity of downlink transmissions 310 with a common message are supported (e.g., one PDSCH with a common message per slot, or some other quantity).

In some other aspects, the UE 115-c may report both quantities of downlink transmissions 310 per slot via the UE capabilities 340. For example, the UE 115-c may indicate a total quantity of downlink transmissions 310 per slot, and the UE 115-c may indicate a second quantity of a subset of the total quantity of downlink transmissions 310 that correspond to rate split downlink transmissions 310 the UE 115-c supports per slot. In one aspect, the UE 115-c may indicate that, when operating according to the first UE processing capability, the UE 115-c supports four total downlink transmissions 310 per slot and two downlink transmissions 310 with common messages per slot. The UE 115-c may indicate that, when operating according to the second UE processing capability, the UE 115-c supports two total downlink transmissions 310 per slot and one downlink transmission with a common message per slot. The network entity 105-b may schedule one or more downlink transmissions 310 with or without rate splitting based on the indicated quantities.

In some aspects, the UE 115-c may report, via the UE capabilities 340, a quantity of component carriers 325 that are supported by the UE 115-c. The quantity of component carriers 325 may correspond to a maximum quantity of component carriers 325 for which the UE 115-c may support the second UE processing capability in the presence of rate splitting. For example, the UE 115-c may indicate that the UE 115-c supports the UE processing capability 2 for no more than four component carriers 325, or some other quantity. The UE 115-c may additionally, or alternatively, indicate a fallback behavior of the UE 115-c via the UE capabilities 340. For example, the UE 115-c may indicate that if a quantity of component carriers 325 in a set of component carriers 325 through 325-N configured for communications with the UE 115-c is greater than the indicated maximum quantity, the UE 115-c may support a processing time associated with the UE processing capability 2 on a component carrier 325 associated with a lowest cell index from among multiple cell indices associated with each of the set of configured component carriers 325. The UE 115-c may support a processing time associated with UE processing capability 1 on the other component carriers 325 of the set. Alternatively, the UE 115-c may indicate that the UE 115-c supports a processing time associated with the UE processing capability 1 if the quantity of component carriers 325 in the set of configured component carriers 325 is greater than the maximum quantity indicated by the UE 115-c (e.g., the UE 115-c may not support the UE processing capability 2 in this case).

The UE 115-c may report the first set of UE capabilities 340, the second set of UE capabilities 340, or both per SCS, per receiver type of the UE 115-c, or both. For example, the UE 115-c may report a different set of UE capabilities 340 that are supported by the UE 115-c for each SCS value of a set of potential SCS values. The network entity 105-b may select one of the sets of UE capabilities 340 based on a configured SCS. Additionally, or alternatively, the UE 115-c may report a different set of UE capabilities 340 that are supported by the UE 115-c for each receiver type from among potential receiver types of the UE 115-c. The receiver types may correspond to a first receiver type associated with successive interference cancelation, a second receiver type associated with joint demodulation with decoding of the common message, and a third receiver type associated with joint demodulation without decoding of the common message, as described in further detail with reference to FIGS. 2A and 2B. The UE 115-c may, in some aspects, indicate the receiver type of the UE 115-c to the network entity 105-b. The network entity 105-b may select a set of UE capabilities 340 based on the receiver type of the UE 115-c.

The UE 115-c may thereby indicate a first set of UE capabilities 340 if rate splitting is applied and a second set of UE capabilities 340 if rate splitting is not applied. The network entity 105-b may make scheduling decisions for the UE 115-c based on the UE capabilities 340. For example, the UE 115-c may support both processing capabilities 1 and 2, but if rate splitting is applied, the UE 115-c may not support the processing capability 2. Accordingly, the network entity 105-b may schedule downlink transmissions 310 with rate splitting and corresponding uplink resources for a feedback message 315 in accordance with a processing timeline supported by the UE processing capability 1. Or, the network entity 105-b may allocate the uplink resources according to a shorter UE processing timeline supported by the UE processing capability 2, but the network entity 105-b may not apply rate splitting to the downlink transmissions 310. Additionally, or alternatively, the network entity may adjust a quantity of downlink transmissions 310 per slot based on the UE capabilities 340.

In some cases, the network entity 105-*b* may transmit the downlink transmissions 310 to the UE 115-*c* in accordance with a data rate 335. The data rate 335 may correspond to a rate at which bits of data of the downlink transmissions 310 are transmitted to the UE 115-*c*. If rate splitting is not applied to the downlink transmissions 310, the data rate 335 for uplink and downlink communications via a given component carrier 325 or combination of component carriers 325 may be less than or equal to a maximum data rate. The maximum data rate may be calculated for a given quantity of aggregated component carriers 325 in a band or a band combination based on Equation 1.

$$\text{data rate} = 10^{-6} \sum_{j=1}^{J} \left( v_{Layers}^{(j)} Q_m^{(j)} f^{(j)} R_{max} \frac{N_{PRB}^{BW(j),\mu} 12}{T_s^{\mu}} (1 - OH^j) \right) \quad (1)$$

In the example of Equation 1, the maximum data rate may be in terms of megabytes per second (Mbps). J may represent a quantity of aggregated component carriers in a band or band combination. Rmax may be a constant (e.g., 948/1024, or some other constant). For the $j^{th}$ component carrier, $v_{Layers}^{(j)}$ may represent a maximum quantity of supported layers, which may be provided by a higher layer parameter (e.g., maxNumberMIMO-LayersPDSCH for downlink and maxNumberMIMO-LayersCB-PUSCH and maxNumberMIMO-LayersNonCB-PUSCH for uplink). For the $j^{th}$ component carrier, $Q_m^{(j)}$ may be the maximum supported modulation order, and may be provided by a higher layer parameter (e.g., supportedModulationOrderDL for downlink and supportedModulationOrderUL for uplink). For the $j^{th}$ component carrier, $f^{(j)}$ may be a scaling factor and may be provided by a higher layer parameter (e.g., scalingFactor). The scaling factor may be one of a set of one or more defined values (e.g., 1, 0.8, 0.75, and 0.4, or some other set of values). $OH^j$ may represent overhead and may be based on a frequency range of the communications. The data rate determined according to Equation 1 may thereby correspond to a maximum data rate the UE 115-*c* can support based on one or more communication parameters. The data rate determined according to Equation 1 may not account for an effect of rate splitting.

Techniques, systems, and devices described herein provide for the network entity 105-*b*, the UE 115-*c*, or both to determine a maximum data rate supported by the UE 115-*c* when rate splitting is applied to downlink transmissions 310 (e.g., a maximum data rate in the presence of rate splitting). The maximum data rate described herein may be based on one or more communication parameters 330 indicated by the UE 115-*c* via the uplink signaling 320. In this case, the communication parameters 330 may correspond to communication parameters associated with downlink transmissions 310 that include at least a common data stream (e.g., rate split downlink transmissions 310). For example, the downlink transmissions 310 may be split into a private portion and a common portion in accordance with the rate splitting procedure, as described with reference to FIG. 2A. The common portions of one or more downlink transmissions 310 may be referred to as a common stream herein. The UE 115-*c* may determine communication parameters for the common stream. The communication parameters 330 may be associated with the common data stream of one or more downlink transmissions 310, and may be referred to as common stream communication parameters 330, in some aspects.

The UE 115-*c* may determine the communication parameters based on control signaling 305 received at the UE 115-*c* (e.g., an RRC configuration), based on a defined set of parameters, based on one or more conditions associated with communications at the UE 115-*c*, based on a set of UE capabilities transmitted from the UE 115-*c*, or any combination thereof. In some aspects, the UE 115-*c* may estimate or calculate the communication parameters for the common stream based on communication parameters for both the private portions and the common portions of the downlink transmissions 310. The communication parameters may include, for example, a quantity of layers associated with the common stream $v_{layers,common}^{(j)}$ (e.g., a maximum quantity of supported layers), a modulation order associated with the common stream $Q_{m,common}^{(j)}$ (e.g., a maximum supported modulation order), and a scaling factor associated with the common stream $f_{common}^{(j)}$. The UE 115-*c* may indicate the common stream communication parameters 330 to the network entity 105-*b* via the uplink signaling 320 (e.g., as part of UE capability signaling).

The network entity 105-*b* may determine a maximum data rate that is supported by the UE 115-*c* when rate splitting is applied based on the common stream communication parameters 330 indicated via the uplink signaling 320. In some aspects, the maximum data rate may correspond to a total sum rate across multiple downlink transmissions 310 including downlink transmissions 310 associated with rate splitting and downlink transmissions 310 that are not associated with rate splitting (e.g., that do not include both a private and common portion). In such cases, the network entity 105-*b* may determine the total sum data rate for all downlink transmissions 310 based on Equation 2.

$$\text{data rate} = 10^{-6} \sum_{j=1}^{J} \left( v_{Layers}^{(j)} Q_m^{(j)} f^{(j)} R_{max} \frac{N_{PRB}^{BW(j),\mu} 12}{T_s^{\mu}} (1 - OH^j) + \right. \quad (2)$$

$$\left. v_{Layers,common}^{(j)} Q_{m,common}^{(j)} f_{common}^{(j)} R_{max} \frac{N_{PRB}^{BW(j),\mu} 12}{T_s^{\mu}} (1 - OH^j) \right)$$

The network entity 105-*b* may thereby schedule the downlink transmissions 310 such that the data rate 335 does not exceed the maximum data rate calculated according to Equation 2. The UE 115-*c* may monitor for all downlink transmissions 310 in a given band combination (e.g., component carriers 325 through 325-N) in accordance with the maximum data rate calculated according to Equation 2. That is, the UE 115-*c* may not expect to receive downlink transmissions 310 with a sum data rate 335 across the transmissions that exceeds the maximum data rate. In this case, the sum data rate 335 may correspond to a rate of data transmission across PDSCHs without rate splitting, as well as a rate of data transmissions across both the common stream and private streams of PDSCHs with rate splitting.

In some other aspects, the maximum data rate may correspond to a sum rate across downlink transmissions 310 that are associated with rate splitting. The maximum data rate may be applied to both the common stream and private stream of the downlink transmissions 310 with rate splitting. The maximum data rate may not be applied to downlink transmissions 310 that are not associated with rate splitting. In this case, the maximum data rate may be calculated according to Equation 2. The network entity 105-*b* may transmit one or more of the downlink transmissions 310 that are associated with rate splitting to the UE 115-*c* in accordance with a data rate 335 that is equal to or less than the maximum data rate calculated according to Equation 2. The UE 115-*c* may monitor for rate split downlink transmissions 310 (e.g., the common stream and the private stream) according to the maximum data rate. The network entity 105-*b* may transmit one or more other downlink transmissions 310 that are not rate split to the UE 115-*c* in accordance with a second data rate 335 that may be less than or equal to a second maximum data rate calculated according to Equation 1, for example (e.g., may not depend on the common stream communication parameters).

In some other aspects, the maximum data rate may correspond to a sum rate across the common portions of the downlink transmissions 310 associated with rate splitting (e.g., to the common stream). In this case, the network entity 105-*b*, the UE 115-*c*, or both may calculate the maximum data rate according to Equation 3.

$$\text{data rate} = \qquad (3)$$
$$10^{-6} \sum_{j=1}^{J} \left( v_{Layers,common}^{(j)} Q_{m,common}^{(j)} f_{common}^{(j)} R_{max} \frac{N_{PRB}^{BW(j),\mu} 12}{T_s^\mu} (1 - OH^j) \right)$$

As shown by Equation 3, the maximum data rate for the common stream may be based on the common stream communication parameters 330 and may not account for the other communication parameters. The network entity 105-*b* may transmit a common data stream including the common portions of one or more downlink transmissions 310 to the UE 115-*c* in accordance with a data rate 335 that is equal to or less than the maximum data rate calculated according to Equation 3. The UE 115-*c* may monitor for the common portions of the downlink transmissions 310 in accordance with the maximum data rate calculated according to Equation 3. In some aspects, the private portions of the downlink transmissions 310, other downlink transmissions 310 to which rate splitting is not applied, or both may be transmitted according to a second data rate 335 that is equal to or less than a second maximum data rate. In some aspects, the second maximum data rate may be calculated according to Equation 1. The second maximum data rate may be the same or different for the non-rate split downlink transmissions 310 and the private portions of the rate split downlink transmissions 310.

The UE 115-*c* may transmit the common stream communication parameters 330, one or more other communication parameters for both common and private portions of a message, or both via the uplink signaling 320. The UE 115-*c* may adjust the values of the parameters based on the UE capabilities 340 and one or more conditions associated with wireless communications at the UE 115-*c*, such as an SCS and a quantity of component carriers 325.

The network entity 105-*b* and the UE 115-*c* described herein may thereby account for an impact of rate splitting on a processing time for the UE 115-*c* to process a downlink transmission 310, a quantity of downlink transmissions 310 per slot, a quantity of component carriers 325, an SCS, application of rate splitting to downlink transmissions 310, a data rate of the downlink transmissions 310, or any combination thereof. By accounting for rate splitting, the devices may support more reliable communications with improved throughput as compared with systems in which rate splitting is not accounted for.

Figure 4:
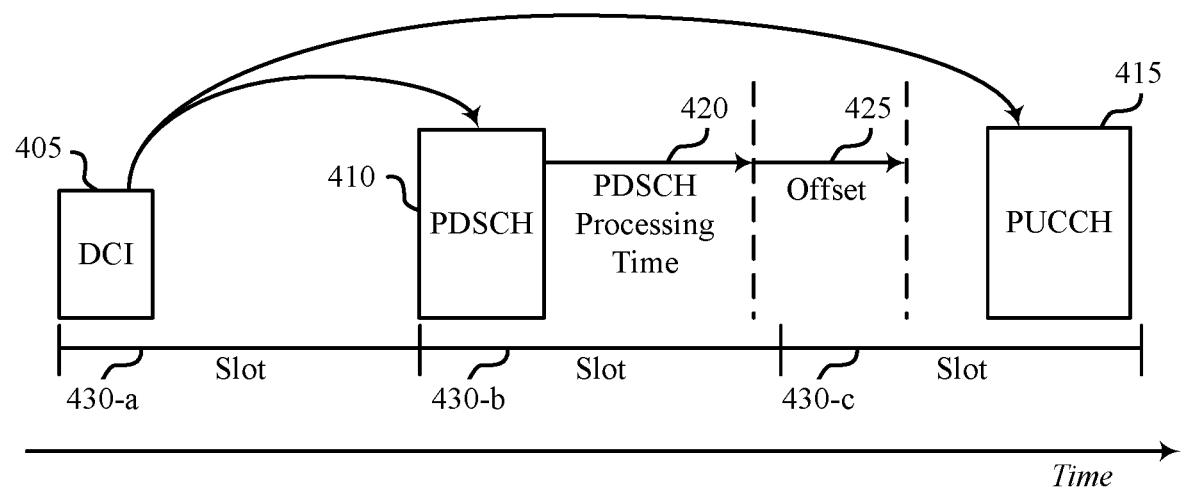
FIG. 4 illustrates an example of a downlink channel processing timelines that supports UE processing capability for wireless communications with rate splitting in accordance with one or more aspects of the present disclosure.

FIG. 4 illustrates an example of a downlink channel processing timeline 400 that supports UE processing capability for wireless communications with rate splitting in accordance with one or more aspects of the present disclosure. The downlink channel processing timeline 400 may implement or be implemented by aspects of the wireless communications systems 100 or 300, the transmission scheme 200, or the reception scheme 201, as described with reference to FIGS. 1-3. For example, the downlink channel processing timeline 400 illustrates an example timeline for transmission and reception of control signaling (e.g., DCI 405), a downlink message (e.g., a PDSCH 410), and a feedback message via a PUCCH 415 between a network entity 105 and a UE 115, which may represent examples of corresponding messages and devices as described with reference to FIGS. 1-3.

The network entity 105 may transmit DCI 405 (e.g., control signaling) to the UE 115 to schedule one or more downlink transmissions. In the example of FIG. 4, the DCI 405 may schedule (e.g., allocate resources for) a downlink transmission via the PDSCH 410 and a feedback transmission via the PUCCH 415 in response to the downlink transmission via the PDSCH 410. In the downlink channel processing timeline 400, the DCI 405, the PDSCH 410, and the PUCCH 415 may each be transmitted and received within a different slot 430 (e.g., the slots 430-*a*, 430-*b*, and 430-*c*). However, it is to be understood that each of the DCI 405, the PDSCH 410, and the PUCCH 415 may be within the same slot 430, or within two different slots 430 (e.g., the PDSCH 410 and the PUCCH 415 may be in a same slot 430), or within any combination of slots 430. In some aspects, although not illustrated in FIG. 4, multiple PDSCHs 410 may be transmitted to the UE 115 within a same slot 430. For example, the slot 430-*b* may include multiple PDSCH transmissions. The multiple PDSCHs 410 may be transmitted via one or more component carriers (e.g., component carriers 325 through 325-N illustrated in FIG. 3).

A time period between a final symbol of the PDSCH 410 and a beginning symbol of the PUCCH 415 may be based on a PDSCH processing time 420. In some cases, the first symbol of the PUCCH 415 may be at least the PDSCH processing time 420 after the final symbol of the PDSCH 410. The PDSCH processing time 420 may represent an earliest time after the final symbol of the PDSCH 410 at which the feedback may be scheduled. In some cases, a time at which the feedback is actually transmitted may be based on scheduling information included in the DCI (e.g., one or more parameters, such as K1, PRI, or the like).

The PDSCH processing time 420 may include a quantity of symbols, $N_1$. The value of N1 may be based on a UE processing capability (e.g., UE processing capability 1 or 2), an SCS, a quantity of DMRS symbols that are configured for UE processing capability 1, or any combination thereof. The UE 115 may transmit capability signaling that indicates the UE processing capability. In some aspects, the capability signaling may include a parameter (e.g., pdsch-ProcessingType2) that is configured to indicate whether the UE 115 supports the UE processing capability 2 for a given SCS. The UE 115 may additionally, or alternatively, indicate a threshold quantity of component carriers the UE 115 supports for one or more respective quantities of transport blocks (TBs) per slot. For example, the UE 115 may support a first quantity of carriers for up to one TB per slot and a different quantity of carriers for up to seven TBs per slot. The UE 115 may indicate, via the capability signaling, a fallback behavior for the UE 115 per SCS if a quantity of carriers configured for communications is greater than the maximum quantity of carriers. A first value of a fallback parameter in the capability signaling may indicate that the UE 115 supports the UE processing capability 2 on a lowest cell index among the configured carriers in a frequency band where the capability signaling is reported. A second value of the fallback parameter may indicate that the UE 115 supports the UE processing capability 1 in the band where the capability signaling is reported.

In some aspects, the UE 115 may support the UE processing capability 2 for a given frequency band (e.g., FR1). If the UE 115 supports the UE processing capability 2 on a given cell and a higher layer parameter for the UE processing capability 2 is enabled for the cell (e.g., processingType2Enabled in PDSCH-ServingCellConfig), the PDSCH processing time 420 for the UE processing capability 2 may be enabled. Otherwise, the UE 115 may support a PDSCH processing time 420 for the UE processing capability 1. A duration of the PDSCH processing time 420 associated with the UE processing capability 1 may be greater than a duration of the PDSCH processing time 420 associated with the UE processing capability 2. In some aspects, a table of PDSCH processing times per SCS and DMRS symbol configurations may be defined for each UE processing capability, and the quantity of symbols in the PDSCH processing time 420 may be determined based on the table. Table 1, included below, represents an example table of PDSCH processing or decoding times for the first UE processing capability. Table 2, also included below, represents an example table of PDSCH processing or decoding times for the second UE processing capability.

TABLE 1

PDSCH Processing Time for
PDSCH Processing Capability 1

PDSCH Decoding Time $N_1$ (Symbols)

| μ | Dmrs-AdditionalPosition = pos0 in DMRS-DownlinkConfig in both of dmrs-DwonlinkForPDSCH-MappingTypeA, dmrs-DownlinkForPDSCH-MappingTypeB | Dmrs-AdditionalPosition ≠ pos0 in DMRS-DownlinkConfig in either of dmrs-DwonlinkForPDSCH-MappingTypeA, dmrs-DownlinkForPDSCH-MappingTypeB, or if the higher layer parameter is not configured |
|---|---|---|
| 0 | 8 | $N_{1,0}$ |
| 1 | 10 | 13 |
| 2 | 17 | 20 |
| 3 | 20 | 24 |

TABLE 2

PDSCH Processing Time for PDSCH Processing Capability 2

PDSCH Decoding Time $N_1$ (Symbols)
Dmrs-AdditionalPosition = pos0 in DMRS-DownlinkConfig
in both of dmrs-DwonlinkForPDSCH-MappingTypeA,

| μ | dmrs-DownlinkForPDSCH-Mapping TypeB |
|---|---|
| 0 | 3 |
| 1 | 4.5 |
| 2 | 9 for frequency range 1 |

If the timing of the PUCCH 415 is based on the PDSCH processing time 420, the timing may not account for additional complexity at the UE 115 associated with decoding rate split transmissions, in some aspects. For example, the UE 115 may take more time to process a downlink transmission if the downlink transmission is rate split into a private stream (e.g., a set of layers associated with one or more private messages or CWs) and a common stream (e.g., a set of layers associated with one or more common messages or CWs) than if the downlink transmission is not rate split. The PDSCH processing time 420 may, in some cases, not support the increased processing time, which may reduce throughput and reliability of communications.

Techniques, systems, and devices described herein provide for the network entity 105, the UE 115, or both to account for rate splitting when scheduling PUCCH resources 415 in response to a PDSCH 410. For example, a time period between the final symbol of the PDSCH 410 and a first symbol of the PUCCH 415 may include at least a first portion and a second portion. The first portion may correspond to the PDSCH processing time 420 supported by the UE 115. The second portion may correspond to an offset 425 that is applied to the PDSCH processing time 420. The offset 425 may be referred to as a relaxation offset in some aspects described herein. The offset 425 may represent additional complexity associated with demodulating, decoding, and/or encoding the common stream when rate splitting is applied.

A duration of the offset 425 may be based on one or more rate splitting parameters, one or more UE capabilities, or any combination thereof. For example, the offset 425 may be based on an SCS of the communications, a quantity of PDSCHs 410 that are transmitted to the UE 115 per slot 430, or both (e.g., rate splitting parameters). In some aspects, the offset 425 may include two symbols if the SCS is 15 kHz and the offset 425 may include eight symbols if the SCS is 120 kHz (e.g., the duration of the offset 425 may be defined per SCS value). Additionally, or alternatively, a duration of the offset 425 may be based on a quantity of PDSCHs 410 that are transmitted per slot 430. In some aspects, the quantity of PDSCHs 410 per slot 430 may include all rate split and non-rate split PDSCHs 410. Alternatively, the quantity of PDSCHs 410 per slot 430 may include the rate split PDSCHs 410 per slot and may exclude non-rate split PDSCHs 410. In either case, a duration of the offset 425 may increase as a quantity of PDSCHs 410 per slot 430 increases.

In some aspects, the duration of the offset 425 may be based on one or more capabilities of the UE 115, such as a UE processing capability, a receiver type of the UE 115, or both. For example, a set of durations may be defined per UE processing capability (e.g., the offset 425 may include four symbols for the UE processing capability 1 and two symbols for the UE processing capability 2). Additionally, or alternatively, the relaxation offset may be greater for a receiver that is capable of decoding the common message and re-encoding the common message to perform successive interference cancelation (e.g., receiver type 1) than for a receiver that is not capable of re-encoding the common message (e.g., receiver type 2) or for a receiver that is not capable of decoding the common message (e.g., receiver type 3). In some aspects, the offset 425 may include four symbols for the receiver type 1 and the offset 425 may include one symbol for the receiver type 3.

The duration of the offset 425 (e.g., in symbols, milliseconds, or some other unit of time) may be indicated by UE capability, in some aspects. The UE 115 may transmit a capability message that indicates the duration of the offset 425 for a given SCS, UE processing capability, quantity of PDSCHs 410 per slot 430, receiver type, or any combination thereof. In some aspects, the capability message may indicate multiple durations per the different parameters and capabilities, and the network entity 105 may select a duration based on the parameters and capabilities. The capability message may indicate the UE processing capability of the UE, the receiver type, or both in addition to the duration.

In some other aspects, the duration of the offset 425 may be determined by the network entity 105 based on a defined table. For example, a set or table of offset durations may be defined (e.g., configured or defined in a standard), and each offset duration may be associated with a respective SCS, UE processing capability, quantity of PDSCHs 410 per slot 430, receiver type, or any combination thereof. The network entity 105 may select the duration based on the corresponding parameters and UE capabilities. In this example, the UE 115 may transmit a capability message that indicates the UE processing capability, the receiver type, or both.

The network entity 105 may transmit the DCI 405 to the UE 115 to schedule downlink transmissions to the UE 115 based on the determined offset 425. For example, the DCI 405 may schedule the PDSCH 410 and may schedule the PUCCH 415 at a time that is at least a time period after the PDSCH 410, where the time period may include the PDSCH processing time 420 and the offset 425. The time period may begin after a final or ending symbol of the PDSCH 410 and may end before or at the same time as a starting or beginning symbol of the PUCCH 415. The UE 115 may receive both the common portion and the private portion of a downlink message via the PDSCH 410, demodulate and decode the downlink message, and transmit feedback in response to the downlink message via the PUCCH 415 after at least the PDSCH processing time 420 and the offset 425.

By accounting for rate splitting when scheduling PUCCH resources 415 for a feedback message, the UE 115 may have sufficient time to accurately receive and decode the PDSCH with rate splitting before transmitting a feedback message. The described techniques may thereby improve throughput and reliability of wireless communications.

Figure 5:
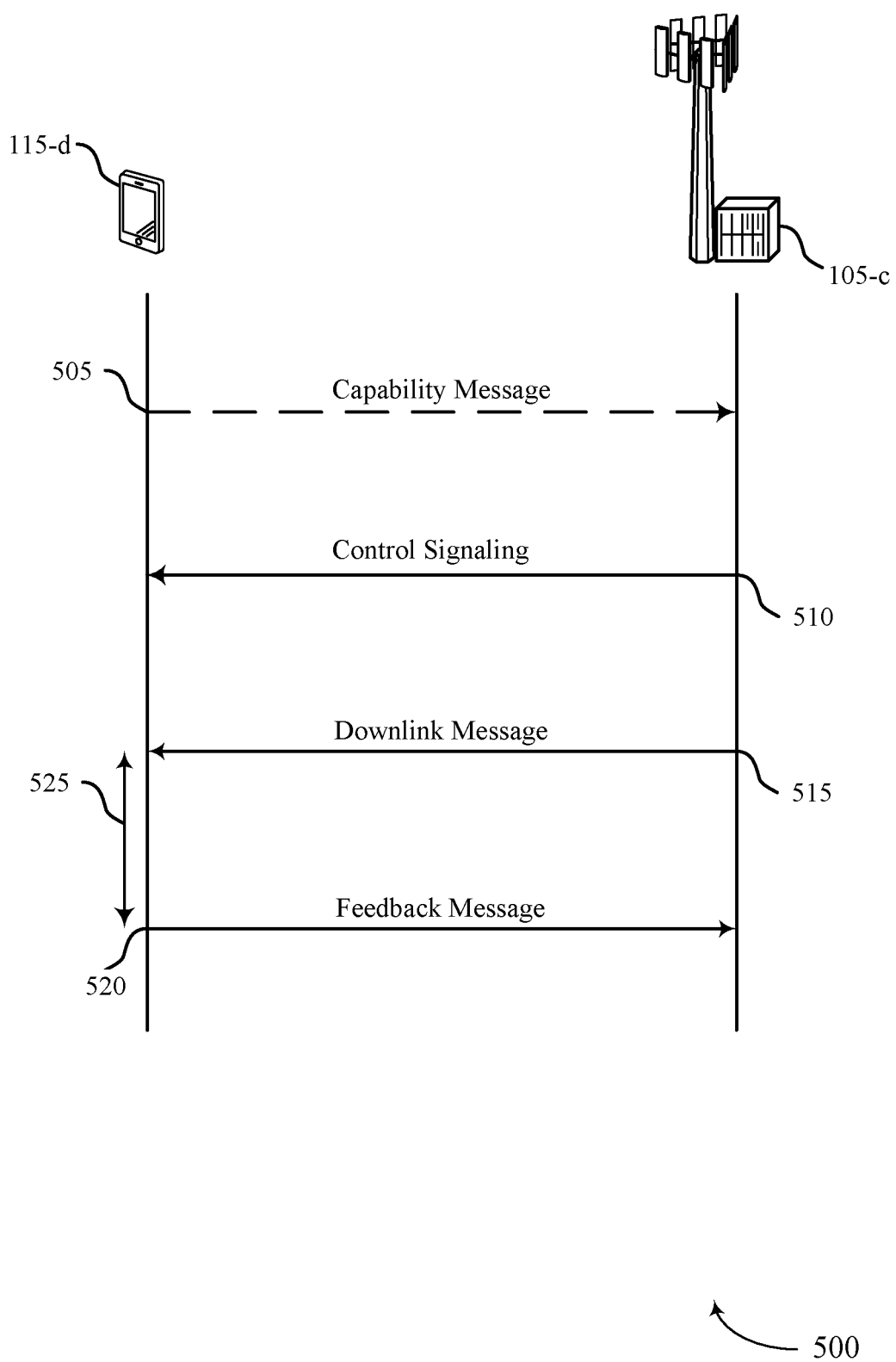
FIGS. 5-7 illustrate examples of process flows that support UE processing capability for wireless communications with rate splitting in accordance with one or more aspects of the present disclosure.

FIG. 5 illustrates an example of a process flow 500 that supports UE processing capability for wireless communications with rate splitting in accordance with one or more aspects of the present disclosure. The process flow 500 may implement or be implemented by aspects of the wireless communications systems 100 and 300, the transmission scheme 200, the reception scheme 201, or the downlink channel processing timeline 400, as described with reference to FIGS. 1-4. For example, the process flow 500 illustrates communications between a UE 115-d and a network entity 105-c, which may represent aspects of corresponding devices as described with reference to FIGS. 1-4. In some aspects, a time period between a final symbol of a downlink message received by the UE 115-d and a starting symbol of a feedback message transmitted by the UE 115-d may be based on a one or more capabilities of the UE when rate splitting is applied to the downlink message, as described herein including with reference to FIG. 4.

In the following description of the process flow 500, the operations between the UE 115-d and the network entity 105-c may be performed in different orders or at different times. Some operations may also be left out of the process flow 500, or other operations may be added. Although the UE 115-d and the network entity 105-c are shown performing the operations of the process flow 500, some aspects of some operations may also be performed by one or more other wireless devices.

At 505, in some aspects, the UE 115-d may transmit a capability message that indicates one or more capabilities of the UE 115-d associated with one or more rate splitting parameters. For example, the capability message may indicate whether the UE 115-d supports a first UE processing capability, a second UE processing capability, or both in the presence of rate splitting. Additionally, or alternatively, the capability message may indicate a quantity of downlink messages the UE 115-d supports per slot with and without rate splitting and per UE capability. In some aspects, the capability message may indicate one or more durations of a second portion of a time period 525 between a final symbol of a downlink message and a beginning symbol of a set of uplink symbols for conveying feedback in response to the downlink message (e.g., the UE 115-d may indicate an offset that is supported by the UE 115-d).

At 510, the network entity 105-c may transmit control signaling to the UE 115-d. The control signaling (e.g., DCI) may schedule the downlink message and the set of uplink symbols (e.g., PUCCH resources) for conveying feedback in response to the downlink message. The downlink message may be for reception by the UE 115-d in accordance with one or more rate splitting parameters (e.g., a quantity of PDSCHs per slot, a quantity of component carriers, an SCS, or any combination thereof). A time period 525 between a final symbol of the downlink message and a beginning symbol of the set of uplink symbols for conveying the feedback may include at least a first portion and a second portion. The first portion may be based on or the same as a downlink processing time for the UE 115-d in the absence of rate splitting (e.g., a PDSCH processing time, as described with reference to FIG. 4). The second portion (e.g., a relaxation offset) may be based on one or more capabilities of the UE 115-d when rate splitting is applied to the downlink message, one or more rate splitting parameters, or any combination thereof.

In some aspects, the network entity 105-c may determine a duration of the second portion of the time period 525 based on the UE capability message. For example, the UE capability message may indicate one or more durations, and the network entity 105-c may utilize the indicated duration or select a duration from two or more indicated durations based on one or more communication parameters, such as a quantity of downlink messages per slot, an SCS, a quantity of component carriers, or any combination thereof. Additionally, or alternatively, a set of two or more potential durations of the second portion may be defined (e.g., a table). Each duration may be associated with or mapped to a respective combination of communication parameters, and the network entity 105-c may determine which duration to use based on the communication parameters.

At 515, the network entity 105-c may transmit the downlink message to the UE 115-d based on the control signaling. The downlink message may include, based on the one or more rate splitting parameters, a first portion that includes first information for the UE 115-d (e.g., a private portion) and a second portion that includes second information for the UE 115-d and at least one other UE 115 (e.g., a common portion). That is, a rate splitting procedure may be applied to the downlink message. The downlink message may support an interference cancelation capability (e.g., a successive interference cancelation capability) based on the downlink message including at least the common portion.

At 520, the UE 115-d may transmit a feedback message in response to the downlink message. The UE 115-d may transmit the feedback message via the set of uplink symbols allocated by the control signaling. A beginning symbol of the feedback message may be at least the time period 525 after a final symbol of the downlink message. The UE 115-d may indicate, via the feedback message, an ACK or a NACK, which may indicate whether the downlink message was received and decoded properly by the UE 115-d.

The network entity 105-c and the UE 115-d may thereby account for increased complexity associated with rate splitting when determining a time period 525 between a downlink message associated with a rate splitting procedure and a feedback message. By accounting for the rate splitting complexity, the UE 115-d may have sufficient time to receive and decode the private and common portions of the downlink message before transmitting feedback, which may improve throughput and reliability of communications, among other examples.

Figure 6:
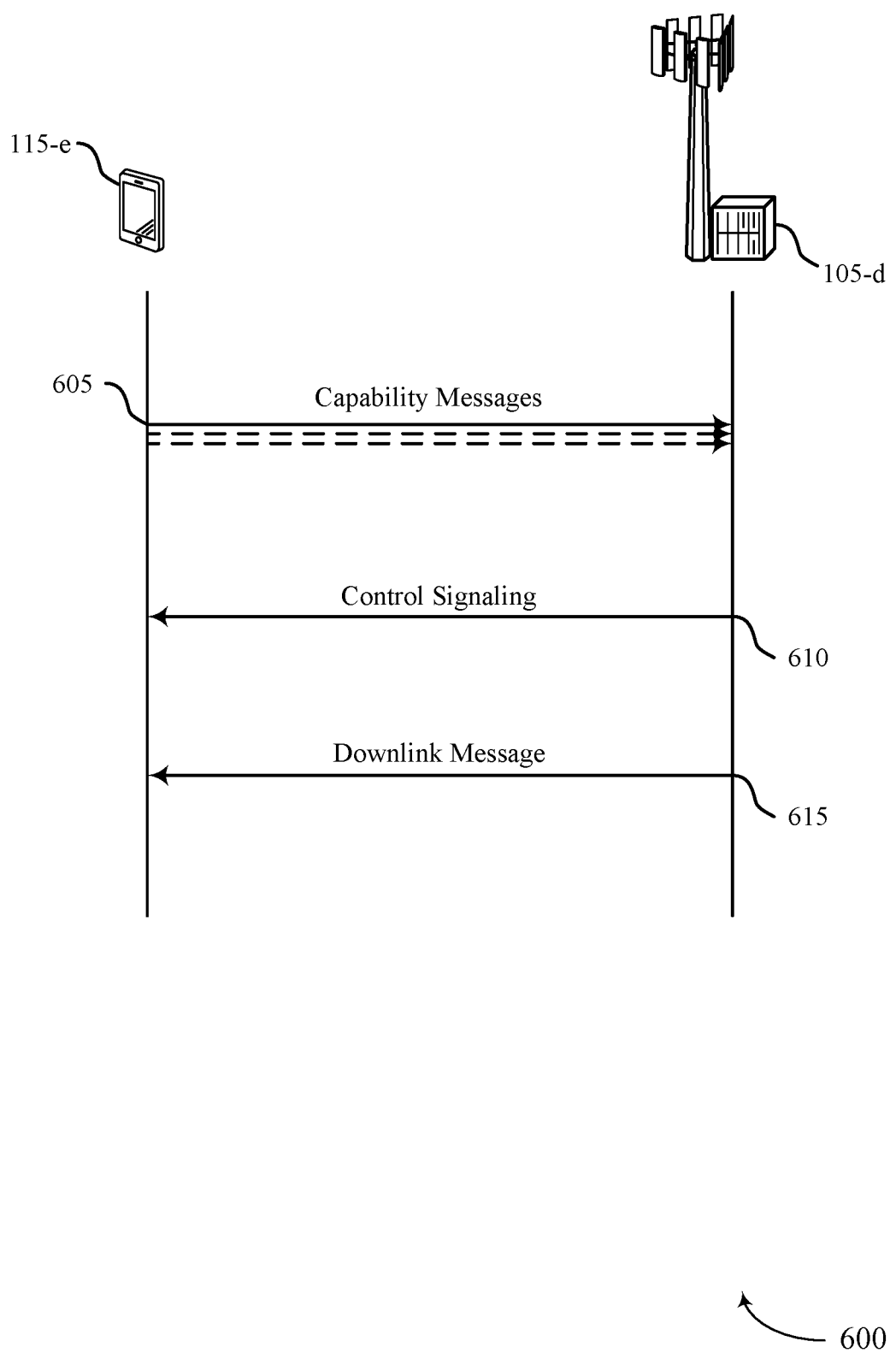

FIG. 6 illustrates an example of a process flow 600 that supports UE processing capability for wireless communications with rate splitting in accordance with one or more aspects of the present disclosure. The process flow 600 may implement or be implemented by aspects of the wireless communications systems 100 and 300, the transmission scheme 200, or the reception scheme 201, as described with reference to FIGS. 1-3. For example, the process flow 600 illustrates communications between a UE 115-e and a network entity 105-d, which may represent aspects of corresponding devices as described with reference to FIGS. 1-5. In some aspects, the UE 115-e may indicate a first set of UE capabilities associated with rate split downlink messages and a second set of UE capabilities associated with downlink messages that are not associated with rate splitting.

In the following description of the process flow 600, the operations between the UE 115-e and the network entity 105-d may be performed in different orders or at different times. Some operations may also be left out of the process flow 600, or other operations may be added. Although the UE 115-e and the network entity 105-d are shown performing the operations of the process flow 600, some aspects of some operations may also be performed by one or more other wireless devices.

At 605, the UE 115-e may transmit one or more capability messages to the network entity 105-d. The one or more capability messages may indicate a first set of one or more UE capabilities and a second set of one or more UE capabilities. The first set of one or more UE capabilities may be associated with a first type of downlink messages that include at least two portions based on a rate splitting procedure applied to the downlink messages. A first portion of the downlink messages may include information for the UE 115-e (e.g., a private portion) and a second portion of the downlink message may include information for the UE 115-e and at least one other UE 115 (e.g., a common portion) based on the rate splitting procedure. The second set of one or more UE capabilities may be associated with a second type of downlink messages different than the first type. The second type of downlink messages may not be associated with the rate splitting procedure (e.g., do not include the common portion).

The first set of one or more UE capabilities may include a UE processing capability supported by the UE 115-e, a quantity of downlink messages per slot supported by the UE 115-e, a quantity of component carriers supported by the UE 115-e, or any combination thereof when rate splitting is applied to at least one downlink message. The second set of one or more UE capabilities may include a UE processing capability supported by the UE 115-e, a quantity of downlink messages per slot supported by the UE 115-e, a quantity of component carriers supported by the UE 115-e, or any combination thereof when rate splitting is not applied to a downlink message. The UE 115-e may indicate the first and second sets of UE capabilities per SCS or per receiver type of the UE 115-e.

At 610, the network entity 105-d may transmit control signaling to the UE 115-e. The control signaling (e.g., DCI) may schedule a downlink message and a set of uplink symbols for conveying feedback in response to the downlink message. The network entity 105-d may determine communication parameters for the downlink message based on the first set of one or more UE capabilities and the second set of one or more UE capabilities. For example, the network entity 105-d may determine whether to apply rate splitting to the downlink message, a quantity of downlink messages (including the downlink message) to transmit per slot, a quantity of component carriers over which to transmit the downlink message, or any combination thereof based on the UE capabilities and one or more communication parameters, such as an SCS or a quantity of configured component carriers, or both.

At 615, in some aspects, the network entity 105-d may transmit the downlink message to the UE 115-e in accordance with the control information. The downlink message may or may not be rate split and may or may not be transmitted in a same slot as one or more other downlink messages based on the reported UE capabilities and corresponding communication parameters. By accounting for the UE capabilities when determining scheduling information and parameters for the downlink message, the network entity 105-d may increase a probability that the downlink message is successfully received and decoded by the UE 115-e, which may improve throughput, coordination between devices, and communication reliability, among other examples.

Figure 7:
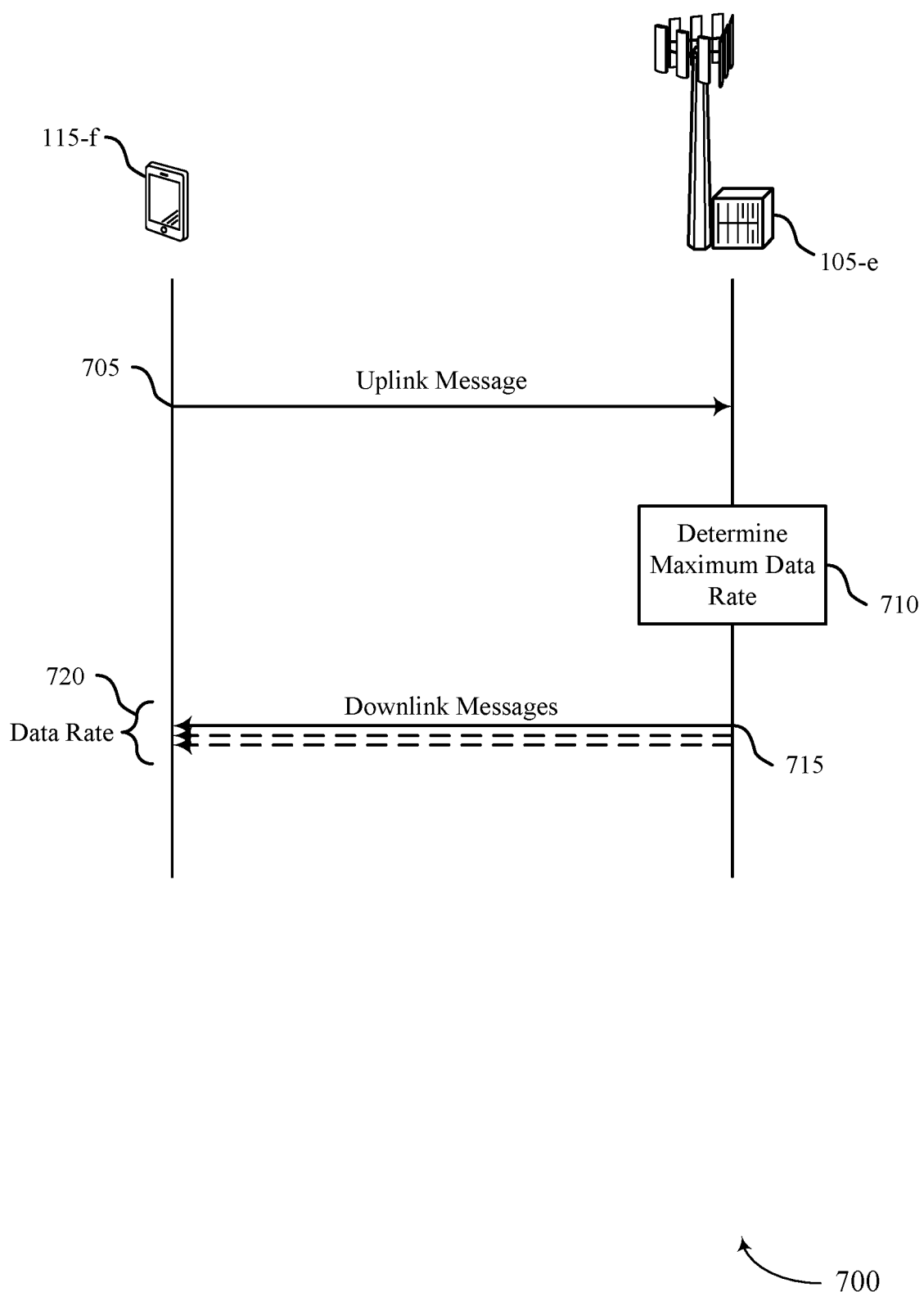

FIG. 7 illustrates an example of a process flow 700 that supports UE processing capability for wireless communications with rate splitting in accordance with one or more aspects of the present disclosure. The process flow 700 may implement or be implemented by aspects of the wireless communications systems 100 and 300, the transmission scheme 200, or the reception scheme 201, as described with reference to FIGS. 1-3. For example, the process flow 700 illustrates communications between a UE 115-f and a network entity 105-e, which may represent aspects of corresponding devices as described with reference to FIGS. 1-6. In some aspects, the UE 115-f may indicate communication parameters associated with a common data stream, and the network entity 105-e may determine a data rate for downlink transmissions to the UE 115-f based on the communication parameters.

In the following description of the process flow 700, the operations between the UE 115-f and the network entity 105-e may be performed in different orders or at different times. Some operations may also be left out of the process flow 700, or other operations may be added. Although the UE 115-f and the network entity 105-e are shown performing the operations of the process flow 700, some aspects of some operations may also be performed by one or more other wireless devices.

At 705, the UE 115-f may transmit an uplink message including a set of one or more communication parameters to the network entity 105-e. The set of one or more communication parameters may be associated with reception, by the UE 115-f, of one or more downlink messages. For example, the set of one or more communication parameters may include quantity of layers, a modulation order, a scaling factor, or any combination thereof associated with the one or more downlink messages. At least one of the one or more downlink messages may include a first portion with first information for the UE 115-f (e.g., a private portion) and a second portion with second information for the UE 115-f and at least one other UE 115 (e.g., a common portion) based on a rate splitting procedure. In some cases, the set of one or more communication parameters may be associated with respective second portions of the one or more downlink messages. The second portions may be referred to as a common data stream, in some aspects.

At 710, the network entity 105-e may determine a maximum data rate that is associated with the rate splitting procedure based on the set of one or more communication parameters indicated via the uplink message. In some aspects, determining the maximum data rate may include calculating a maximum data rate based on a function including at least the set of one or more communication parameters. The function may represent an example of the functions described with respect to Equations 2 and 3, or some other function. The function may be defined (e.g., in a standard), configured at the network entity 105-e (e.g., at deployment of the device), or indicated to the network entity 105-e, the UE 115-f, or both via control signaling.

In some aspect, the UE 115-f may determine the maximum data rate. The UE 115-f may calculate the maximum data rate based on the function. Additionally, or alternatively, the network entity 105-e may transmit a signal that indicates the maximum data rate based on the determining at 710. In some other aspects, the UE 115-f may refrain from determining the maximum data rate.

At 715, the network entity 105-e may transmit the one or more downlink messages to the UE 115-f in accordance with a data rate 720 (e.g., a rate of bits, TBs, messages, or some other quantity of data per a given time interval, such as seconds). The data rate 720 at which the one or more downlink messages are transmitted to the UE 115-f may be less than or equal to the maximum data rate determined based on the set of one or more communication parameters.

In some aspects, the one or more downlink messages may include a first subset of downlink messages that are in accordance with the rate splitting procedure (e.g., than include at least a common portion or that support some type of interference cancelation) and a second subset of downlink messages that are not in accordance with the rate splitting procedure, and the data rate 720 may apply to the first subset and the second subset.

In some other aspects, the one or more downlink messages may include downlink message that are in accordance with the rate splitting procedure and may exclude downlink messages that are not in accordance with the rate splitting procedure. The data rate 720 may apply to the downlink messages in accordance with the rate splitting procedure. The network entity 105-e may, in some aspects, transmit one or more second downlink messages that are not in accordance with the rate splitting procedure to the UE 115-f based on a second data rate that is different than the data rate 720. The second data rate may not be less than or equal to the maximum data rate determined at 710 based on the one or more communication parameters associated with the rate split downlink messages, in some aspects.

In some aspects, the data rate 720 may apply to the second portions (e.g., the common portions) of the one or more downlink messages associated with the rate splitting procedure. The data rate 720 may not apply to the first portions (e.g., the private portions) of the one or more downlink messages associated with the rate splitting procedure. In such cases, the network entity 105-e may transmit the first portions of the downlink messages, one or more second downlink messages that are not in accordance with the rate splitting procedure, or both based on a second data rate that is different than the data rate 720. The second data rate may not be less than or equal to the maximum data rate determined at 710 based on the one or more communication parameters associated with the rate split downlink messages, in some aspects.

The network entity 105-e and the UE 115-f may thereby account for rate splitting and parameters associated with performing interference cancelation, decoding a second portion of a downlink message, or both, when determining a data rate for communications, which may improve throughput and communication reliability, among other advantages.

Figure 8:
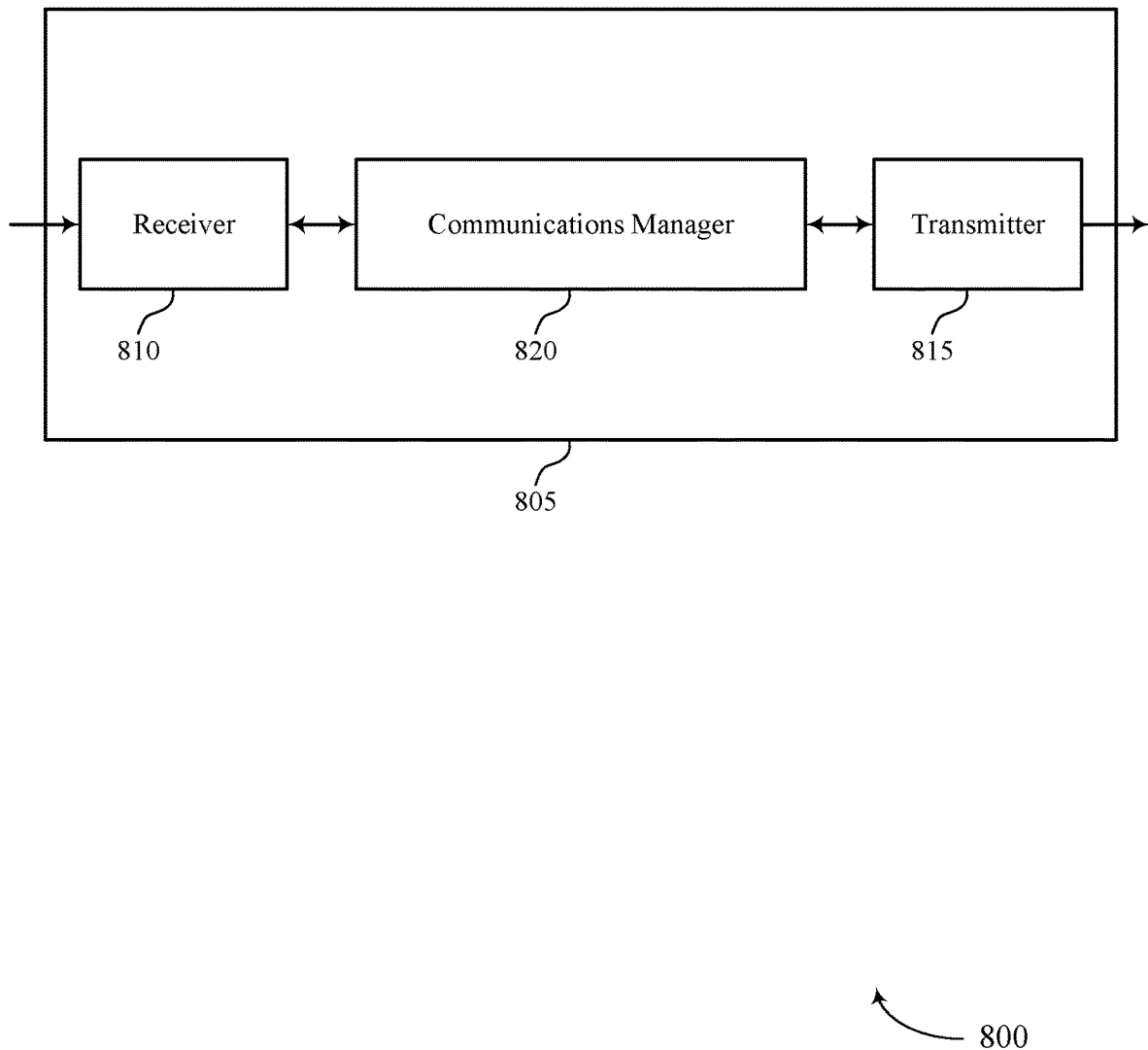
FIGS. 8 and 9 show block diagrams of devices that support UE processing capability for wireless communications with rate splitting in accordance with one or more aspects of the present disclosure.

FIG. 8 shows a block diagram 800 of a device 805 that supports UE processing capability for wireless communications with rate splitting in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to UE processing capability for wireless communications with rate splitting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to UE processing capability for wireless communications with rate splitting). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of UE processing capability for wireless communications with rate splitting as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters. The communications manager 820 may be configured as or otherwise support a means for receiving the downlink message based on the control signaling, where, based on the one or more rate splitting parameters, a first portion of the downlink message includes first information for the UE and a second portion of the downlink message includes second information for the UE and at least one other UE. The communications manager 820 may be configured as or otherwise support a means for transmitting, in response to the downlink message, a feedback message via the set of uplink symbols.

Additionally, or alternatively, the communications manager 820 may support wireless communication at a UE in accordance with examples as disclosed herein. For example, the communications manager 820 may be configured as or otherwise support a means for transmitting one or more capability messages that indicate a first set of one or more UE capabilities and a second set of one or more UE capabilities. In some examples, the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type. The communications manager 820 may be configured as or otherwise support a means for receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

Additionally, or alternatively, the communications manager 820 may support wireless communication at a UE in accordance with examples as disclosed herein. For example, the communications manager 820 may be configured as or otherwise support a means for transmitting an uplink message including a set of one or more communication parameters associated with reception by the UE of one or more downlink messages. In some examples, at least one downlink message of the one or more downlink messages may include a respective first portion with first information for the UE and a respective second portion with second information for the UE and at least one other UE based on a rate splitting procedure. The communications manager 820 may be configured as or otherwise support a means for receiving the one or more downlink messages, where a data rate associated with the one or more downlink messages is less than or equal to a maximum data rate that is associated with the rate splitting procedure and based on the set of one or more communication parameters indicated via the uplink message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
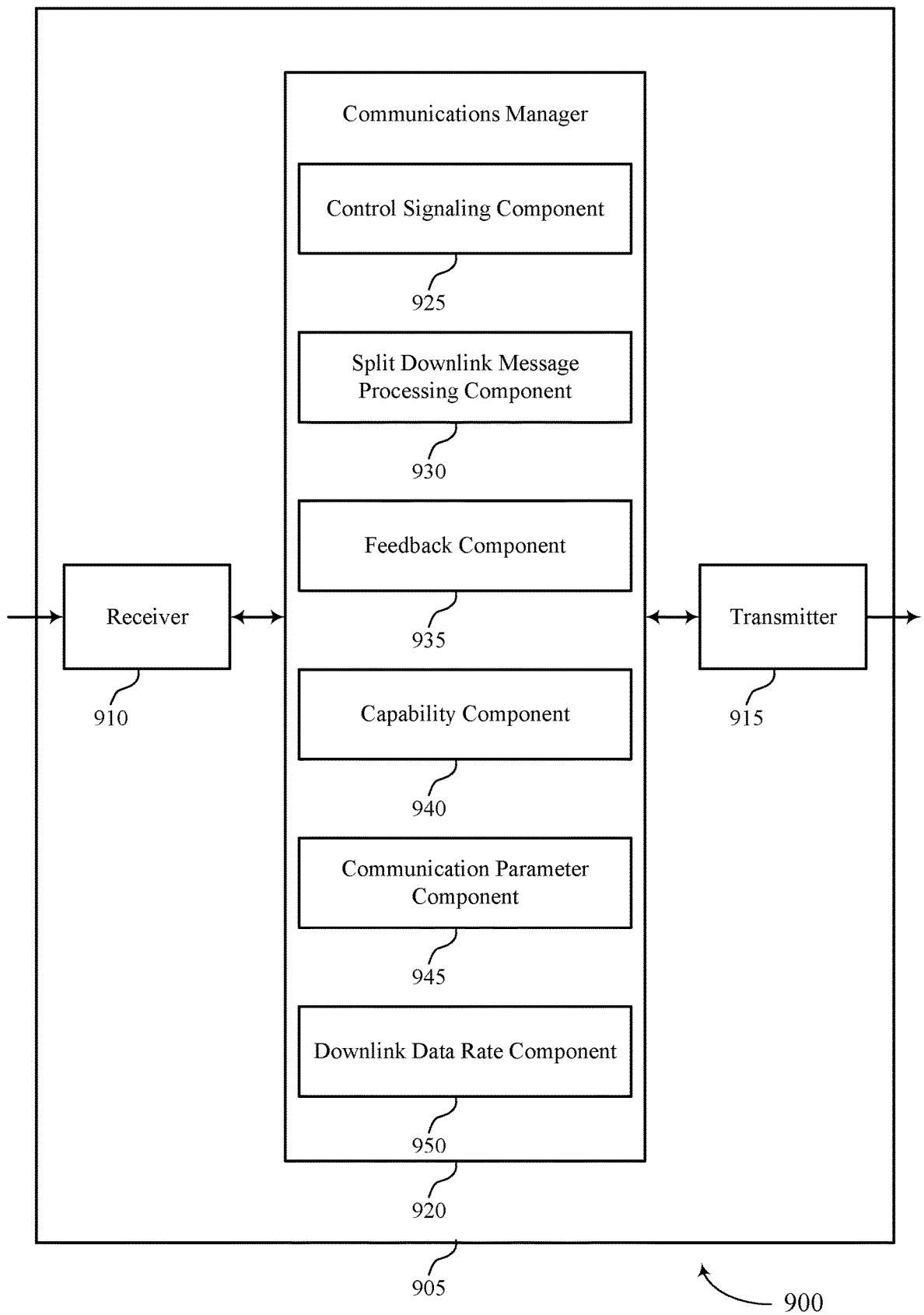

FIG. 9 shows a block diagram 900 of a device 905 that supports UE processing capability for wireless communications with rate splitting in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to UE processing capability for wireless communications with rate splitting). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to UE processing capability for wireless communications with rate splitting). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of UE processing capability for wireless communications with rate splitting as described herein. For example, the communications manager 920 may include a control signaling component 925, a split downlink message processing component 930, a feedback component 935, a capability component 940, a communication parameter component 945, a downlink data rate component 950, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The control signaling component 925 may be configured as or otherwise support a means for receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters. The split downlink message processing component 930 may be configured as or otherwise support a means for receiving the downlink message based on the control signaling, where, based on the one or more rate splitting parameters, a first portion of the downlink message includes first information for the UE and a second portion of the downlink message includes second information for the UE and at least one other UE. The feedback component 935 may be configured as or otherwise support a means for transmitting, in response to the downlink message, a feedback message via the set of uplink symbols.

Additionally, or alternatively, the communications manager 920 may support wireless communication at a UE in accordance with examples as disclosed herein. The capability component 940 may be configured as or otherwise support a means for transmitting one or more capability messages that indicate a first set of one or more UE capabilities and a second set of one or more UE capabilities. In some examples, the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type. The control signaling component 925 may be configured as or otherwise support a means for receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

Additionally, or alternatively, the communications manager 920 may support wireless communication at a UE in accordance with examples as disclosed herein. The communication parameter component 945 may be configured as or otherwise support a means for transmitting an uplink message including a set of one or more communication parameters associated with reception by the UE of one or more downlink messages. In some examples, at least one downlink message of the one or more downlink messages may include a respective first portion with first information for the UE and a respective second portion with second information for the UE and at least one other UE based on a rate splitting procedure. The downlink data rate component 950 may be configured as or otherwise support a means for receiving the one or more downlink messages, where a data rate associated with the one or more downlink messages is less than or equal to a maximum data rate that is associated with the rate splitting procedure and based on the set of one or more communication parameters indicated via the uplink message.

Figure 10:
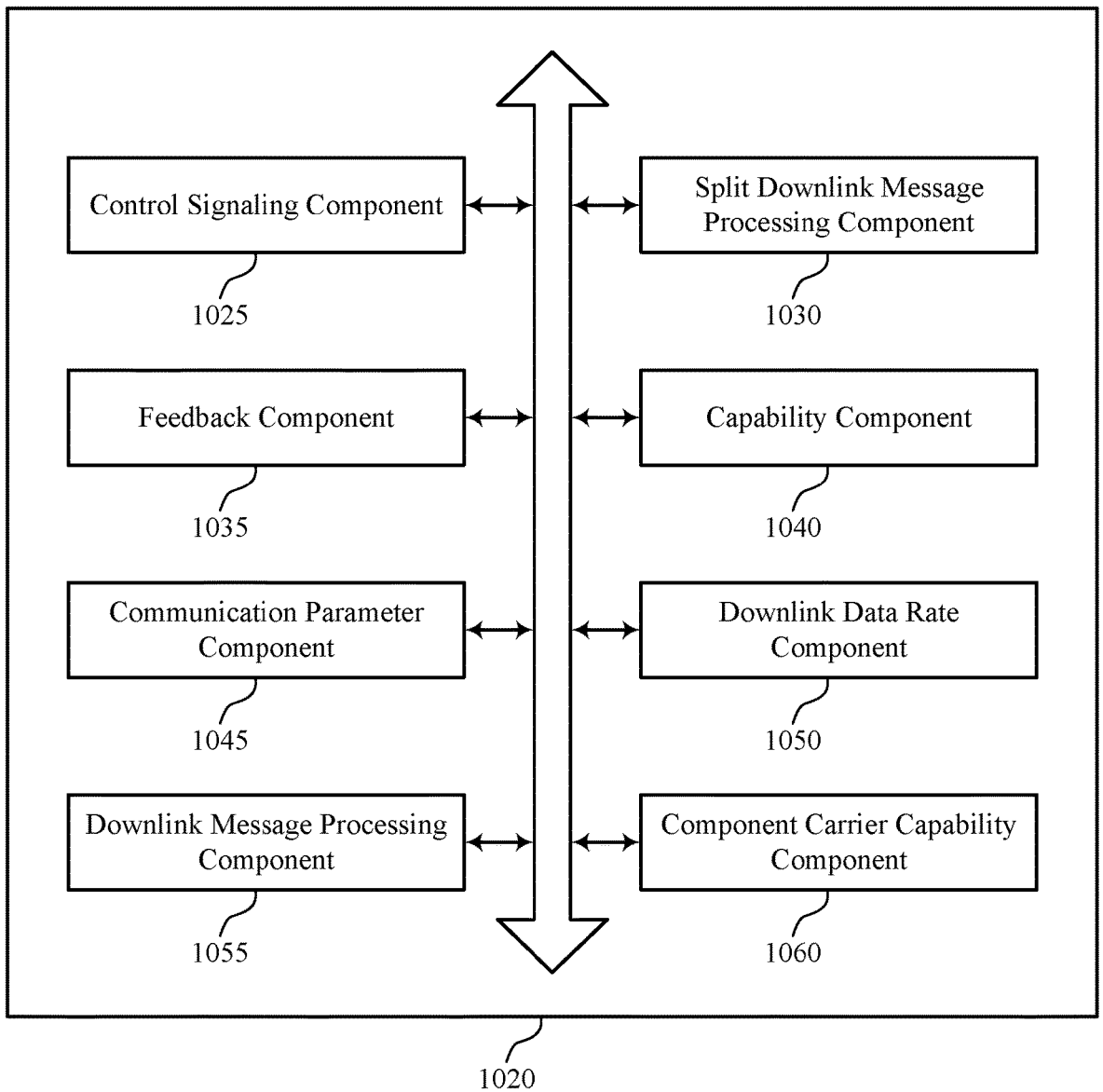
FIG. 10 shows a block diagram of a communications manager that supports UE processing capability for wireless communications with rate splitting in accordance with one or more aspects of the present disclosure.

FIG. 10 shows a block diagram 1000 of a communications manager 1020 that supports UE processing capability for wireless communications with rate splitting in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of UE processing capability for wireless communications with rate splitting as described herein. For example, the communications manager 1020 may include a control signaling component 1025, a split downlink message processing component 1030, a feedback component 1035, a capability component 1040, a communication parameter component 1045, a downlink data rate component 1050, a downlink message processing component 1055, a component carrier capability component 1060, or any combination thereof. Each of these components may communicate, directly or indirectly, with one another (e.g., via one or more buses).

The communications manager 1020 may support wireless communication at a UE in accordance with examples as disclosed herein. The control signaling component 1025 may be configured as or otherwise support a means for receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters. The split downlink message processing component 1030 may be configured as or otherwise support a means for receiving the downlink message based on the control signaling, where, based on the one or more rate splitting parameters, a first portion of the downlink message includes first information for the UE and a second portion of the downlink message includes second information for the UE and at least one other UE. The feedback component 1035 may be configured as or otherwise support a means for transmitting, in response to the downlink message, a feedback message via the set of uplink symbols.

In some examples, the capability component 1040 may be configured as or otherwise support a means for transmitting a capability message that indicates the one or more capabilities of the UE associated with the one or more rate splitting parameters, the second duration of the second portion of the time period, or both.

In some examples, to support transmitting the capability message, the capability component 1040 may be configured as or otherwise support a means for transmitting, via the capability message, a set of multiple second durations including at least the second duration, where each second duration of the set of multiple second durations is associated with a respective group of one or more rate splitting parameters.

In some examples, the second duration is one of a set of multiple second durations each associated with a respective combination of one or more capabilities of the UE and one or more rate splitting parameters. In some examples, the second duration is associated with the one or more capabilities of the UE that are associated with the one or more rate splitting parameters.

In some examples, the one or more capabilities of the UE associated with the one or more rate splitting parameters include a processing capability of the UE when receiving downlink messages in accordance with the one or more rate splitting parameters, a type of reception supported by the UE when receiving downlink messages in accordance with the one or more rate splitting parameters, or both. In some examples, the one or more rate splitting parameters include an SCS of communications, a quantity of downlink shared channel transmissions per slot, or both.

In some examples, the type of reception supported by the UE is a first type based on successive interference cancelation, a second type based on joint demodulation and decoding of the second portion of the downlink message including the second information for the UE and the at least one other UE, or a third type based on joint demodulation without decoding of the second portion of the downlink message.

Additionally, or alternatively, the communications manager 1020 may support wireless communication at a UE in accordance with examples as disclosed herein. The capability component 1040 may be configured as or otherwise support a means for transmitting one or more capability messages that indicate a first set of one or more UE capabilities and a second set of one or more UE capabilities. In some examples, the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type. In some examples, the control signaling component 1025 may be configured as or otherwise support a means for receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

In some examples, the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period. In some examples, transmitting the one or more capability messages includes transmitting a capability message that indicates whether the UE supports the second UE processing capability for reception of the first type of downlink message based on the rate splitting procedure.

In some examples, the UE supports the second UE processing capability, and the split downlink message processing component 1030 may be configured as or otherwise support a means for receiving the downlink message, where the downlink message is of the first type and includes a first portion with first information for the UE and a second portion with second information for the UE and the at least one other UE based on the rate splitting procedure, where the downlink message is in accordance with the rate splitting procedure based on the capability message indicating that the UE supports the second UE processing capability for reception of the first type of downlink message.

In some examples, the UE supports the second UE processing capability, and the downlink message processing component 1055 may be configured as or otherwise support a means for receiving the downlink message, where the downlink message is of the second type and is not in accordance with the rate splitting procedure based on the capability message indicating that the UE does not support the second UE processing capability for reception of the second type of downlink message.

In some examples, to support transmitting the one or more capability messages, the capability component 1040 may be configured as or otherwise support a means for transmitting a capability message that indicates a quantity of downlink messages the UE is capable of receiving per slot when at least one of the downlink messages is of the first type to which the rate splitting procedure is applied, where the communication parameters for the downlink message include a quantity of downlink messages transmitted in a same slot as the downlink message.

In some examples, the indicated quantity of downlink messages includes a total quantity of downlink messages that the UE is capable of receiving per slot when at least one of the downlink messages is of the first type to which the rate splitting procedure is applied. In some examples, the indicated quantity of downlink messages includes a first quantity of downlink messages of the first type to which the rate splitting procedure is applied. In some examples, the capability message further indicates a second quantity of downlink messages of the second type that the UE is capable of receiving per slot. In some examples, the indicated quantity of downlink messages includes downlink messages of the first type to which the rate splitting procedure is applied and excludes downlink messages of the second type to which the rate splitting procedure is not applied.

In some examples, the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period. In some examples, transmitting the one or more capability messages includes transmitting a capability message that indicates a maximum quantity of component carriers supported by the UE in accordance with the second UE processing capability when receiving downlink messages of the first type in accordance with the rate splitting procedure.

In some examples, to support transmitting the capability message, the component carrier capability component 1060 may be configured as or otherwise support a means for transmitting, via the capability message, an indication that, when a quantity of component carriers in a set of component carriers configured for communications by the UE is greater than the maximum quantity, the UE supports the second UE processing capability on a component carrier associated with a lowest cell index value from among a set of multiple cell index values associated with the set of component carriers configured for communications by the UE and supports the first UE processing capability for each other component carrier included in the set of component carriers configured for communications by the UE.

In some examples, to support transmitting the capability message, the component carrier capability component 1060 may be configured as or otherwise support a means for transmitting, via the capability message, an indication that, when a quantity of component carriers configured for communications by the UE is greater than the maximum quantity, the UE supports the first UE processing capability for each component carrier included in the quantity of component carriers configured for communications by the UE.

In some examples, to support transmitting the one or more capability messages, the capability component 1040 may be configured as or otherwise support a means for transmitting, via the one or more capability messages, an indication of a respective first set of UE capabilities and a respective second set of UE capabilities for each SCS of a set of multiple SCSs supported by the UE.

In some examples, to support transmitting the one or more capability messages, the capability component 1040 may be configured as or otherwise support a means for transmitting, via the one or more capability messages, an indication of a respective first set of UE capabilities and a respective second set of UE capabilities for each type of reception of a set of multiple types of reception supported by the UE, where the set of multiple types of reception include a first type based on successive interference cancelation, a second type based on joint demodulation and decoding of a second portion of the downlink message including the respective second information for the UE and the at least one other UE, or a third type based on joint demodulation without decoding of the second portion of the downlink message.

Additionally, or alternatively, the communications manager 1020 may support wireless communication at a UE in accordance with examples as disclosed herein. The communication parameter component 1045 may be configured as or otherwise support a means for transmitting an uplink message including a set of one or more communication parameters associated with reception by the UE of one or more downlink messages. In some examples, at least one downlink message of the one or more downlink messages may include a respective first portion with first information for the UE and a respective second portion with second information for the UE and at least one other UE based on a rate splitting procedure. The downlink data rate component 1050 may be configured as or otherwise support a means for receiving the one or more downlink messages, where a data rate associated with the one or more downlink messages is less than or equal to a maximum data rate that is associated with the rate splitting procedure and based on the set of one or more communication parameters indicated via the uplink message.

In some examples, to support receiving the one or more downlink messages, the split downlink message processing component 1030 may be configured as or otherwise support a means for receiving a first subset of the one or more downlink messages that are in accordance with the rate splitting procedure. In some examples, to support receiving the one or more downlink messages, the downlink message processing component 1055 may be configured as or otherwise support a means for receiving a second subset of the one or more downlink messages that are not in accordance with the rate splitting procedure, where the data rate is associated with both the first subset and the second subset of the one or more downlink messages based on the set of one or more communication parameters.

In some examples, the downlink message processing component 1055 may be configured as or otherwise support a means for receiving one or more second downlink messages that are not in accordance with the rate splitting procedure, where a second data rate associated with the one or more second downlink messages is different than the maximum data rate associated with the one or more downlink messages.

In some examples, to support receiving the one or more downlink messages, the split downlink message processing component 1030 may be configured as or otherwise support a means for receiving the respective first portions and the respective second portions of each of the one or more downlink messages in accordance with the data rate based on the set of one or more communication parameters.

In some examples, to support receiving the one or more downlink messages, the split downlink message processing component 1030 may be configured as or otherwise support a means for receiving the respective second portions of each of the one or more downlink messages in accordance with the data rate based on the set of one or more communication parameters. In some examples, to support receiving the one or more downlink messages, the split downlink message processing component 1030 may be configured as or otherwise support a means for receiving the respective first portions of each of the one or more downlink messages in accordance with a second data rate that is different than the data rate.

In some examples, the data rate is based on a data rate function and the set of one or more communication parameters. In some examples, the set of one or more communication parameters includes a quantity of layers, a modulation order, and a scaling factor associated with the respective second portions of the one or more downlink messages.

Figure 11:
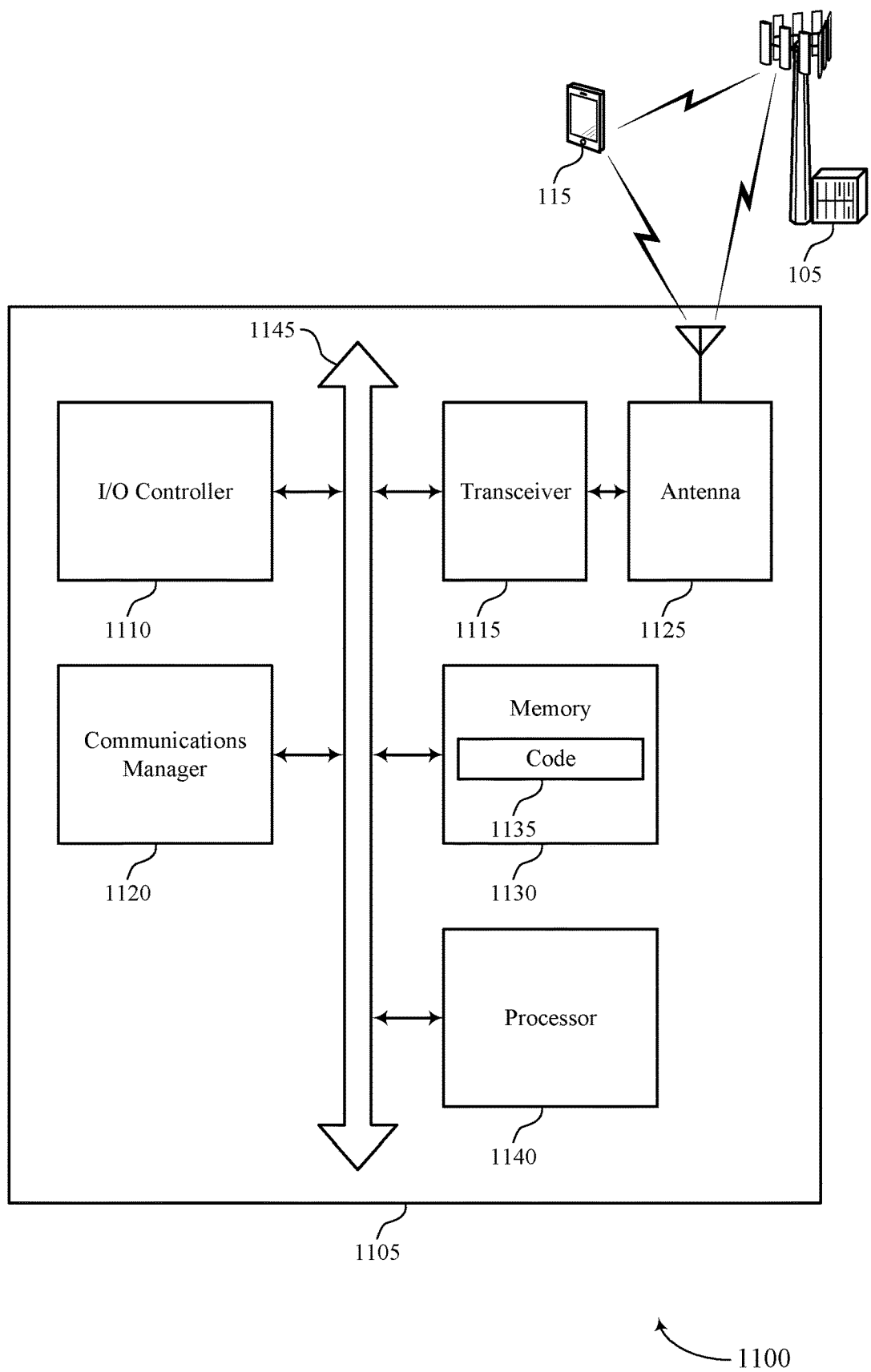
FIG. 11 shows a diagram of a system including a device that supports UE processing capability for wireless communications with rate splitting in accordance with one or more aspects of the present disclosure.

FIG. 11 shows a diagram of a system 1100 including a device 1105 that supports UE processing capability for wireless communications with rate splitting in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting UE processing capability for wireless communications with rate splitting). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters. The communications manager 1120 may be configured as or otherwise support a means for receiving the downlink message based on the control signaling, where, based on the one or more rate splitting parameters, a first portion of the downlink message includes first information for the UE and a second portion of the downlink message includes second information for the UE and at least one other UE. The communications manager 1120 may be configured as or otherwise support a means for transmitting, in response to the downlink message, a feedback message via the set of uplink symbols.

Additionally, or alternatively, the communications manager 1120 may support wireless communication at a UE in accordance with examples as disclosed herein. For example, the communications manager 1120 may be configured as or otherwise support a means for transmitting one or more capability messages that indicate a first set of one or more UE capabilities and a second set of one or more UE capabilities. In some examples, the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type. The communications manager 1120 may be configured as or otherwise support a means for receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof.

Additionally, or alternatively, the communications manager 1120 may support wireless communication at a UE in accordance with examples as disclosed herein. For example, the communications manager 1120 may be configured as or otherwise support a means for transmitting an uplink message including a set of one or more communication parameters associated with reception by the UE of one or more downlink messages. In some examples, at least one downlink message of the one or more downlink messages may include a respective first portion with first information for the UE and a respective second portion with second information for the UE and at least one other UE based on a rate splitting procedure. The communications manager 1120 may be configured as or otherwise support a means for receiving the one or more downlink messages, where a data rate associated with the one or more downlink messages is less than or equal to a maximum data rate that is associated with the rate splitting procedure and based on the set of one or more communication parameters indicated via the uplink message.

By including or configuring the communications manager 1120 in accordance with examples as described herein, the device 1105 may support techniques for improved communication reliability, reduced latency, reduced power consumption, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of UE processing capability for wireless communications with rate splitting as described herein, or the processor 1140 and the memory 1130 may be otherwise configured to perform or support such operations.

Figure 12:
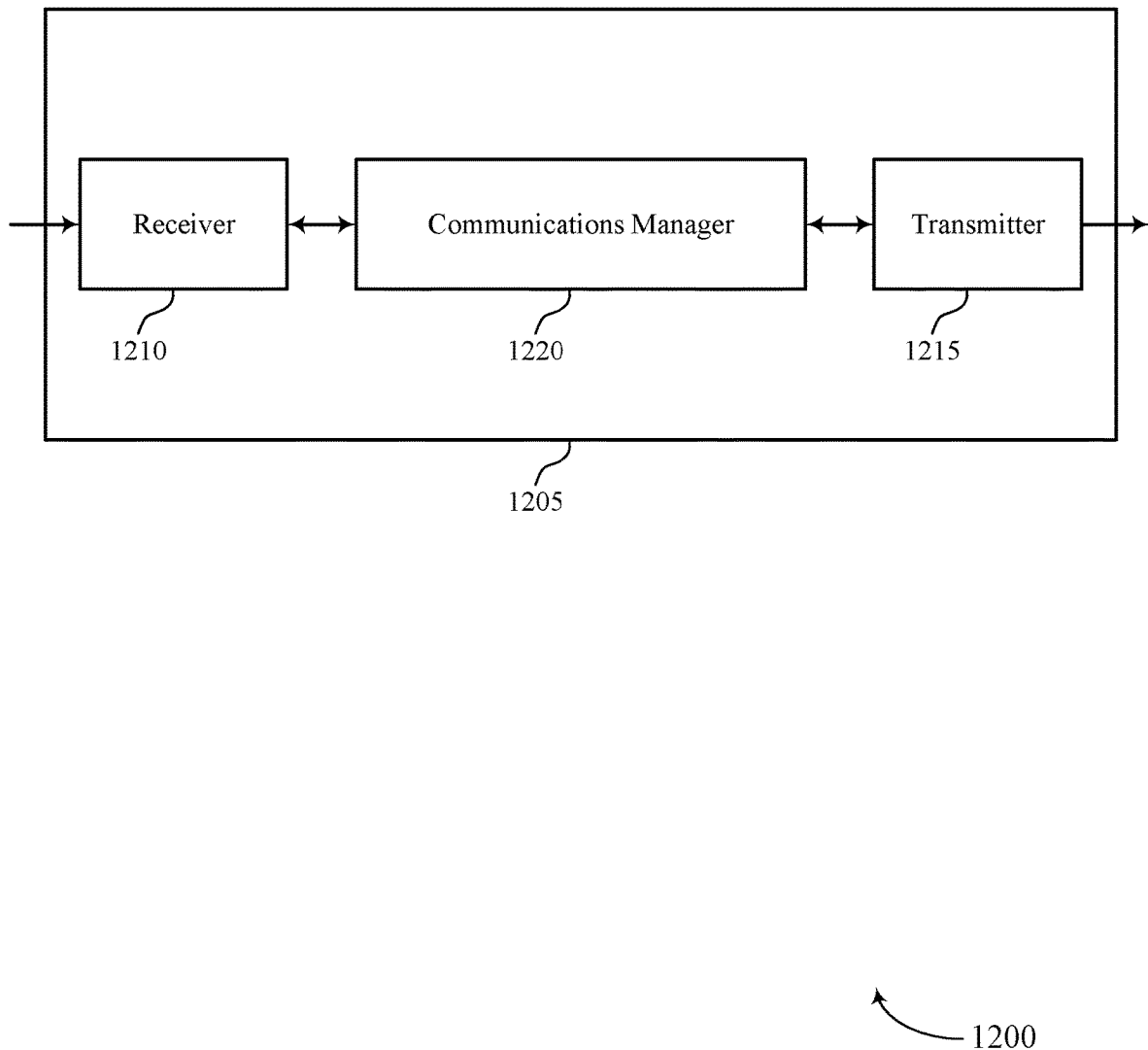
FIGS. 12 and 13 show block diagrams of devices that support UE processing capability for wireless communications with rate splitting in accordance with one or more aspects of the present disclosure.

FIG. 12 shows a block diagram 1200 of a device 1205 that supports UE processing capability for wireless communications with rate splitting in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of UE processing capability for wireless communications with rate splitting as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for receiving an uplink message including a set of one or more communication parameters associated with reception by a UE of one or more downlink messages. In some examples at least one downlink message of the one or more downlink messages may include a respective first portion with first information for the UE and a respective second portion with second information for the UE and at least one other UE based on a rate splitting procedure. The communications manager 1220 may be configured as or otherwise support a means for determining a maximum data rate that is associated with the rate splitting procedure based on the set of one or more communication parameters indicated via the uplink message. The communications manager 1220 may be configured as or otherwise support a means for transmitting the one or more downlink messages, where a data rate associated with the one or more downlink messages is less than or equal to the maximum data rate.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources.

Figure 13:
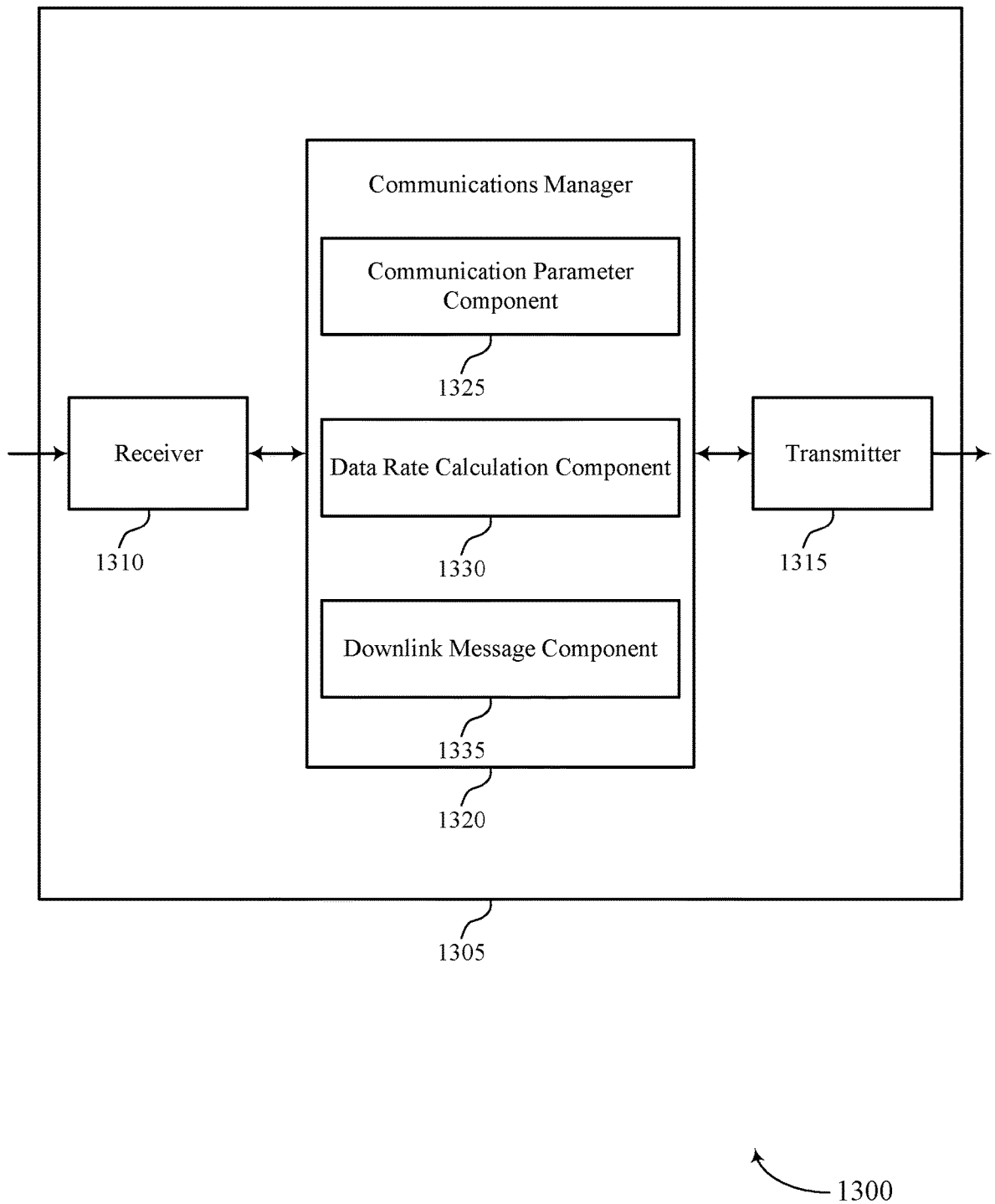

FIG. 13 shows a block diagram 1300 of a device 1305 that supports UE processing capability for wireless communications with rate splitting in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of UE processing capability for wireless communications with rate splitting as described herein. For example, the communications manager 1320 may include a communication parameter component 1325, a data rate calculation component 1330, a downlink message component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The communication parameter component 1325 may be configured as or otherwise support a means for receiving an uplink message including a set of one or more communication parameters associated with reception by a UE of one or more downlink messages. In some examples, at least one downlink message of the one or more downlink messages may include a respective first portion with first information for the UE and a respective second portion with second information for the UE and at least one other UE based on a rate splitting procedure. The data rate calculation component 1330 may be configured as or otherwise support a means for determining a maximum data rate that is associated with the rate splitting procedure based on the set of one or more communication parameters indicated via the uplink message. The downlink message component 1335 may be configured as or otherwise support a means for transmitting the one or more downlink messages, where a data rate associated with the one or more downlink messages is less than or equal to the maximum data rate.

Figure 14:
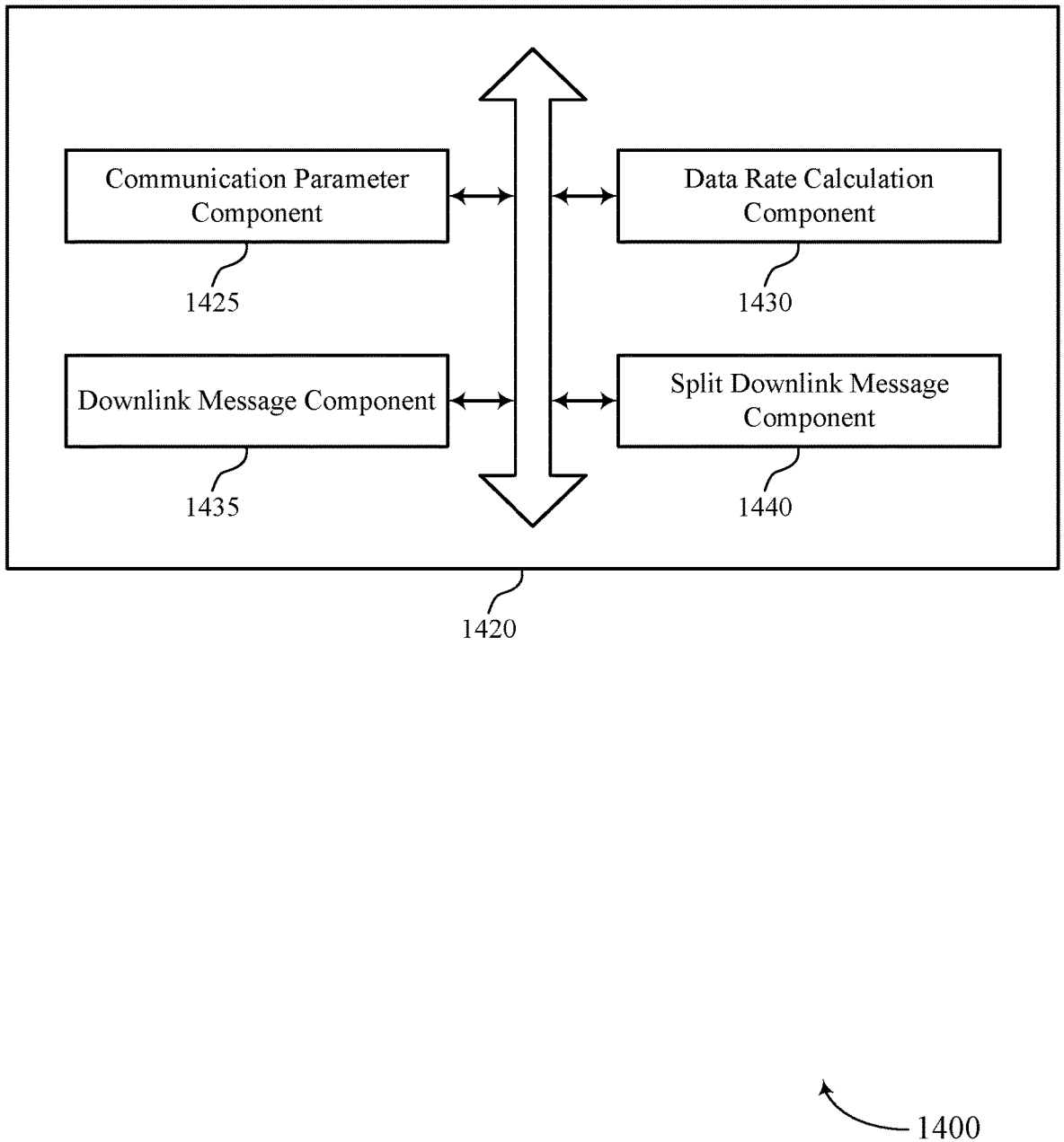
FIG. 14 shows a block diagram of a communications manager that supports UE processing capability for wireless communications with rate splitting in accordance with one or more aspects of the present disclosure.

FIG. 14 shows a block diagram 1400 of a communications manager 1420 that supports UE processing capability for wireless communications with rate splitting in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of UE processing capability for wireless communications with rate splitting as described herein. For example, the communications manager 1420 may include a communication parameter component 1425, a data rate calculation component 1430, a downlink message component 1435, a split downlink message component 1440, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The communication parameter component 1425 may be configured as or otherwise support a means for receiving an uplink message including a set of one or more communication parameters associated with reception by a UE of one or more downlink messages. In some examples, at least one downlink message of the one or more downlink messages may include a respective first portion with first information for the UE and a respective second portion with second information for the UE and at least one other UE based on a rate splitting procedure. The data rate calculation component 1430 may be configured as or otherwise support a means for determining a maximum data rate that is associated with the rate splitting procedure based on the set of one or more communication parameters indicated via the uplink message. The downlink message component 1435 may be configured as or otherwise support a means for transmitting the one or more downlink messages, where a data rate associated with the one or more downlink messages is less than or equal to the maximum data rate.

In some examples, to support transmitting the one or more downlink messages, the split downlink message component 1440 may be configured as or otherwise support a means for transmitting a first subset of the one or more downlink messages that are in accordance with the rate splitting procedure. In some examples, to support transmitting the one or more downlink messages, the downlink message component 1435 may be configured as or otherwise support a means for transmitting a second subset of the one or more downlink messages that are not in accordance with the rate splitting procedure, where the data rate is associated with both the first subset and the second subset of the one or more downlink messages based on the set of one or more communication parameters.

In some examples, the downlink message component 1435 may be configured as or otherwise support a means for transmitting one or more second downlink messages that are not in accordance with the rate splitting procedure, where a second data rate associated with the one or more second downlink messages is different than the maximum data rate associated with the one or more downlink messages.

In some examples, to support transmitting the one or more downlink messages, the split downlink message component 1440 may be configured as or otherwise support a means for transmitting the respective second portions of each of the one or more downlink messages in accordance with the data rate based on the set of one or more communication parameters. In some examples, to support transmitting the one or more downlink messages, the split downlink message component 1440 may be configured as or otherwise support a means for transmitting the respective first portions of each of the one or more downlink messages in accordance with a second data rate that is different than the data rate.

Figure 15:
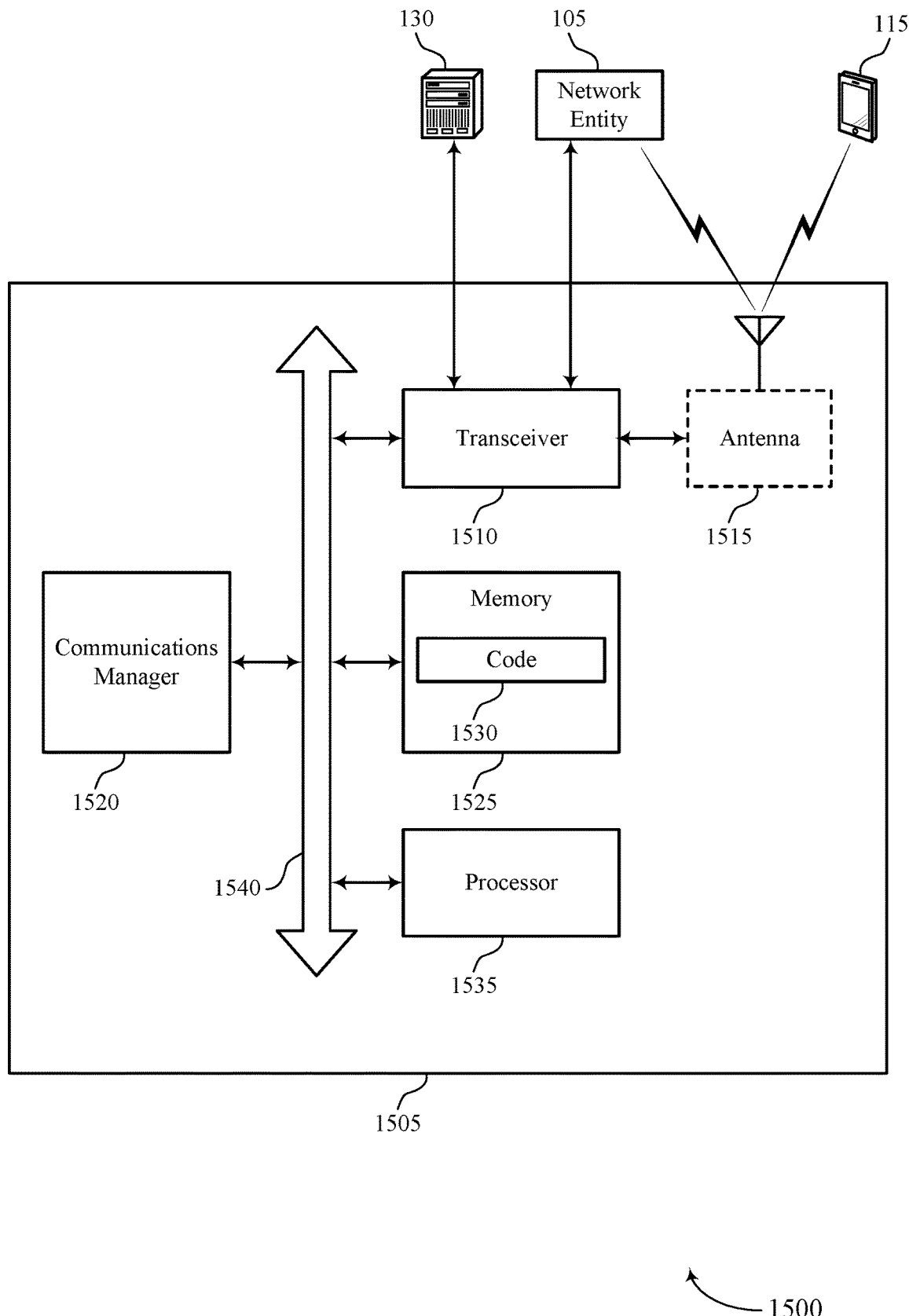
FIG. 15 shows a diagram of a system including a device that supports UE processing capability for wireless communications with rate splitting in accordance with one or more aspects of the present disclosure.

FIG. 15 shows a diagram of a system 1500 including a device 1505 that supports UE processing capability for wireless communications with rate splitting in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting UE processing capability for wireless communications with rate splitting). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505 and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105 and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for receiving an uplink message including a set of one or more communication parameters associated with reception by a UE of one or more downlink messages. In some examples, at least one downlink message of the one or more downlink messages may include a respective first portion with first information for the UE and a respective second portion with second information for the UE and at least one other UE based on a rate splitting procedure. The communications manager 1520 may be configured as or otherwise support a means for determining a maximum data rate that is associated with the rate splitting procedure based on the set of one or more communication parameters indicated via the uplink message. The communications manager 1520 may be configured as or otherwise support a means for transmitting the one or more downlink messages, where a data rate associated with the one or more downlink messages is less than or equal to the maximum data rate.

By including or configuring the communications manager 1520 in accordance with examples as described herein, the device 1505 may support techniques for improved communication reliability, reduced latency, reduced power consumption, more efficient utilization of communication resources, and improved coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. For example, the communications manager 1520 may be configured to receive or transmit messages or other signaling as described herein via the transceiver 1510. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of UE processing capability for wireless communications with rate splitting as described herein, or the processor 1535 and the memory 1525 may be otherwise configured to perform or support such operations.

Figure 16:
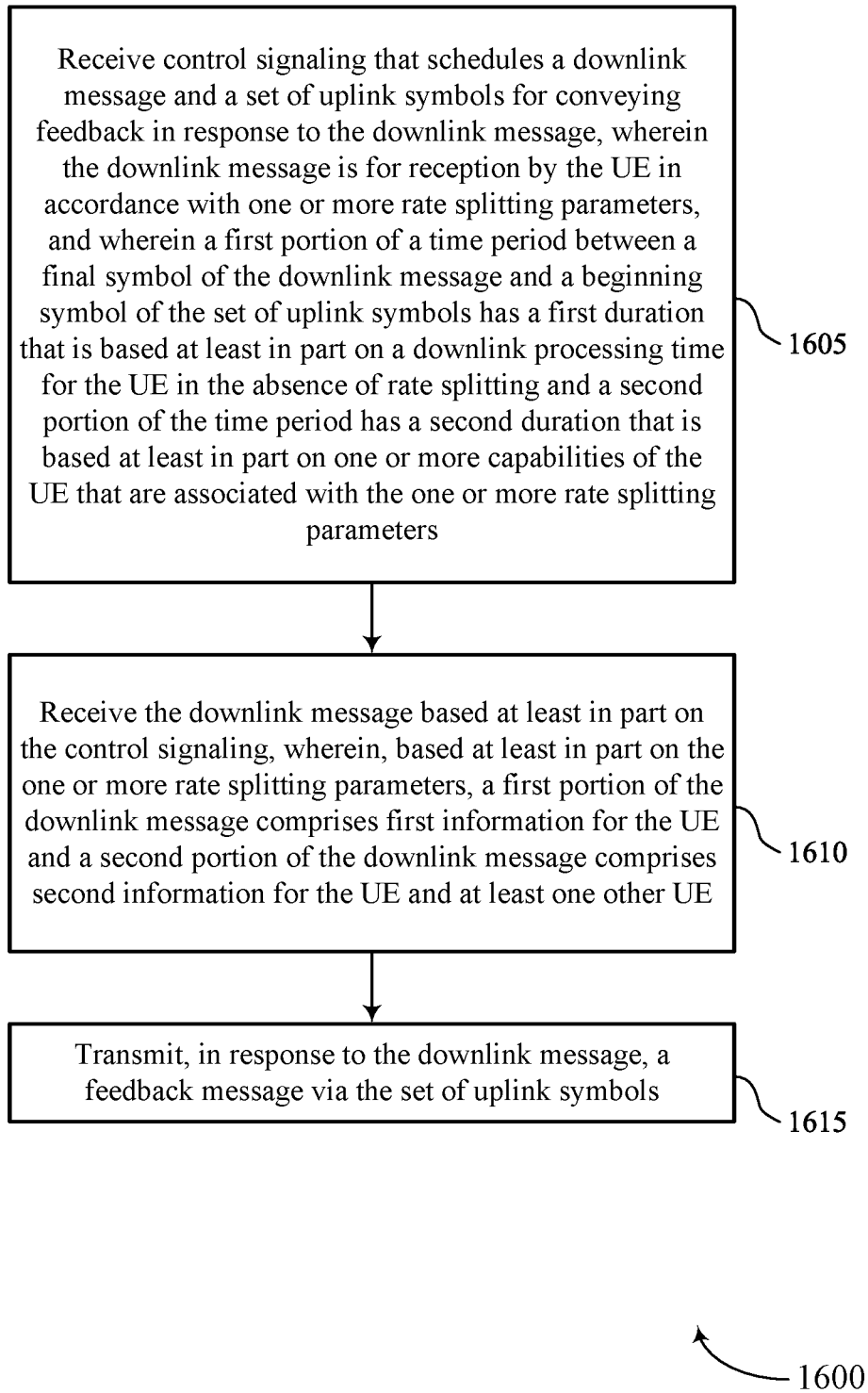
FIGS. 16 through 21 show flowcharts illustrating methods that support UE processing capability for wireless communications with rate splitting in accordance with one or more aspects of the present disclosure.

FIG. 16 shows a flowchart illustrating a method 1600 that supports UE processing capability for wireless communications with rate splitting in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that schedules a downlink message and a set of uplink symbols for conveying feedback in response to the downlink message, where the downlink message is for reception by the UE in accordance with one or more rate splitting parameters, and where a first portion of a time period between a final symbol of the downlink message and a beginning symbol of the set of uplink symbols has a first duration that is based on a downlink processing time for the UE in the absence of rate splitting and a second portion of the time period has a second duration that is based on one or more capabilities of the UE that are associated with the one or more rate splitting parameters. The operations of 1605 may be performed in accordance with examples as disclosed herein. In some examples, aspects of the operations of 1605 may be performed by a control signaling component 1025 as described with reference to FIG. 10. Additionally, or alternatively, means for performing 1605 may, but not necessarily, include, for example, antenna 1125, transceiver 1115, communications manager 1120, memory 1130 (including code 1135), processor 1140 and/or bus 1145.

At 1610, the method may include receiving the downlink message based on the control signaling, where, based on the one or more rate splitting parameters, a first portion of the downlink message includes first information for the UE and a second portion of the downlink message includes second information for the UE and at least one other UE. The operations of 1610 may be performed in accordance with examples as disclosed herein. In some examples, aspects of the operations of 1610 may be performed by a split downlink message processing component 1030 as described with reference to FIG. 10. Additionally, or alternatively, means for performing 1610 may, but not necessarily, include, for example, antenna 1125, transceiver 1115, communications manager 1120, memory 1130 (including code 1135), processor 1140 and/or bus 1145.

At 1615, the method may include transmitting, in response to the downlink message, a feedback message via the set of uplink symbols. The operations of 1615 may be performed in accordance with examples as disclosed herein. In some examples, aspects of the operations of 1615 may be performed by a feedback component 1035 as described with reference to FIG. 10. Additionally, or alternatively, means for performing 1615 may, but not necessarily, include, for example, antenna 1125, transceiver 1115, communications manager 1120, memory 1130 (including code 1135), processor 1140 and/or bus 1145.

Figure 17:
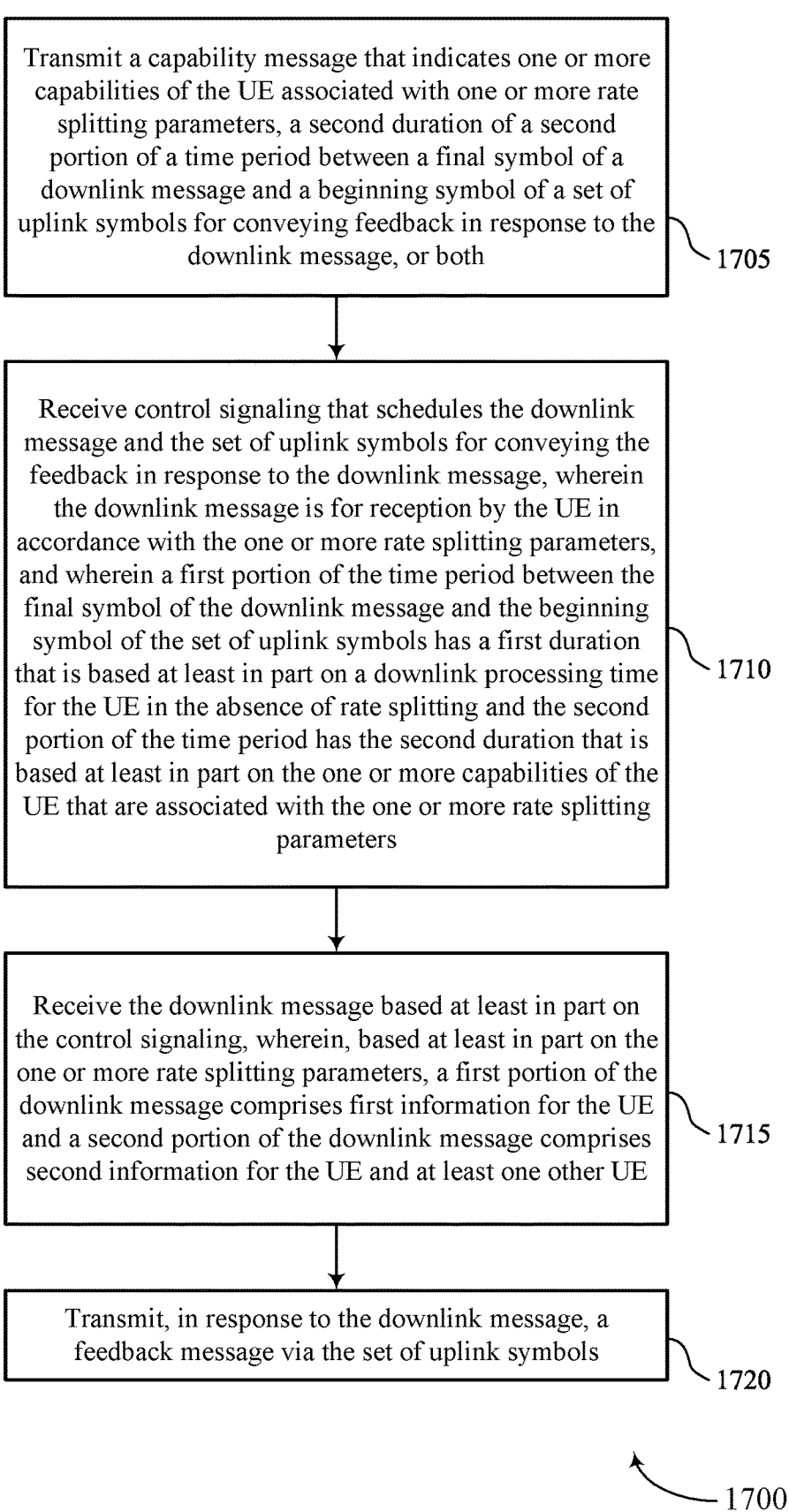

FIG. 17 shows a flowchart illustrating a method 1700 that supports UE processing capability for wireless communications with rate splitting in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include transmitting a capability message that indicates one or more capabilities of the UE associated with one or more rate splitting parameters, a second duration of a second portion of a time period between a final symbol of a downlink message and a beginning symbol of a set of uplink symbols for conveying feedback in response to the downlink message, or both. The operations of 1705 may be performed in accordance with examples as disclosed herein. In some examples, aspects of the operations of 1705 may be performed by a capability component 1040 as described with reference to FIG. 10. Additionally, or alternatively, means for performing 1705 may, but not necessarily, include, for example, antenna 1125, transceiver 1115, communications manager 1120, memory 1130 (including code 1135), processor 1140 and/or bus 1145.

At 1710, the method may include receiving control signaling that schedules the downlink message and the set of uplink symbols for conveying feedback in response to the downlink message, where the downlink message is for reception by the UE in accordance with the one or more rate splitting parameters, and where a first portion of the time period between the final symbol of the downlink message and the beginning symbol of the set of uplink symbols has a first duration that is based on a downlink processing time for the UE in the absence of rate splitting and the second portion of the time period has the second duration that is based on the one or more capabilities of the UE that are associated with the one or more rate splitting parameters. The operations of 1710 may be performed in accordance with examples as disclosed herein. In some examples, aspects of the operations of 1710 may be performed by a control signaling component 1025 as described with reference to FIG. 10. Additionally, or alternatively, means for performing 1710 may, but not necessarily, include, for example, antenna 1125, transceiver 1115, communications manager 1120, memory 1130 (including code 1135), processor 1140 and/or bus 1145.

At 1715, the method may include receiving the downlink message based on the control signaling, where, based on the one or more rate splitting parameters, a first portion of the downlink message includes first information for the UE and a second portion of the downlink message includes second information for the UE and at least one other UE. The operations of 1715 may be performed in accordance with examples as disclosed herein. In some examples, aspects of the operations of 1715 may be performed by a split downlink message processing component 1030 as described with reference to FIG. 10. Additionally, or alternatively, means for performing 1715 may, but not necessarily, include, for example, antenna 1125, transceiver 1115, communications manager 1120, memory 1130 (including code 1135), processor 1140 and/or bus 1145.

At 1720, the method may include transmitting, in response to the downlink message, a feedback message via the set of uplink symbols. The operations of 1720 may be performed in accordance with examples as disclosed herein. In some examples, aspects of the operations of 1720 may be performed by a feedback component 1035 as described with reference to FIG. 10. Additionally, or alternatively, means for performing 1720 may, but not necessarily, include, for example, antenna 1125, transceiver 1115, communications manager 1120, memory 1130 (including code 1135), processor 1140 and/or bus 1145.

Figure 18:
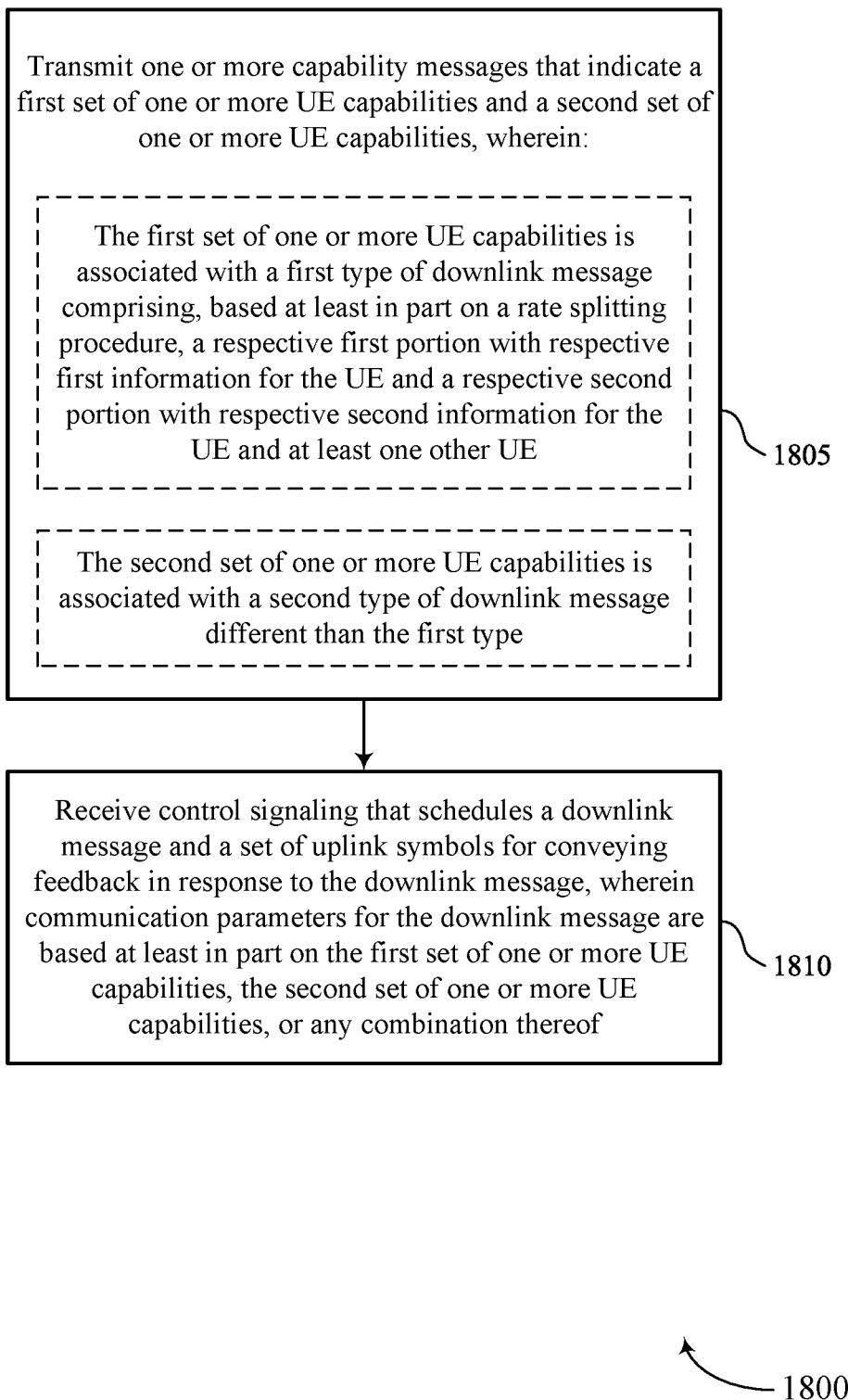

FIG. 18 shows a flowchart illustrating a method 1800 that supports UE processing capability for wireless communications with rate splitting in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include transmitting one or more capability messages that indicate a first set of one or more UE capabilities and a second set of one or more UE capabilities. In some examples, the first set of one or more UE capabilities may be associated with a first type of downlink message including, based on a rate splitting procedure, a respective first portion with respective first information for the UE and a respective second portion with respective second information for the UE and at least one other UE and the second set of one or more UE capabilities may be associated with a second type of downlink message different than the first type. The operations of 1805 may be performed in accordance with examples as disclosed herein. In some examples, aspects of the operations of 1805 may be performed by a capability component 1040 as described with reference to FIG. 10. Additionally, or alternatively, means for performing 1805 may, but not necessarily, include, for example, antenna 1125, transceiver 1115, communications manager 1120, memory 1130 (including code 1135), processor 1140 and/or bus 1145.

At 1810, the method may include receiving control signaling that schedules a downlink message and a set of uplink symbols for conveying feedback in response to the downlink message, where communication parameters for the downlink message are based on the first set of one or more UE capabilities, the second set of one or more UE capabilities, or any combination thereof. The operations of 1810 may be performed in accordance with examples as disclosed herein. In some examples, aspects of the operations of 1810 may be performed by a control signaling component 1025 as described with reference to FIG. 10. Additionally, or alternatively, means for performing 1810 may, but not necessarily, include, for example, antenna 1125, transceiver 1115, communications manager 1120, memory 1130 (including code 1135), processor 1140 and/or bus 1145.

Figure 19:
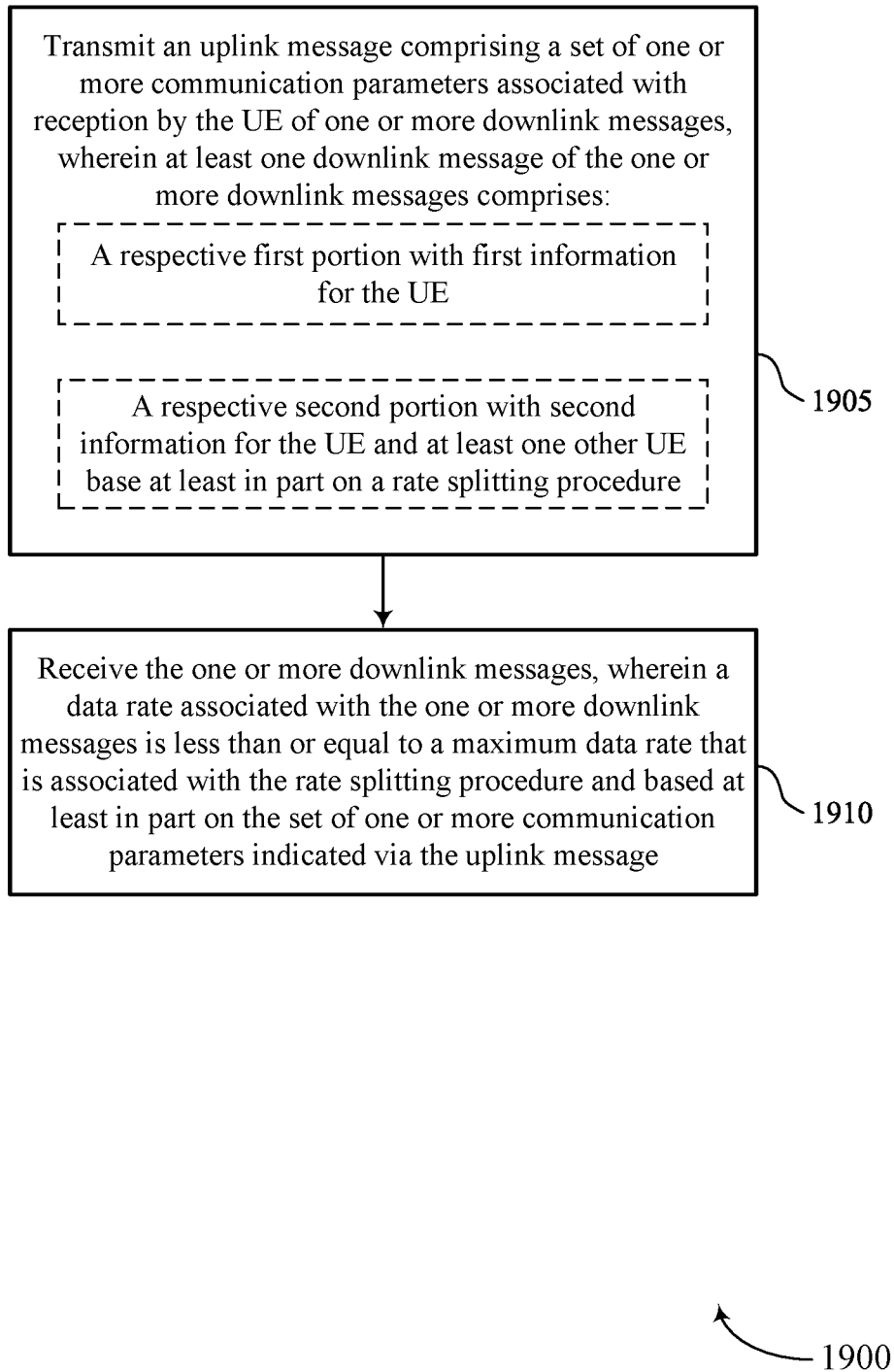

FIG. 19 shows a flowchart illustrating a method 1900 that supports UE processing capability for wireless communications with rate splitting in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include transmitting an uplink message including a set of one or more communication parameters associated with reception by the UE of one or more downlink messages. In some examples, at least one downlink message of the one or more downlink messages may include a respective first portion with first information for the UE and a respective second portion with second information for the UE and at least one other UE based on a rate splitting procedure. The operations of 1905 may be performed in accordance with examples as disclosed herein. In some examples, aspects of the operations of 1905 may be performed by a communication parameter component 1045 as described with reference to FIG. 10. Additionally, or alternatively, means for performing 1905 may, but not necessarily, include, for example, antenna 1125, transceiver 1115, communications manager 1120, memory 1130 (including code 1135), processor 1140 and/or bus 1145.

At 1910, the method may include receiving the one or more downlink messages, where a data rate associated with the one or more downlink messages is less than or equal to a maximum data rate that is associated with the rate splitting procedure and based on the set of one or more communication parameters indicated via the uplink message. The operations of 1910 may be performed in accordance with examples as disclosed herein. In some examples, aspects of the operations of 1910 may be performed by a downlink data rate component 1050 as described with reference to FIG. 10. Additionally, or alternatively, means for performing 1910 may, but not necessarily, include, for example, antenna 1125, transceiver 1115, communications manager 1120, memory 1130 (including code 1135), processor 1140 and/or bus 1145.

Figure 20:
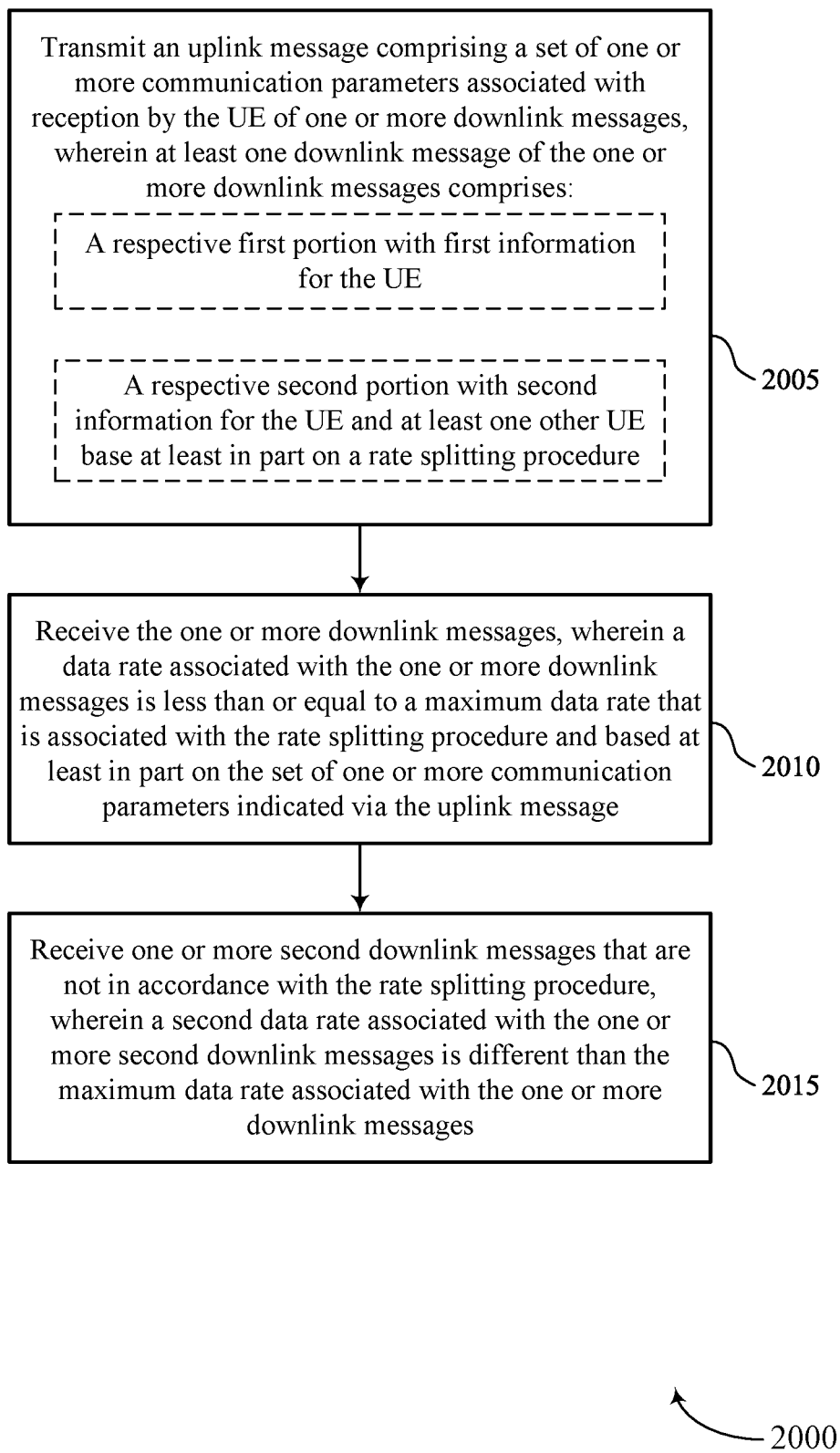

FIG. 20 shows a flowchart illustrating a method 2000 that supports UE processing capability for wireless communications with rate splitting in accordance with one or more aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include transmitting an uplink message including a set of one or more communication parameters associated with reception by the UE of one or more downlink messages. In some examples, at least one downlink message of the one or more downlink messages may include a respective first portion with first information for the UE and a respective second portion with second information for the UE and at least one other UE based on a rate splitting procedure. The operations of 2005 may be performed in accordance with examples as disclosed herein. In some examples, aspects of the operations of 2005 may be performed by a communication parameter component 1045 as described with reference to FIG. 10. Additionally, or alternatively, means for performing 2005 may, but not necessarily, include, for example, antenna 1125, transceiver 1115, communications manager 1120, memory 1130 (including code 1135), processor 1140 and/or bus 1145.

At 2010, the method may include receiving the one or more downlink messages, where a data rate associated with the one or more downlink messages is less than or equal to a maximum data rate that is associated with the rate splitting procedure and based on the set of one or more communication parameters indicated via the uplink message. The operations of 2010 may be performed in accordance with examples as disclosed herein. In some examples, aspects of the operations of 2010 may be performed by a downlink data rate component 1050 as described with reference to FIG. 10. Additionally, or alternatively, means for performing 2010 may, but not necessarily, include, for example, antenna 1125, transceiver 1115, communications manager 1120, memory 1130 (including code 1135), processor 1140 and/or bus 1145.

At 2015, the method may include receiving one or more second downlink messages that are not in accordance with the rate splitting procedure, where a second data rate associated with the one or more second downlink messages is different than the maximum data rate associated with the one or more downlink messages. The operations of 2015 may be performed in accordance with examples as disclosed herein. In some examples, aspects of the operations of 2015 may be performed by a downlink message processing component 1055 as described with reference to FIG. 10. Additionally, or alternatively, means for performing 2015 may, but not necessarily, include, for example, antenna 1125, transceiver 1115, communications manager 1120, memory 1130 (including code 1135), processor 1140 and/or bus 1145.

Figure 21:
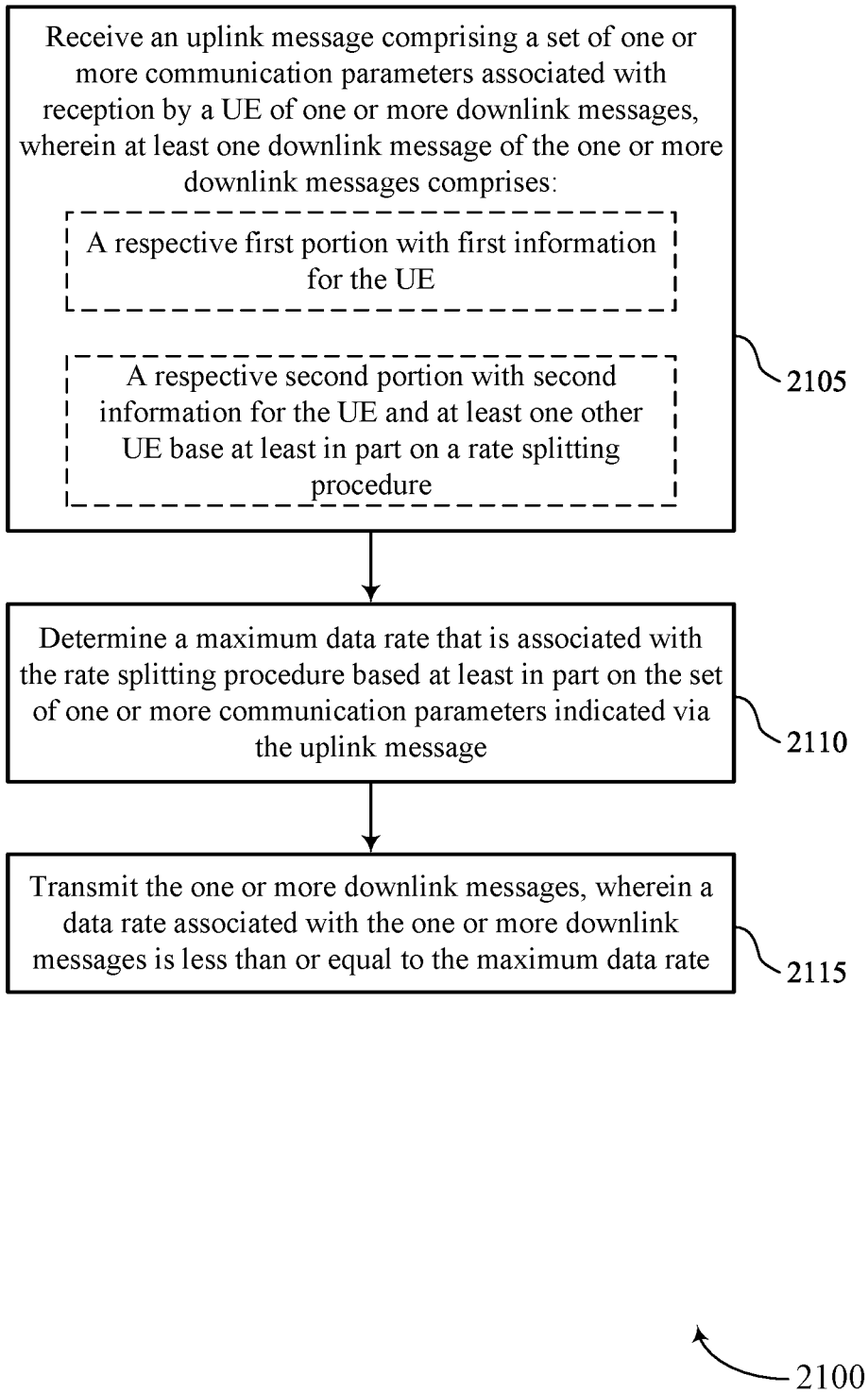

FIG. 21 shows a flowchart illustrating a method 2100 that supports UE processing capability for wireless communications with rate splitting in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include receiving an uplink message including a set of one or more communication parameters associated with reception by a UE of one or more downlink messages. In some examples, at least one downlink message of the one or more downlink messages may include a respective first portion with first information for the UE and a respective second portion with second information for the UE and at least one other UE based on a rate splitting procedure. The operations of 2105 may be performed in accordance with examples as disclosed herein. In some examples, aspects of the operations of 2105 may be performed by a communication parameter component 1425 as described with reference to FIG. 14. Additionally, or alternatively, means for performing 2105 may, but not necessarily, include, for example, antenna 1515, transceiver 1510, communications manager 1520, memory 1525 (including code 1530), processor 1535 and/or bus 1540.

At 2110, the method may include determining a maximum data rate that is associated with the rate splitting procedure based on the set of one or more communication parameters indicated via the uplink message. The operations of 2110 may be performed in accordance with examples as disclosed herein. In some examples, aspects of the operations of 2110 may be performed by a data rate calculation component 1430 as described with reference to FIG. 14. Additionally, or alternatively, means for performing 2110 may, but not necessarily, include, for example, antenna 1515, transceiver 1510, communications manager 1520, memory 1525 (including code 1530), processor 1535 and/or bus 1540.

At 2115, the method may include transmitting the one or more downlink messages, where a data rate associated with the one or more downlink messages is less than or equal to the maximum data rate. The operations of 2115 may be performed in accordance with examples as disclosed herein. In some examples, aspects of the operations of 2115 may be performed by a downlink message component 1435 as described with reference to FIG. 14. Additionally, or alternatively, means for performing 2115 may, but not necessarily, include, for example, antenna 1515, transceiver 1510, communications manager 1520, memory 1525 (including code 1530), processor 1535 and/or bus 1540.

The following provides an overview of aspects of the present disclosure:

Aspect 1: A method for wireless communication at a UE, comprising: receiving control signaling that schedules a downlink message and a set of uplink symbols for conveying feedback in response to the downlink message, wherein the downlink message is for reception by the UE in accordance with one or more rate splitting parameters, and wherein a first portion of a time period between a final symbol of the downlink message and a beginning symbol of the set of uplink symbols has a first duration that is based at least in part on a downlink processing time for the UE in the absence of rate splitting and a second portion of the time period has a second duration that is based at least in part on one or more capabilities of the UE that are associated with the one or more rate splitting parameters; receiving the downlink message based at least in part on the control signaling, wherein, based at least in part on the one or more rate splitting parameters, a first portion of the downlink message comprises first information for the UE and a second portion of the downlink message comprises second information for the UE and at least one other UE; and transmitting, in response to the downlink message, a feedback message via the set of uplink symbols.

Aspect 2: The method of aspect 1, further comprising: transmitting a capability message that indicates the one or more capabilities of the UE associated with the one or more rate splitting parameters, the second duration of the second portion of the time period, or both.

Aspect 3: The method of aspect 2, wherein transmitting the capability message comprises: transmitting, via the capability message, a plurality of second durations comprising at least the second duration, wherein each second duration of the plurality of second durations is associated with a respective group of one or more rate splitting parameters.

Aspect 4: The method of aspect 1, wherein: the second duration is one of a plurality of second durations each associated with a respective combination of one or more capabilities of the UE and one or more rate splitting parameters; and the second duration is associated with the one or more capabilities of the UE that are associated with the one or more rate splitting parameters.

Aspect 5: The method of any of aspects 1 through 4, wherein: the one or more capabilities of the UE associated with the one or more rate splitting parameters comprise a processing capability of the UE when receiving downlink messages in accordance with the one or more rate splitting parameters, a type of reception supported by the UE when receiving downlink messages in accordance with the one or more rate splitting parameters, or both; and the one or more rate splitting parameters comprise an SCS of communications, a quantity of downlink shared channel transmissions per slot, or both.

Aspect 6: The method of aspect 5, wherein the type of reception supported by the UE is a first type based at least in part on successive interference cancellation, a second type based at least in part on joint demodulation and decoding of the second portion of the downlink message comprising the second information for the UE and the at least one other UE, or a third type based at least in part on joint demodulation without decoding of the second portion of the downlink message.

Aspect 7: A method for wireless communication at a UE, comprising: transmitting one or more capability messages that indicate a first set of one or more UE capabilities and a second set of one or more UE capabilities, wherein: the first set of one or more UE capabilities are associated with a first type of downlink message comprising, based at least in part on a rate splitting procedure, a respective first portion with respective first information for the UE and a respective second portion with respective second information for the UE and at least one other UE; and the second set of one or more UE capabilities are associated with a second type of downlink message different than the first type; and receiving control signaling that schedules a downlink message and a set of uplink symbols for conveying feedback in response to the downlink message, wherein communication parameters for the downlink message are based at least in part on the first set of one or more UE capabilities, the second set of one or more UE capabilities, or any combination thereof.

Aspect 8: The method of aspect 7, wherein the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period; and transmitting the one or more capability messages comprises transmitting a capability message that indicates whether the UE supports the second UE processing capability for reception of the first type of downlink message based at least in part on the rate splitting procedure.

Aspect 9: The method of aspect 8, wherein the UE supports the second UE processing capability, the method further comprising: receiving the downlink message, wherein the downlink message is of the first type and comprises a first portion with first information for the UE and a second portion with second information for the UE and the at least one other UE based at least in part on the rate splitting procedure, wherein the downlink message is in accordance with the rate splitting procedure based at least in part on the capability message indicating that the UE supports the second UE processing capability for reception of the first type of downlink message.

Aspect 10: The method of aspect 8, wherein the UE supports the second UE processing capability, the method further comprising: receiving the downlink message, wherein the downlink message is of the second type and is not in accordance with the rate splitting procedure based at least in part on the capability message indicating that the UE does not support the second UE processing capability for reception of the second type of downlink message.

Aspect 11: The method of any of aspects 7 through 10, wherein transmitting the one or more capability messages comprises: transmitting a capability message that indicates a quantity of downlink messages the UE is capable of receiving per slot when at least one of the downlink messages is of the first type to which the rate splitting procedure is applied, wherein the communication parameters for the downlink message comprise a quantity of downlink messages transmitted in a same slot as the downlink message.

Aspect 12: The method of aspect 11, wherein the indicated quantity of downlink messages comprises a total quantity of downlink messages that the UE is capable of receiving per slot when at least one of the downlink messages is of the first type to which the rate splitting procedure is applied.

Aspect 13: The method of aspect 11, wherein: the indicated quantity of downlink messages comprises a first quantity of downlink messages of the first type to which the rate splitting procedure is applied, and the capability message further indicates a second quantity of downlink messages of the second type that the UE is capable of receiving per slot.

Aspect 14: The method of aspect 11, wherein the indicated quantity of downlink messages comprises downlink messages of the first type to which the rate splitting procedure is applied and excludes downlink messages of the second type to which the rate splitting procedure is not applied.

Aspect 15: The method of any of aspects 7 through 14, wherein: the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period; and transmitting the one or more capability messages comprises transmitting a capability message that indicates a maximum quantity of component carriers supported by the UE in accordance with the second UE processing capability when receiving downlink messages of the first type in accordance with the rate splitting procedure.

Aspect 16: The method of aspect 15, wherein transmitting the capability message comprises: transmitting, via the capability message, an indication that, when a quantity of component carriers in a set of component carriers configured for communications by the UE is greater than the maximum quantity, the UE supports the second UE processing capability on a component carrier associated with a lowest cell index value from among a plurality of cell index values associated with the set of component carriers configured for communications by the UE and supports the first UE processing capability for each other component carrier included in the set of component carriers configured for communications by the UE.

Aspect 17: The method of aspect 15, wherein transmitting the capability message comprises: transmitting, via the capability message, an indication that, when a quantity of component carriers configured for communications by the UE is greater than the maximum quantity, the UE supports the first UE processing capability for each component carrier included in the quantity of component carriers configured for communications by the UE.

Aspect 18: The method of any of aspects 7 through 17, wherein transmitting the one or more capability messages comprises: transmitting, via the one or more capability messages, an indication of a respective first set of UE capabilities and a respective second set of UE capabilities for each SCS of a plurality of SCSs supported by the UE.

Aspect 19: The method of any of aspects 7 through 18, wherein transmitting the one or more capability messages comprises: transmitting, via the one or more capability messages, an indication of a respective first set of UE capabilities and a respective second set of UE capabilities for each type of reception of a plurality of types of reception supported by the UE, wherein the plurality of types of reception comprise a first type based at least in part on successive interference cancelation, a second type based at least in part on joint demodulation and decoding of a second portion of the downlink message comprising the respective second information for the UE and the at least one other UE, or a third type based at least in part on joint demodulation without decoding of the second portion of the downlink message.

Aspect 20: A method for wireless communication at a UE, comprising: transmitting an uplink message comprising a set of one or more communication parameters associated with reception by the UE of one or more downlink messages, wherein at least one downlink message of the one or more downlink messages comprises: a respective first portion with first information for the UE; and a respective second portion with second information for the UE and at least one other UE based at least in part on a rate splitting procedure; and receiving the one or more downlink messages, wherein a data rate associated with the one or more downlink messages is less than or equal to a maximum data rate that is associated with the rate splitting procedure and based at least in part on the set of one or more communication parameters indicated via the uplink message.

Aspect 21: The method of aspect 20, wherein receiving the one or more downlink messages comprises: receiving a first subset of the one or more downlink messages that are in accordance with the rate splitting procedure; and receiving a second subset of the one or more downlink messages that are not in accordance with the rate splitting procedure, wherein the data rate is associated with both the first subset and the second subset of the one or more downlink messages based at least in part on the set of one or more communication parameters.

Aspect 22: The method of aspect 20, further comprising: receiving one or more second downlink messages that are not in accordance with the rate splitting procedure, wherein a second data rate associated with the one or more second downlink messages is different than the maximum data rate associated with the one or more downlink messages.

Aspect 23: The method of aspect 22, wherein receiving the one or more downlink messages comprises: receiving the respective first portions and the respective second portions of each of the one or more downlink messages in accordance with the data rate based at least in part on the set of one or more communication parameters.

Aspect 24: The method of aspect 20, wherein receiving the one or more downlink messages comprises: receiving the respective second portions of each of the one or more downlink messages in accordance with the data rate based at least in part on the set of one or more communication parameters; and receiving the respective first portions of each of the one or more downlink messages in accordance with a second data rate that is different than the data rate.

Aspect 25: The method of aspect 20 through 24, wherein the data rate is based at least in part on a data rate function and the set of one or more communication parameters.

Aspect 26: The method of any of aspects 20 through 25, wherein the set of one or more communication parameters comprises a quantity of layers, a modulation order, and a scaling factor associated with the respective second portions of the one or more downlink messages.

Aspect 27: A method for wireless communication at a network entity, comprising: receiving an uplink message comprising a set of one or more communication parameters associated with reception by a UE of one or more downlink messages, wherein at least one downlink message of the one or more downlink messages comprises: a respective first portion with first information for the UE; and a respective second portion with second information for the UE and at least one other UE based at least in part on a rate splitting procedure; determining a maximum data rate for the UE that is associated with the rate splitting procedure based at least in part on the set of one or more communication parameters indicated via the uplink message; and transmitting the one or more downlink messages to the UE, wherein a data rate associated with the one or more downlink messages is less than or equal to the maximum data rate.

Aspect 28: The method of aspect 27, wherein transmitting the one or more downlink messages comprises: transmitting a first subset of the one or more downlink messages that are in accordance with the rate splitting procedure; and transmitting a second subset of the one or more downlink messages that are not in accordance with the rate splitting procedure, wherein the data rate is associated with both the first subset and the second subset of the one or more downlink messages based at least in part on the set of one or more communication parameters.

Aspect 29: The method of aspect 27, further comprising: transmitting one or more second downlink messages that are not in accordance with the rate splitting procedure, wherein a second data rate associated with the one or more second downlink messages is different than the maximum data rate associated with the one or more downlink messages.

Aspect 30: The method of aspect 27, wherein transmitting the one or more downlink messages comprises: transmitting the respective second portions of each of the one or more downlink messages in accordance with the data rate based at least in part on the set of one or more communication parameters; and transmitting the respective first portions of each of the one or more downlink messages in accordance with a second data rate that is different than the data rate.

Aspect 31: An apparatus comprising a memory, a transceiver, and at least one processor coupled with the memory and the transceiver, the at least one processor configured to perform a method of any of aspects 1 through 6.

Aspect 32: An apparatus for wireless communication at a UE, comprising at least one means for performing a method of any of aspects 1 through 6.

Aspect 33: A non-transitory computer-readable medium storing code for wireless communication at a UE, the code comprising instructions executable by a processor to perform a method of any of aspects 1 through 6.

Aspect 34: An apparatus comprising a memory, a transceiver, and at least one processor coupled with the memory and the transceiver, the at least one processor configured to perform a method of any of aspects 7 through 19.

Aspect 35: An apparatus for wireless communication at a UE, comprising at least one means for performing a method of any of aspects 7 through 19.

Aspect 36: A non-transitory computer-readable medium storing code for wireless communication at a UE, the code comprising instructions executable by a processor to perform a method of any of aspects 7 through 19.

Aspect 37: An apparatus comprising a memory, a transceiver, and at least one processor coupled with the memory and the transceiver, the at least one processor configured to cause the apparatus to perform a method of any of aspects 20 through 26.

Aspect 38: An apparatus for wireless communication at a UE, comprising at least one means for performing a method of any of aspects 20 through 26.

Aspect 39: A non-transitory computer-readable medium storing code for wireless communication at a UE, the code comprising instructions executable by a processor to perform a method of any of aspects 20 through 26.

Aspect 40: An apparatus comprising a memory, a transceiver, and at least one processor coupled with the memory and the transceiver, the at least one processor configured to perform a method of any of aspects 27 through 30.

Aspect 41: An apparatus for wireless communication at a network entity, comprising at least one means for performing a method of any of aspects 27 through 30.

Aspect 42: A non-transitory computer-readable medium storing code for wireless communication at a network entity, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving control signaling that schedules a downlink message and a set of uplink symbols for conveying feedback in response to the downlink message, wherein the downlink message is for reception by the UE in accordance with one or more rate splitting parameters, and wherein a first portion of a time period between a final symbol of the downlink message and a beginning symbol of the set of uplink symbols has a first duration that is based at least in part on a downlink processing time for the UE in the absence of rate splitting and a second portion of the time period has a second duration that is based at least in part on one or more capabilities of the UE that are associated with the one or more rate splitting parameters;

receiving the downlink message based at least in part on the control signaling, wherein, based at least in part on the one or more rate splitting parameters, a first portion of the downlink message comprises first information for the UE and a second portion of the downlink message comprises second information for the UE and at least one other UE; and transmitting, in response to the downlink message, a feedback message via the set of uplink symbols.

2. The method of claim 1, further comprising:
transmitting a capability message that indicates the one or more capabilities of the UE associated with the one or more rate splitting parameters, the second duration of the second portion of the time period, or both.

3. The method of claim 2, wherein transmitting the capability message comprises:
transmitting, via the capability message, a plurality of second durations comprising at least the second duration, wherein each second duration of the plurality of second durations is associated with a respective group of one or more rate splitting parameters.

4. The method of claim 1, wherein:
the second duration is one of a plurality of second durations each associated with a respective combination of one or more capabilities of the UE and one or more rate splitting parameters; and
the second duration is associated with the one or more capabilities of the UE that are associated with the one or more rate splitting parameters.

5. The method of claim 1, wherein:
the one or more capabilities of the UE associated with the one or more rate splitting parameters comprise a processing capability of the UE when receiving downlink messages in accordance with the one or more rate splitting parameters, a type of reception supported by the UE when receiving downlink messages in accordance with the one or more rate splitting parameters, or both; and
the one or more rate splitting parameters comprise a subcarrier spacing of communications, a quantity of downlink shared channel transmissions per slot, or both.

6. The method of claim 5, wherein the type of reception supported by the UE is a first type based at least in part on successive interference cancelation, a second type based at least in part on joint demodulation and decoding of the second portion of the downlink message comprising the second information for the UE and the at least one other UE, or a third type based at least in part on joint demodulation without decoding of the second portion of the downlink message.

7. A method for wireless communication at a user equipment (UE), comprising:

transmitting one or more capability messages that indicate a first set of one or more UE capabilities and a second set of one or more UE capabilities, wherein:
the UE supports a first UE processing capability corresponding to a first time period and a second UE processing capability corresponding to a second time period for processing a downlink message before transmitting feedback in response to the downlink message, the second time period shorter than the first time period;
the first set of one or more UE capabilities indicate whether the UE supports the second UE processing capability for reception of a first type of downlink message comprising, based at least in part on a rate splitting procedure, a respective first portion with respective first information for the UE and a respective second portion with respective second information for the UE and at least one other UE; and
the second set of one or more UE capabilities are associated with a second type of downlink message different than the first type; and receiving control signaling that schedules the downlink message and a set of uplink symbols for conveying the feedback in response to the downlink message, wherein communication parameters for the downlink message are based at least in part on the first set of one or more UE capabilities, the second set of one or more UE capabilities, or any combination thereof.

8. The method of claim 7, wherein the UE supports the second UE processing capability, the method further comprising:
receiving the downlink message, wherein the downlink message is of the first type and comprises a first portion with first information for the UE and a second portion with second information for the UE and the at least one other UE based at least in part on the rate splitting procedure, wherein the downlink message is in accordance with the rate splitting procedure based at least in part on the one or more capability messages indicating that the UE supports the second UE processing capability for reception of the first type of downlink message.

9. The method of claim 7, wherein the UE supports the second UE processing capability, the method further comprising:
receiving the downlink message, wherein the downlink message is of the second type and is not in accordance with the rate splitting procedure based at least in part on the one or more capability messages indicating that the UE does not support the second UE processing capability for reception of the second type of downlink message.

10. The method of claim 7, wherein transmitting the one or more capability messages comprises:
transmitting a capability message that indicates a quantity of downlink messages the UE is capable of receiving per slot when at least one of the downlink messages is of the first type to which the rate splitting procedure is applied, wherein the communication parameters for the downlink message comprise a quantity of downlink messages transmitted in a same slot as the downlink message.

11. The method of claim 10, wherein the indicated quantity of downlink messages comprises a total quantity of downlink messages that the UE is capable of receiving per slot when at least one of the downlink messages is of the first type to which the rate splitting procedure is applied.

12. The method of claim 10, wherein:
the indicated quantity of downlink messages comprises a first quantity of downlink messages of the first type to which the rate splitting procedure is applied; and
the capability message further indicates a second quantity of downlink messages of the second type that the UE is capable of receiving per slot.

13. The method of claim 10, wherein the indicated quantity of downlink messages comprises downlink messages of the first type to which the rate splitting procedure is applied and excludes downlink messages of the second type to which the rate splitting procedure is not applied.

14. The method of claim 7, wherein:
the UE supports a first UE processing capability corresponding to a first time period for processing the downlink message before transmitting the feedback in response to the downlink message, a second UE processing capability corresponding to a second time period for processing the downlink message before transmitting the feedback in response to the downlink message, or both, the second time period shorter than the first time period; and
transmitting the one or more capability messages comprises transmitting a capability message that indicates a maximum quantity of component carriers supported by the UE in accordance with the second UE processing capability when receiving downlink messages of the first type in accordance with the rate splitting procedure.

15. The method of claim 14, wherein transmitting the capability message comprises:
transmitting, via the capability message, an indication that, when a quantity of component carriers in a set of component carriers configured for communications by the UE is greater than the maximum quantity, the UE supports the second UE processing capability on a component carrier associated with a lowest cell index value from among a plurality of cell index values associated with the set of component carriers configured for communications by the UE and supports the first UE processing capability for each other component carrier included in the set of component carriers configured for communications by the UE.

16. The method of claim 14, wherein transmitting the capability message comprises:
transmitting, via the capability message, an indication that, when a quantity of component carriers configured for communications by the UE is greater than the maximum quantity, the UE supports the first UE processing capability for each component carrier included in the quantity of component carriers configured for communications by the UE.

17. The method of claim 7, wherein transmitting the one or more capability messages comprises:
transmitting, via the one or more capability messages, an indication of a respective first set of UE capabilities and a respective second set of UE capabilities for each subcarrier spacing of a plurality of subcarrier spacings supported by the UE.

18. The method of claim 7, wherein transmitting the one or more capability messages comprises:
transmitting, via the one or more capability messages, an indication of a respective first set of UE capabilities and a respective second set of UE capabilities for each type of reception of a plurality of types of reception supported by the UE, wherein the plurality of types of reception comprise a first type based at least in part on successive interference cancelation, a second type based at least in part on joint demodulation and decoding of a second portion of the downlink message comprising the respective second information for the UE and the at least one other UE, or a third type based at least in part on joint demodulation without decoding of the second portion of the downlink message.

19. A method for wireless communication at a user equipment (UE), comprising:
transmitting an uplink message comprising a set of one or more communication parameters associated with reception by the UE of one or more downlink messages, wherein at least one downlink message of the one or more downlink messages comprises:
a respective first portion with first information for the UE; and
a respective second portion with second information for the UE and at least one other UE based at least in part on a rate splitting procedure; and
receiving the one or more downlink messages, wherein a data rate associated with the one or more downlink messages is less than or equal to a maximum data rate that is associated with the rate splitting procedure and based at least in part on the set of one or more communication parameters indicated via the uplink message.

20. The method of claim 19, wherein receiving the one or more downlink messages comprises:
receiving a first subset of the one or more downlink messages that are in accordance with the rate splitting procedure; and
receiving a second subset of the one or more downlink messages that are not in accordance with the rate splitting procedure, wherein the data rate is associated with both the first subset and the second subset of the one or more downlink messages based at least in part on the set of one or more communication parameters.

21. The method of claim 19, further comprising:
receiving one or more second downlink messages that are not in accordance with the rate splitting procedure, wherein a second data rate associated with the one or more second downlink messages is different than the maximum data rate associated with the one or more downlink messages.

22. The method of claim 21, wherein receiving the one or more downlink messages comprises:
receiving the respective first portions and the respective second portions of each of the one or more downlink messages in accordance with the data rate based at least in part on the set of one or more communication parameters.

23. The method of claim 19, wherein receiving the one or more downlink messages comprises:
receiving the respective second portions of each of the one or more downlink messages in accordance with the data rate based at least in part on the set of one or more communication parameters; and
receiving the respective first portions of each of the one or more downlink messages in accordance with a second data rate that is different than the data rate.

24. The method of claim 19, wherein the data rate is based at least in part on a data rate function and the set of one or more communication parameters.

25. The method of claim 19, wherein the set of one or more communication parameters comprises a quantity of layers, a modulation order, and a scaling factor associated with the respective second portions of the one or more downlink messages.

26. A method for wireless communication at a network entity, comprising:
    receiving an uplink message comprising a set of one or more communication parameters associated with reception by a user equipment (UE) of one or more downlink messages, wherein at least one downlink message of the one or more downlink messages comprises:
        a respective first portion with first information for the UE; and
        a respective second portion with second information for the UE and at least one other UE based at least in part on a rate splitting procedure;
    determining a maximum data rate for the UE that is associated with the rate splitting procedure and based at least in part on the set of one or more communication parameters indicated via the uplink message; and
    transmitting the one or more downlink messages to the UE, wherein a data rate associated with the one or more downlink messages is less than or equal to the maximum data rate.

27. The method of claim 26, wherein transmitting the one or more downlink messages comprises:
    transmitting a first subset of the one or more downlink messages that are in accordance with the rate splitting procedure; and
    transmitting a second subset of the one or more downlink messages that are not in accordance with the rate splitting procedure, wherein the data rate is associated with both the first subset and the second subset of the one or more downlink messages based at least in part on the set of one or more communication parameters.

28. The method of claim 26, further comprising:
    transmitting one or more second downlink messages that are not in accordance with the rate splitting procedure, wherein a second data rate associated with the one or more second downlink messages is different than the maximum data rate associated with the one or more downlink messages.

29. The method of claim 26, wherein transmitting the one or more downlink messages comprises:
    transmitting the respective second portions of each of the one or more downlink messages in accordance with the data rate based at least in part on the set of one or more communication parameters; and
    transmitting the respective first portions of each of the one or more downlink messages in accordance with a second data rate that is different than the data rate.

30. An apparatus for wireless communication, comprising:
    memory;
    a transceiver; and
    at least one processor of a user equipment (UE), the at least one processor coupled with the memory and the transceiver, and the at least one processor configured to:
        receive, via the transceiver, control signaling that schedules a downlink message and a set of uplink symbols for conveying feedback in response to the downlink message, wherein the downlink message is for reception by the UE in accordance with one or more rate splitting parameters, and wherein a first portion of a time period between a final symbol of the downlink message and a beginning symbol of the set of uplink symbols has a first duration that is based at least in part on a downlink processing time for the UE in the absence of rate splitting and a second portion of the time period has a second duration that is based at least in part on one or more capabilities of the UE that are associated with the one or more rate splitting parameters;
        receive, via the transceiver, the downlink message based at least in part on the control signaling, wherein, based at least in part on the one or more rate splitting parameters, a first portion of the downlink message comprises first information for the UE and a second portion of the downlink message comprises second information for the UE and at least one other UE; and
        transmit, via the transceiver and in response to the downlink message, a feedback message via the set of uplink symbols.

31. An apparatus for wireless communication, comprising:
    memory;
    a transceiver; and
    at least one processor of a user equipment (UE), the at least one processor coupled with the memory and the transceiver, and the at least one processor configured to:
        transmit, via the transceiver, one or more capability messages that indicate a first set of one or more UE capabilities and a second set of one or more UE capabilities, wherein:
            the UE supports a first UE processing capability corresponding to a first time period and a second UE processing capability corresponding to a second time period for processing a downlink message before transmitting feedback in response to the downlink message, the second time period shorter than the first time period;
            the first set of one or more UE capabilities indicate whether the UE supports the second UE processing capability for reception of a first type of downlink message comprising, based at least in part on a rate splitting procedure, a respective first portion with respective first information for the UE and a respective second portion with respective second information for the UE and at least one other UE; and
            the second set of one or more UE capabilities are associated with a second type of downlink message different than the first type; and
        receive, via the transceiver, control signaling that schedules the downlink message and a set of uplink symbols for conveying the feedback in response to the downlink message, wherein communication parameters for the downlink message are based at least in part on the first set of one or more UE capabilities, the second set of one or more UE capabilities, or any combination thereof.

32. An apparatus for wireless communication, comprising:
    memory;
    a transceiver; and
    at least one processor of a user equipment (UE), the at least one processor coupled with the memory and the transceiver, and the at least one processor configured to:
        transmit, via the transceiver, an uplink message comprising a set of one or more communication parameters associated with reception by the UE of one or more downlink messages, wherein at least one downlink message of the one or more downlink messages comprises:
- a respective first portion with first information for the UE; and
- a respective second portion with second information for the UE and at least one other UE based at least in part on a rate splitting procedure; and receive, via the transceiver, the one or more downlink messages, wherein a data rate associated with the one or more downlink messages is less than or equal to a maximum data rate that is associated with the rate splitting procedure and based at least in part on the set of one or more communication parameters indicated via the uplink message.

33. An apparatus for wireless communication, comprising:
  memory;
  a transceiver; and
  at least one processor of a network entity, the at least one processor coupled with the memory and the transceiver, and the at least one processor configured to:
  receive, via the transceiver, an uplink message comprising a set of one or more communication parameters associated with reception by a user equipment (UE) of one or more downlink messages, wherein at least one downlink message of the one or more downlink messages comprises:
  - a respective first portion with first information for the UE; and
  - a respective second portion with second information for the UE and at least one other UE based at least in part on a rate splitting procedure;
  determine a maximum data rate for the UE that is associated with the rate splitting procedure and based at least in part on the set of one or more communication parameters indicated via the uplink message; and
  transmit, via the transceiver, the one or more downlink messages to the UE, wherein a data rate associated with the one or more downlink messages is less than or equal to the maximum data rate.

* * * * *